United States Patent [19]

Magee et al.

[11] Patent Number: 5,729,710

[45] Date of Patent: Mar. 17, 1998

[54] METHOD AND APPARATUS FOR MANAGEMENT OF MAPPED AND UNMAPPED REGIONS OF MEMORY IN A MICROKERNEL DATA PROCESSING SYSTEM

[75] Inventors: James Michael Magee, Lake Worth; Freeman Leigh Rawson, III, Boca Raton; Guy Gil Sotomayor, Jr., West Palm Beach, all of Fla.

[73] Assignee: International Business Machines Corporation, Armonk, N.Y.

[21] Appl. No.: 263,710

[22] Filed: Jun. 22, 1994

[51] Int. Cl.$^6$ .................................................. G06F 12/00
[52] U.S. Cl. ..................... 395/413; 395/674; 395/497.01
[58] Field of Search ............................. 395/497.01, 413, 395/600, 650, 611, 614, 674

[56] References Cited

U.S. PATENT DOCUMENTS 5,428,729  6/1995  Chang et al. ............................. 395/153

FOREIGN PATENT DOCUMENTS 0 331 900  9/1989  Germany ........................ G06F 9/46
0 416 768  3/1991  United Kingdom .............. G06F 9/46

OTHER PUBLICATIONS

Mike Accetta, et al., "Mach: A New Kernel Foundation for Unix Development", Proceedings of the Summer 1986 Usenix Conference, Atlanta, Georgia.

David Golub, et al., "Unix as an Application Program", Proceedings of the Summer 1990 Usenix Conference, Anaheim, California.

David L. Black, et al., "Microkernel Operating System Architecture and Mach", Usenix Association, pp. 11–30, Apr. 27, 1992.

James M. Phelan, et al., "An OS/2 Personality on Mach, Mach II Symposium", Usenix Association, Apr. 19–21, 1993, Sante Fe, New Mexico.

Michel Glen, "Micro–Kernel Design" *Unix Review*, vol. 8, No. 11, pp. 58–63.

Michel Glen, "Next Generation Operating Systems Architecture", Lecture Notes in Computer Science. Operating Systems of the 90s and Beyond–International Workshop, A. Karshmer. et al. Eds., Dagstuhl Castle. Germany. pp. 227–232. Jul. 8–12, 1991.

Richard Rashid, "A Catalyst for Open Systems", *Datamation*, vol. 35, No. 10, pp. 32–33, May 15, 1989.

Allan Bricker, et al., "Architectural Issues in Microkernel–based operating systems: the Chorus Experience," *Chorus*, vol. 14, No. 6, pp. 347–357, Jul./Aug. 1991.

(List continued on next page.)

*Primary Examiner*—Jack A. Lane
*Attorney, Agent, or Firm*—Jeffrey S. LaBaw; Morgan & Finnegan LLP

[57] ABSTRACT

A memory management method for a microkernel architecture and the microkernel itself feature template regions which are defined by the microkernel in the memory, as special objects. In the memory management method, after the microkernel is loaded into the memory of a data processing system, it begins creating task containers in the memory. It does this by forming template regions as special objects in the memory, the template regions having a set of attributes. Then, when the microkernel forms a task in the memory, it does so by mapping the template region into the task. The microkernel defines a virtual address space for the task based upon the template region. Later, when the microkernel conducts virtual memory operations on the template regions, the effect of the virtual memory operations is manifested in the task by means of the mapping relationship. In this manner, a single template region can be mapped into multiple tasks, simultaneously. By directing virtual memory operations to the template region on which they will take effect, the sharing of the virtual memory operations is much easier to accomplish since the changes are made to a template region, not to the mapping of the template region within each task.

57 Claims, 16 Drawing Sheets

OTHER PUBLICATIONS

Robbert van Renesse, et al., "Short Overview of Amoeba", Usenix Association, Apr. 27, 1992, Seattle, Washington.

David L. Cohn, et al., "Basing Micro-Kernel Abstractions on High-Level Language Models", Open Forum '92, The Pan-European Open Systems Event, Proceedings of the Technical Conference, Utrecht, 23–27 Nov., 1992.

Gerald Malan, et al., "Dos as a Mach 3.0 Application", Usenix Association, Nov. 20–22, 1991, Monterey, California.

Joseph Boyken, et al., *Programming Under Mach,* Addison--Wesley Publishing Company, Incorporated, 1993.

IEEE Transactions on Computers, vol. 37, No. 8, pp. 896–907, XP000098791; Rashid, R. et al., "Machine-Independent Virtual Memory Management for Paged Uniprocessor and Multiprocessor Architectures".

FIG. 8B
VM Regions
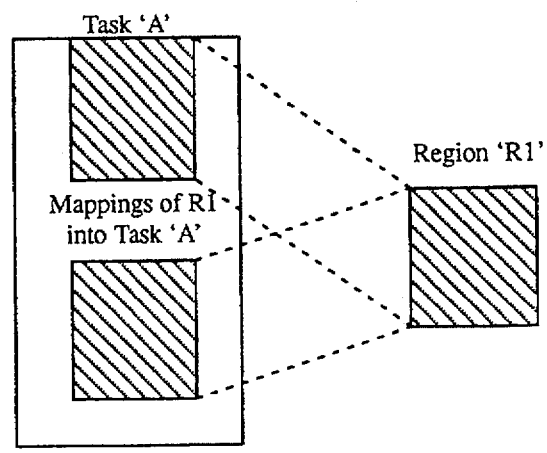
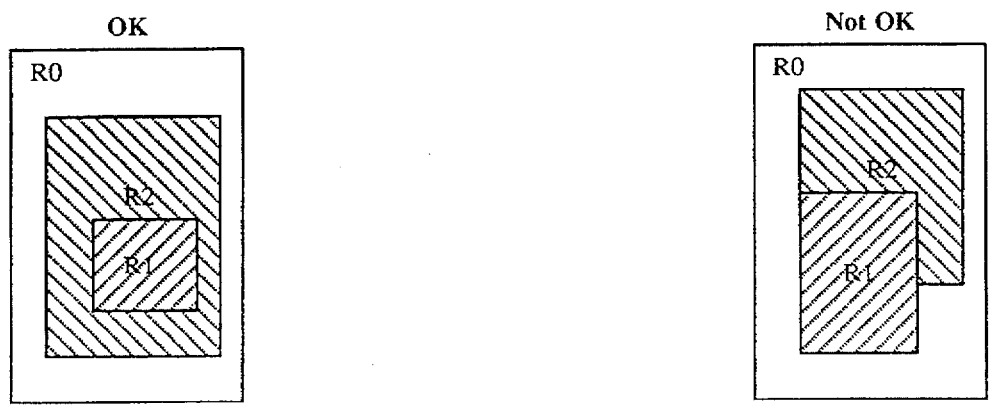
FIG. 9

FIG. 10
VM Regions
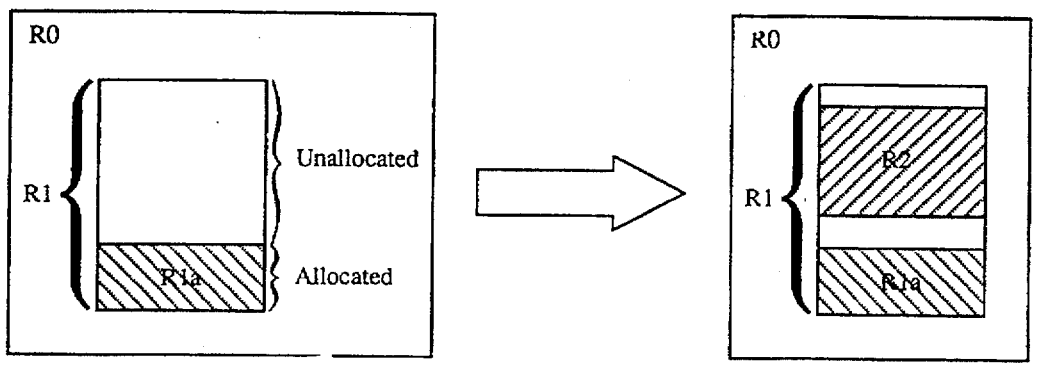
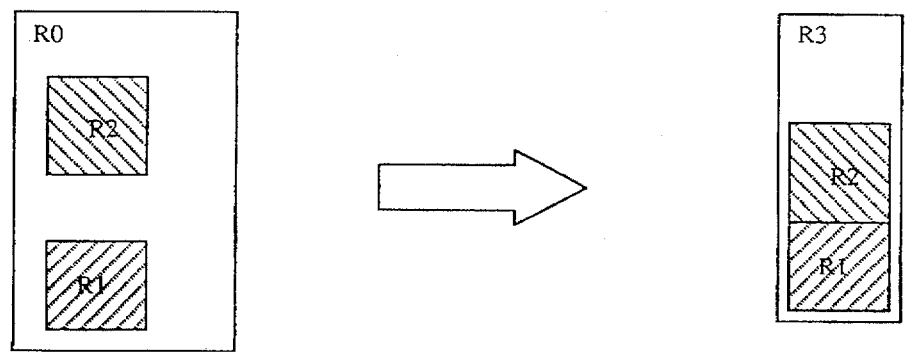
FIG. 11

FIG. 12
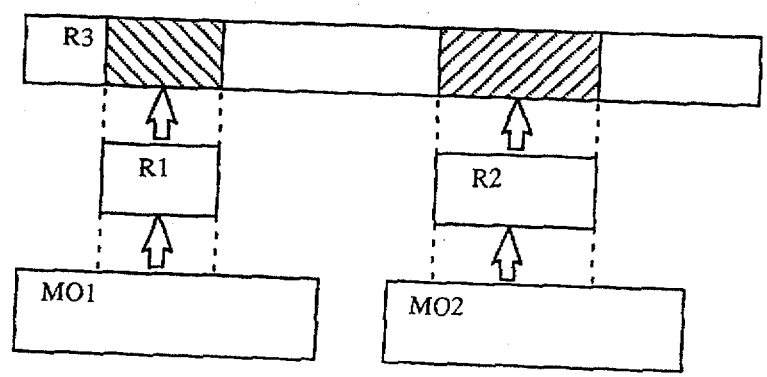
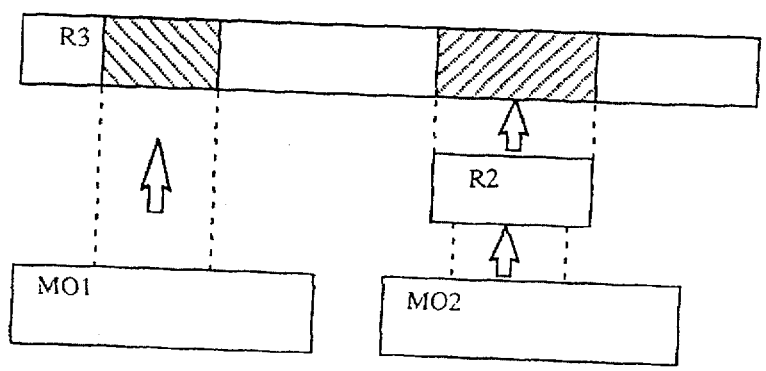
FIG. 13

METHOD AND APPARATUS FOR MANAGEMENT OF MAPPED AND UNMAPPED REGIONS OF MEMORY IN A MICROKERNEL DATA PROCESSING SYSTEM

FIELD OF THE INVENTION

The invention disclosed broadly relates to data processing systems and more particularly relates to improvements in operating systems for data processing systems.

BACKGROUND OF THE INVENTION

The operating system is the most important software running on a computer. Every general purpose computer must have an operating system to run other programs. Operating systems typically perform basic tasks, such as recognizing input from the keyboard, sending output to the display screen, keeping track of files and directories on the disc, and controlling peripheral devices such as disc drives and printers. For more complex systems, the operating system has even greater responsibilities and powers. It makes sure that different programs and users running at the same time do not interfere with each other. The operating system is also typically responsible for security, ensuring that unauthorized users do not access the system.

Operating systems can be classified as multi-user operating systems, multi-processor operating systems, multi-tasking operating systems, and real-time operating systems. A multi-user operating system allows two or more users to run programs at the same time. Some operating systems permit hundreds or even thousands of concurrent users. A multi-processing program allows a single user to run two or more programs at the same time. Each program being executed is called a process. Most multi-processing systems support more than one user. A multi-tasking system allows a single process to run more than one task. In common terminology, the terms multi-tasking and multi-processing are often used interchangeably even though they have slightly different meanings. Multi-tasking is the ability to execute more than one task at the same time, a task being a program. In multi-tasking, only one central processing unit is involved, but it switches from one program to another so quickly that it gives the appearance of executing all of the programs at the same time. There are two basic types of multi-tasking, preemptive and cooperative. In preemptive multi-tasking, the operating system parcels out CPU time slices to each program. In cooperative multi-tasking, each program can control the CPU for as long as it needs it. If a program is not using the CPU however, it can allow another program to use it temporarily. For example, the OS/2 (TM) and UNIX (TM) operating systems use preemptive multi-tasking, whereas the Multi-Finder (TM) operating system for Macintosh (TM) computers uses cooperative multi-tasking. Multi-processing refers to a computer system's ability to support more than one process or program at the same time. Multi-processing operating systems enable several programs to run concurrently. Multi-processing systems are much more complicated than single-process systems because the operating system must allocate resources to competing processes in a reasonable manner. A real-time operating system responds to input instantaneously. General purpose operating systems such as DOS and UNIX are not real-time.

Operating systems provide a software platform on top of which application programs can run. The application programs must be specifically written to run on top of a particular operating system. The choice of the operating system therefore determines to a great extent the applications which can be run. For IBM compatible personal computers, example operating systems are DOS, OS/2 (TM), AIX (TM), and XENIX (TM).

A user normally interacts with the operating system through a set of commands. For example, the DOS operating system contains commands such as COPY and RENAME for copying files and changing the names of files, respectively. The commands are accepted and executed by a part of the operating system called the command processor or command line interpreter.

There are many different operating systems for personal computers such as CP/M (TM), DOS, OS/2 (TM), UNIX (TM), XENIX (TM), and AIX (TM). CP/M was one of the first operating systems for small computers. CP/M was initially used on a wide variety of personal computers, but it was eventually overshadowed by DOS. DOS runs on all IBM compatible personal computers and is a single user, single tasking operating system. OS/2, a successor to DOS, is a relatively powerful operating system that runs on IBM compatible personal computers that use the Intel 80286 or later microprocessor. OS/2 is generally compatible with DOS but contains many additional features, for example it is multi-tasking and supports virtual memory. UNIX and UNIX-based AIX run on a wide variety of personal computers and work stations. UNIX and AIX have become standard operating systems for work stations and are powerful multi-user, multi-processing operating systems.

In 1981 when the IBM personal computer was introduced in the United States, the DOS operating system occupied approximately 10 kilobytes of storage. Since that time, personal computers have become much more complex and require much larger operating systems. Today, for example, the OS/2 operating system for the IBM personal computers can occupy as much as 22 megabytes of storage. Personal computers become ever more complex and powerful as time goes by and it is apparent that the operating systems cannot continually increase in size and complexity without imposing a significant storage penalty on the storage devices associated with those systems.

It was because of this untenable growth rate in operating system size, that the MACH project was conducted at the Carnegie Mellon University in the 1980's. The goal of that research was to develop a new operating system that would allow computer programmers to exploit modern hardware architectures emerging and yet reduce the size and the number of features in the kernel operating system. The kernel is the part of an operating system that performs basic functions such as allocating hardware resources. In the case of the MACH kernel, five programming abstractions were established as the basic building blocks for the system. They were chosen as the minimum necessary to produce a useful system on top of which the typical complex operations could be built externally to the kernel. The Carnegie Mellon MACH kernel was reduced in size in its release 3.0, and is a fully functional operating system called the MACH microkernel. The MACH microkernel has the following primitives: the task, the thread, the port, the message, and the memory object.

The task is the traditional UNIX process which is divided into two separate components in the MACH microkernel. The first component is the task, which contains all of the resources for a group of cooperating entities. Examples of resources in a task are virtual memory and communications ports. A task is a passive collection of resources; it does not run on a processor.

The thread is the second component of the UNIX process, and is the active execution environment. Each task may support one or more concurrently executing computations called threads. For example, a multi-threaded program may use one thread to compute scientific calculations while another thread monitors the user interface. A MACH task may have many threads of execution, all running simultaneously. Much of the power of the MACH programming model comes from the fact that all threads in a task share the task's resources. For instance, they all have the same virtual memory (VM) address space. However, each thread in a task has its own private execution state. This state consists of a set of registers, such as general purpose registers, a stack pointer, a program counter, and a frame pointer.

A port is the communications channel through which threads communicate with each other. A port is a resource and is owned by a task. A thread gains access to a port by virtue of belonging to a task. Cooperating programs may allow threads from one task to gain access to ports in another task. An important feature is that they are location transparent. This capability facilitates the distribution of services over a network without program modification.

The message is used to enable threads in different tasks to communicate with each other. A message contains collections of data which are given classes or types. This data can range from program specific data such as numbers or strings to MACH related data such as transferring capabilities of a port from one task to another.

A memory object is an abstraction which supports the capability to perform traditional operating system functions in user level programs, a key feature of the MACH microkernel. For example, the MACH microkernel supports virtual memory paging policy in a user level program. Memory objects are an abstraction to support this capability.

All of these concepts are fundamental to the MACH microkernel programming model and are used in the kernel itself. These concepts and other features of the Carnegie Mellon University MACH microkernel are described in the book by Joseph Boykin, et al, "Programming Under MACH", Addison Wessely Publishing Company, Incorporated, 1993.

Additional discussions of the use of a microkernel to support a UNIX personality can be found in the article by Mike Accetta, et al, "MACH: A New Kernel Foundation for UNIX Development", Proceedings of the Summer 1986 USENIX Conference, Atlanta, Ga. Another technical article on the topic is by David Golub, et al, "UNIX as an Application Program", Proceedings of the Summer 1990 USENIX Conference, Anaheim, Calif.

One problem with current microkernel embodiments is that all of the virtual memory operations are based on the task. This is an inappropriate requirement, since many of the virtual memory calls are not necessarily limited to a single task. This also introduces a significant security exposure. A task's control port must be given to other tasks in order for another task to be able to manipulate portions of the virtual memory sub-system on a task's behalf. Once given a task's control port, the other task can breach the security of the first task. In addition, by having all of the virtual memory functions operating on the task, the task interfaces are overly complicated with all of the virtual memory calls that are not necessarily part of the task manipulation. Another problem with the current virtual memory interfaces for microkernels is that many of them operate on a range of memory. Since a task can be composed of many memory ranges, there is nothing in the interface definitions that naturally limits the operations on multiple memory ranges. For example, where there is a range of memory that has been reserved, there is no obvious limitation to prevent an operation such as memory allocation to span the reserved range and adjacent unreserved ranges. This creates the unwanted consequence of corrupting the contents of objects in the memory.

OBJECT OF THE INVENTION

It is therefore an object of the invention to provide an improved microkernel architecture for a data processing system.

It is another object of the invention to provide to an improved microkernel architecture for a data processing system that is more simplified in its virtual memory operations than has been capable in the prior art.

It is further object of the invention to provide an improved microkernel architecture for a data processing system, that has enhanced security for tasks.

It is still a further object of the invention to provide an improved microkernel architecture for a data processing system, that has greater resistance to corruption of objects defined in the memory.

SUMMARY OF THE INVENTION

These and other objects, features and advantages are accomplished by the method and apparatus for management of mapped and unmapped regions in accordance with the invention described herein.

The invention is a memory management method for a microkernel architecture and the microkernel structure, itself. It features template regions that are defined by the microkernel in the memory as special objects. In the memory management method, after the microkernel is loaded into the memory of a data processing system, it can begin creating task containers in the memory. It does this by first forming template regions as special objects in the memory, each template region having a set of attributes to define corresponding task containers. The attributes can specify the resources available to a task for use by its threads, such as virtual memory, data, and communications ports. Then, the microkernel can form the task in the memory, by mapping the attributes specified by the template region into the task. The microkernel defines a virtual address space for the task based upon the template region. Later, when the microkernel conducts virtual memory operations on the template regions, the effect of the virtual memory operations is manifested in the task by means of the mapping relationship.

The microkernel defines a data structure representing a task at a virtual address, using a size attribute from the template region and a starting virtual address for the task. The microkernel defines a virtual address space for the task over which the task's threads can conduct their operations, using an attribute from the template region. The microkernel also defines a task name for the task and forms a port name space in the memory for the task to use as a communications channel. The microkernel defines access rights for the port name space for the task using the set of attributes from the template region. The microkernel can then form thread objects in the memory for the task, for fetching instructions from the virtual address space of the task.

In accordance with the invention, the microkernel defines a first pointer for the task that points to the template region. Within the template region, there are second pointers that point directly or indirectly to a mapping table called a PMAP. The PMAP converts the virtual address value of the second pointers, into a physical address of a cache object in the memory that contains a page of data to be used by the task. From time to time, changes are desired to be made in the data resources of a task. This is accomplished by changing the virtual address value represented by the second pointers in the template region. The changed second pointers can point to different translation values in the PMAP, resulting in the addressing of different pages or cache objects, as is desired. But, no changes are necessary to the contents of the task, itself. Task resources, such as data in cache objects, are addressed by the task through the second pointers in the template region. If the microkernel has defined a plurality of tasks from the template region, then changing the second pointers in the template region will result in a global change in the resources available to the plurality of tasks pointing to that template region. The data pages addressed by the tasks can be changed with a single change to the second pointers in the template region, instead of changing the contents of each one of the tasks. In this manner, a single template region can be mapped into multiple tasks, simultaneously. Each task sees all of the changes that are made to the template region. This allows for the sharing of properties by the tasks that were generated from the same template region.

The template region is the object to which all virtual memory operations are directed. In the past, with the MACH microkernel, a task was the object to which the virtual memory operations were directed. By directing virtual memory operations to the template region on which they will take effect, in accordance with the invention, the sharing of the virtual memory operations is much easier to accomplish since the changes are made to a region, not to the mapping of the region within each task.

DESCRIPTION OF THE FIGURES

These and other objects features and advantages will be more fully appreciated with reference to the accompanying figures.

FIG. 8B shows mapping a template region into a task twice.

FIG. 9 shows overlapping template regions.

FIG. 10 shows memory allocations and overlapping template regions.

FIG. 11 shows condensing template regions.

FIG. 12 shows mapping memory objects.

FIG. 13 shows incorrect mapping of memory objects.

DISCUSSION OF THE PREFERRED EMBODIMENT

Part A. The Microkernel System

Section 1. Microkernel Principles

Figure 1:
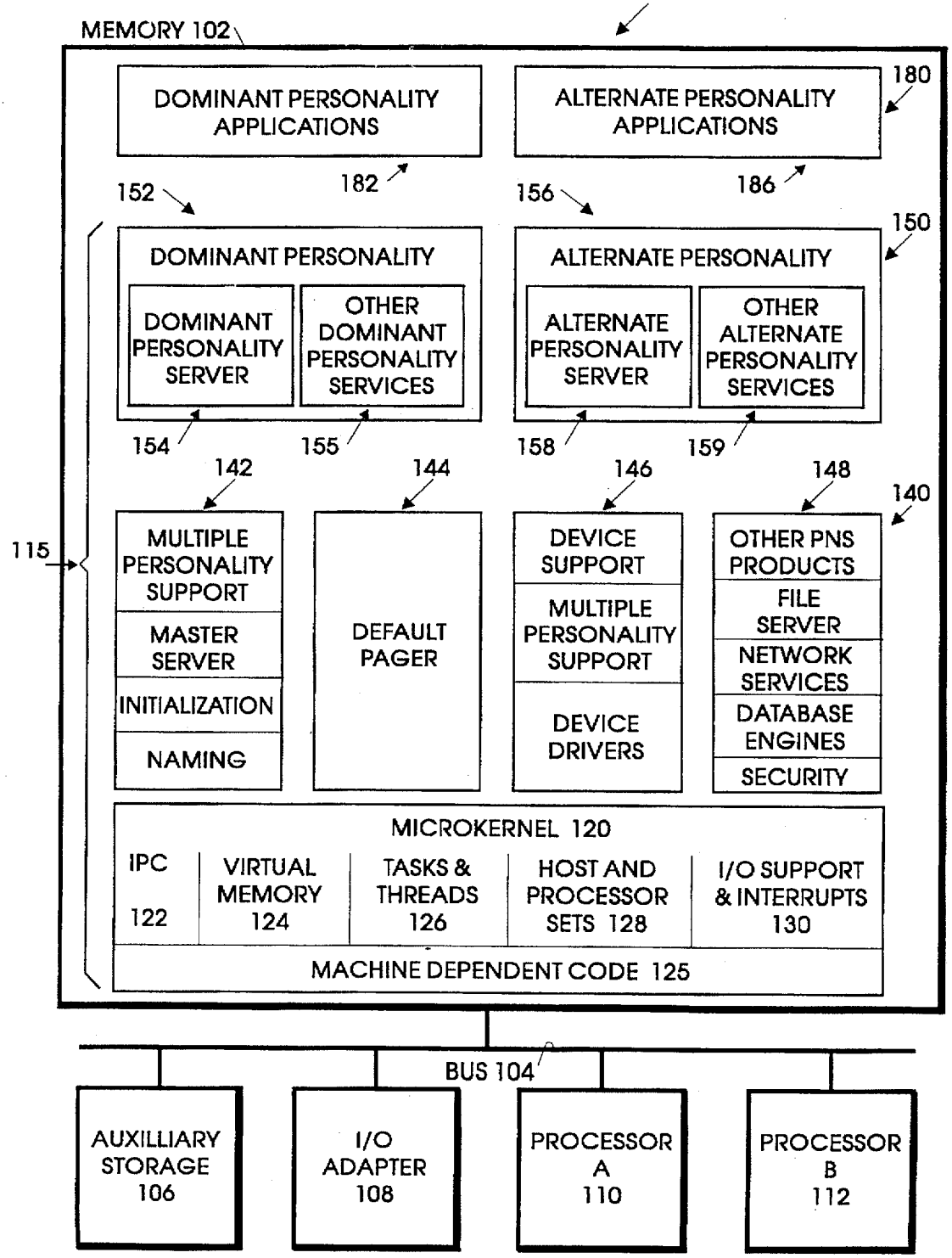
FIG. 1 is a functional block diagram of the Microkernel System 115 in the memory 102 of the host multiprocessor 100, showing how the microkernel and personality-neutral services 140 run multiple operating system personalities on a variety of hardware platforms.

FIG. 1 is a functional block diagram of the Microkernel System 115, showing how the microkernel 120 and personality-neutral services 140 run multiple operating system personalities 150 on a variety of hardware platforms.

The host multi-processor 100 shown in FIG. 1 includes memory 102 connected by means of a bus 104 to an auxiliary storage 106 which can be for example a disc drive, a read only or a read/write optical storage, or any other bulk storage device. Also connected to the bus 104 is the I/O adaptor 108 which in turn may be connected to a keyboard, a monitor display, a telecommunications adaptor, a local area network adaptor, a modem, multi-media interface devices, or other I/O devices. Also connected to the bus 104 is a first processor A, 110 and a second processor B, 112. The example shown in FIG. 1 is of a symmetrical multi-processor configuration wherein the two uni-processors 110 and 112 share a common memory address space 102. Other configurations of single or multiple processors can be shown as equally suitable examples. The processors can be, for example, an Intel 386 (TM) CPU, Intel 486 (TM) CPU, a Pentium (TM) processor, a Power PC (TM) processor, or other uni-processor devices.

The memory 102 includes the microkernel system 115 stored therein, which comprises the microkernel 120, the personality neutral services (PNS) 140, and the personality servers 150. The microkernel system 115 serves as the operating system for the application programs 180 stored in the memory 102.

An objective of the invention is to provide an operating system that behaves like a traditional operating system such as UNIX or OS/2. In other words, the operating system will have the personality of OS/2 or UNIX, or some other traditional operating system.

The microkernel 120 contains a small, message-passing nucleus of system software running in the most privileged state of the host multi-processor 100, that controls the basic operation of the machine. The microkernel system 115 includes the microkernel 120 and a set of servers and device drivers that provide personality neutral services 140. As the name implies, the personality neutral servers and device drivers are not dependent on any personality such as UNIX or OS/2. They depend on the microkernel 120 and upon each other. The personality servers 150 use the message passing services of the microkernel 120 to communicate with the personality neutral services 140. For example, UNIX, OS/2 or any other personality server can send a message to a personality neutral disc driver and ask it to read a block of data from the disc. The disc driver reads the block and returns it in a message. The message system is optimized so that large amounts of data are transferred rapidly by manipulating pointers; the data itself is not copied.

By virtue of its size and ability to support standard programming services and features as application programs, the microkernel 120 is simpler than a standard operating system. The microkernel system 115 is broken down into modular pieces that are configured in a variety of ways, permitting larger systems to be built by adding pieces to the smaller ones. For example, each personality neutral server 140 is logically separate and can be configured in a variety of ways. Each server runs as an application program and can be debugged using application debuggers. Each server runs in a separate task and errors in the server are confined to that task.

FIG. 1 shows the microkernel 120 including the interprocess communications module (IPC) 122, the virtual memory module 124, tasks and threads module 126, the host and processor sets 128, I/O support and interrupts 130, and machine dependent code 125.

The personality neutral services 140 shown in FIG. 1 includes the multiple personality support 142 which includes the master server, initialization, and naming. It also includes the default pager 144. It also includes the device support 146 which includes multiple personality support and device drivers. It also includes other personality neutral products 148, including a file server, network services, database engines and security.

The personality servers 150 are for example the dominant personality 152 which can be, for example, a UNIX personality. It includes a dominant personality server 154 which would be a UNIX server, and other dominant personality services 155 which would support the UNIX dominant personality. An alternate dominant personality 156 can be for example OS/2. Included in the alternate personality 156 are the alternate personality server 158 which would characterize the OS/2 personality, and other alternate personality services for OS/2, 159.

Dominant personality applications 182 shown in FIG. 1, associated with the UNIX dominant personality example, are UNIX-type applications which would run on top of the UNIX operating system personality 152. The alternate personality applications 186 shown in FIG. 1, are OS/2 applications which run on top of the OS/2 alternate personality operating system 156.

FIG. 1 shows that the Microkernel System 115 carefully splits its implementation into code that is completely portable from processor type to processor type and code that is dependent on the type of processor in the particular machine on which it is executing. It also segregates the code that depends on devices into device drivers; however, the device driver code, while device dependent, is not necessarily dependent on the processor architecture. Using multiple threads per task, it provides an application environment that permits the use of multi-processors without requiring that any particular machine be a multi-processor. On uniprocessors, different threads run at different times. All of the support needed for multiple processors is concentrated into the small and simple microkernel 120.

This section provides an overview of the structure of the Microkernel System 115. Later sections describe each component of the structure in detail and describe the technology necessary to build a new program using the services of the Microkernel System 115.

The Microkernel System 115 is a new foundation for operating systems. It provides a comprehensive environment for operating system development with the following features:

Support for multiple personalities

Extensible memory management

Interprocess communication

Multi-threading

Multi-processing

The Microkernel System 115 provides a concise set of kernel services implemented as a pure kernel and an extensive set of services for building operating system personalities implemented as a set of user-level servers.

Objectives of the Microkernel System 115 include the following:

Permit multiple operating system personalities to work together in harmony;

Provide common programming for low-level system elements, such as device drivers and file systems;

Exploit parallelism in both operating system and user applications;

Support large, potentially sparse address spaces with flexible memory sharing;

Allow transparent network resource access;

Be compatible with existing software environments, such as OS/2 and UNIX; and

Portable (to 32-bit and 64-bit platforms).

The Microkernel System 115 is based on the following concepts:

User mode tasks performing many traditional operating system functions (for example, file system and network access);

A basic set of user-level run time services for creating operating systems;

A simple, extensible communication kernel;

An object basis with communication channels as object references; and

A client/server programming model, using synchronous and asynchronous inter-process communication.

The basis for the Microkernel System 115 is to provide a simple, extensible communication kernel. It is an objective of the Microkernel System 115 to permit the flexible configuration of services in either user or kernel space with the minimum amount of function in the kernel proper. The kernel must provide other support besides task-to-task communication, including:

Management of points of control (threads);

Resource assignment (tasks);

Support of address spaces for tasks; and

Management of physical resources, such as physical memory, processors, interrupts, DMA channels, and clocks.

User mode tasks implement the policies regarding resource usage. The kernel simply provides mechanisms to enforce those policies. Logically above the kernel is the Personality-Neutral services 140 (PNS) layer. The PNS provide a C runtime environment, including such basic constructs as string functions, and a set of servers which include:

Name Server—Allows a client to find a server

Master Server—Allows programs to be loaded and started

Kernel Abstractions

One goal of the Microkernel System 115 is to minimize abstractions provided by the kernel itself, but not to be minimal in the semantics associated with those abstractions. Each of the abstractions provided has a set of semantics associated with it, and a complex set of interactions with the other abstractions. This can make it difficult to identify key ideas. The main kernel abstractions are:

Task—Unit of resource allocation, large access space and port right

Thread—Unit of CPU utilization, lightweight (low overhead)

Port—A communication channel, accessible only through the send/receive capabilities or rights Message—A collection of data objects Memory object—The internal unit of memory management (Refer to Section 2, Architectural Model, for a detailed description of the task, thread, port, message and memory object concepts).

Tasks and Threads

The Microkernel System 115 does not provide the traditional concept of process because: All operating system environments have considerable semantics associated with a process (such as user ID, signal state, and so on). It is not the purpose of the microkernel to understand or provide these extended semantics.

Many systems equate a process with an execution point of control. Some systems do not.

The microkernel 120 supports multiple points of control separately from the operating system environment's process. The microkernel provides the following two concepts:

Task

Thread (Refer to Section 2, Architectural Model, for a detailed description of the task and thread concepts).

Memory Management

The kernel provides some memory management. Memory is associated with tasks. Memory objects are the means by which tasks take control over memory management. The Microkernel System 115 provides the mechanisms to support large, potentially sparse virtual address spaces. Each task has an associated address map that is maintained by the kernel and controls the translation of virtual address in the task's address space into physical addresses. As in virtual memory systems, the contents of the entire address space of any given task might not be completely resident in physical memory at the same time, and mechanisms must exist to use physical memory as a cache for the virtual address spaces of tasks. Unlike traditional virtual memory designs, the Microkernel System 115 does not implement all of the caching itself. It gives user mode tasks the ability to participate in these mechanisms. The PNS include a user task, the default pager 144, that provides paging services for memory.

Unlike other resources in the Microkernel System 115, virtual memory is not referenced using ports. Memory can be referenced only by using virtual addresses as indices into a particular task's address space. The memory and the associated address map that defines a task's address space can be partially shared with other tasks. A task can allocate new ranges of memory within its address space, de-allocate them, and change protections on them. It can also specify inheritance properties for the ranges. A new task is created by specifying an existing task as a base from which to construct the address space for the new task. The inheritance attribute of each range of the memory of the existing task determines whether the new task has that range defined and whether that range is virtually copied or shared with the existing task. Most virtual copy operations for memory are achieved through copy-on-write optimizations. A copy-on-write optimization is accomplished by protected sharing. The two tasks share the memory to be copied, but with read-only access. When either task attempts to modify a portion of the range, that portion is copied at that time. This lazy evaluation of memory copies is an important performance optimization performed by the Microkernel System 115 and important to the communication/memory philosophy of the system.

Any given region of memory is backed by a memory object. A memory manager task provides the policy governing the relationship between the image of a set of pages while cached in memory (the physical memory contents of a memory region) and the image of that set of pages when not cached (the abstract memory object). The PNS has a default memory manager or pager that provides basic non-persistent memory objects that are zero-filled initially and paged against system paging space.

Task to Task Communication

The Microkernel System 115 uses a client/server system structure in which tasks (clients) access services by making requests of other tasks (servers) through messages sent over a communication channel. Since the microkernel 120 provides very few services of its own (for example, it provides no file service), a microkernel 120 task must communicate with many other tasks that provide the required services. The communication channels of the interprocess communication (IPC) mechanism are called ports. (Refer to Section 2, Architectural Model, for a detailed description of a Port). A message is a collection of data, memory regions, and port rights. A port right is a name by which a task, that holds the right, names the port. A task can manipulate a port only if it holds the appropriate port rights. Only one task can hold the receive right for a port. This task is allowed to receive (read) messages from the port queue. Multiple tasks can hold send rights to the port that allow them to send (write) messages into the queue. A task communicates with another task by building a data structure that contains a set of data elements, and then performing a message-send operation on a port for which it holds a send right. At some later time, the task holding the receive right to that port performs a message-receive operation.

Note: This message transfer is an asynchronous operation. The message is logically copied into the receiving task (possibly with copy-on-write optimizations). Multiple threads within the receiving task can be attempting to receive messages from a given port, but only one thread will receive any given message.

Section 2. Architectural Model

The Microkernel System 115 has, as its primary responsibility, the provision of points of control that execute instructions within a framework. These points of control are called threads. Threads execute in a virtual environment. The virtual environment provided by the kernel contains a virtual processor that executes all of the user space accessible hardware instructions, augmented by user-space PNS and emulated instructions (system traps) provided by the kernel. The virtual processor accesses a set of virtualized registers and some virtual memory that otherwise responds as does the machine's physical memory. All other hardware resources are accessible only through special combinations of memory accesses and emulated instructions. Note that all resources provided by the kernel are virtualized. This section describes the top level elements of the virtual environment as seen by threads.

Elements of the Personality Neutral Services (PNS)

The PNS 140 portion of the Microkernel System 115 consists of services built on the underlying microkernel 120. This provides some functions that the kernel itself depends on, as well as a basic set of user-level services for the construction of programs. These programs can serve requests from multiple operating system personality clients and are used to construct the operating system personalities themselves. In addition, there is an ANSI C run time environment for the construction of PNS programs in standard C and some supplemental functions that have definitions taken from the POSIX standard. Besides the libraries that define the PNS themselves, there are many libraries that exist within the PNS that are a part of the microkernel proper. These libraries represent the interfaces that the microkernel exports and the support logic for the Message Interface Generator (MIG) which is used with the Microkernel System's 115 interprocess communications facilities.

The structure of the PNS environment library hides the details of the implementation of each service from its callers. Some libraries, such as one of the C run time libraries, implement all of their functions as local routines that are loaded into the address space of the caller while other libraries consist of stubs that invoke the microkernel's IPC system to send messages to servers. This architecture permits the flexible implementation of function: servers can be replaced by other servers and services can be combined into single tasks without affecting the sources of the programs that use them. A key element of the PNS environment is that, it does not constitute a complete operating system. Instead, the PNS depend on the existence of a personality. The dominant personality 152, that is loaded first during system start-up, is the operating system personality which provides the user interface on the system and provides services to its clients and to elements of the PNS. Thus, the dominant personality is a server of "last resort". The dominant personality implements whatever services are defined by the PNS libraries but are not implemented by another server.

The microkernel 120 is also dependent on some elements of the PNS. There are cases when it sends messages to personality-neutral servers to complete internal kernel operations. For example, in resolving a page fault, the microkernel 120 may send a message to the default pager 144. The default pager 144 then reads in the page that the kernel needs from a hard disk. Although the page fault is usually being resolved on behalf of a user task, the kernel is the sender of the message.

Run Time

The PNS run time provides a set of ANSI C and POSIX libraries that are used to support a standard C programing environment for programs executing in this environment. The facilities include typical C language constructs. Like all systems, the microkernel system 115 has, as its primary responsibility, the provision of points of control that execute instructions within a framework. In the microkernel 120, points of control are called threads. Threads execute in a virtual environment. The virtual environment provided by the microkernel 120 consists of a virtual processor that executes all of the user space accessible hardware instructions, augmented by emulated instructions (system traps) provided by the kernel; the virtual processor accesses a set of virtualized registers and some virtual memory that otherwise responds as does the machine's physical memory. All other hardware resources are accessible only through special combinations of memory accesses and emulated instructions. Note that all resources provided by the microkernel are virtualized. This section describes the top level elements of the virtual environment seen by the microkernel threads.

Elements of the Kernel

The microkernel 120 provides an environment consisting of the elements described in the following list of Kernel Elements:

Thread:

An execution point of control. A thread is a lightweight entity. Most of the state pertinent to a thread is associated with its containing task.

Task:

A container to hold references to resources in the form of a port name space, a virtual address space, and a set of threads.

Security Token:

A security feature passed from the task to server, which performs access validations.

Port:

A unidirectional communication channel between tasks.

Port Set:

A set of ports which can be treated as a single unit when receiving a message.

Port Right:

Allows specific rights to access a port.

Port Name Space:

An indexed collection of port names that names a particular port right.

Message

A collection of data, memory regions and port rights passed between two tasks.

Message Queue:

A queue of messages associated with a single port.

Virtual Address Space:

A sparsely populated, indexed set of memory pages that can be referenced by the threads within a task. Ranges of pages might have arbitrary attributes and semantics associated with them through mechanisms implemented by the kernel and external memory managers.

Abstract Memory Object:

An abstract object that represents the non-resident state of the memory ranges backed by this object. The task that implements this object is called a memory manager. The abstract memory object port is the port through which the kernel requests action of the memory manager.

Memory Object Representative:

The abstract representation of a memory object provided by the memory manager to clients of the memory object. The representative names the associated abstract memory object and limits the potential access modes permitted to the client.

Memory Cache Object:

A kernel object that contains the resident state of the memory ranges backed by an abstract memory object. It is through this object that the memory manager manipulates the clients' visible memory image.

Processor:

A physical processor capable of executing threads.

Processor Set:

A set of processors, each of which can be used to execute the threads assigned to the processor set.

Host:

The multiprocessor as a whole.

Clock:

A representation of the passage of time. A time value incremented at a constant frequency.

Many of these elements are kernel implemented resources that can be directly manipulated by threads. Each of these elements are discussed in detail in the paragraphs that follow. However, since some of their definitions depend on the definitions of others, some of the key concepts are discussed in simplified form so that a full discussion can be understood.

Threads

A thread is a lightweight entity. It is inexpensive to create and requires low overhead to operate. A thread has little state (mostly its register state). Its owning task bears the burden of resource management. On a multiprocessor it is possible for multiple threads in a task to execute in parallel. Even when parallelism is not the goal, multiple threads have an advantage because each thread can use a synchronous programming style, instead of asynchronous programming with a single thread attempting to provide multiple services.

A thread contains the following features:
1. a point of control flow in a task or a stream of instruction execution;
2. access to all of the elements of the containing task;
3. executes in parallel with other threads, even threads within the same task; and
4. minimal state for low overhead.

A thread is the basic computational entity. A thread belongs to only one task that defines its virtual address space. To affect the structure of the address space, or to reference any resource other than the address space, the thread must execute a special trap instruction. This causes the kernel to perform operations on behalf of the thread, or to send a message to an agent on behalf of the thread. These traps manipulate resources associated with the task containing the thread. Requests can be made of the kernel to manipulate these entities: to create and delete them and affect their state. The kernel is a manager that provides resources (such as those listed above) and services. Tasks may also provide services, and implement abstract resources. The kernel provides communication methods that allow a client task to request that a server task (actually, a thread executing within it) provide a service. In this way, a task has a dual identity. One identity is that of a resource managed by the kernel, whose resource manager executes within the kernel. The second identity is that of a supplier of resources for which the resource manager is the task itself.

A thread has the following state:
1. Its machine state (registers, etc.), which change as the thread executes and which can also be changed by a holder of the kernel thread port;
2. A small set of thread specific port rights, identifying the thread's kernel port and ports used to send exception messages on behalf of the thread;
3. A suspend count, non-zero if the thread is not to execute instructions; and
4. Resource scheduling parameters.

A thread operates by executing instructions in the usual way. Various special instructions trap to the kernel, to perform operations on behalf of the thread. The most important of these kernel traps is the mach_msg_trap. This trap allows the thread to send messages to the kernel and other servers to operate upon resources. This trap is almost never directly called; it is invoked through the mach_msg library routine. Exceptional conditions, such as "floating point overflow" and "page not resident", that arise during the thread's execution, are handled by sending messages to a port. The port used depends on the nature of the condition. The outcome of the exceptional condition is determined by setting the thread's state and/or responding to the exception message. The following operations can be performed on a thread:

Creation and destruction;
Suspension and resumption (manipulating the suspend count);
Machine state manipulation Special port (such as exception; port) manipulation; and
Resource (scheduling) control.

Tasks

A task is a collection of system resources. These resources, with the exception of the address space, are referenced by ports. These resources can be shared with other tasks if rights to the ports are so distributed.

Tasks provide a large, potentially sparse address space, referenced by machine address. Portions of this space can be shared through inheritance or external memory management. Note: A task has no life of its own. It contains threads which execute instructions. When it is said "a task Y does X" what is meant is "a thread contained within task Y does X". A task is an expensive entity. All of the threads in a task share everything. Two tasks share nothing without explicit action, although the action is often simple. Some resources such as port receive rights cannot be shared between two tasks. A task can be viewed as a container that holds a set of threads. It contains default values to be applied to its containing threads. Most importantly, it contains those elements that its containing threads need to execute, namely, a port name space and a virtual address space.

The state associated with a task is as follows:
The set of contained threads;
The associated virtual address space;
The associated port name space, naming a set of port rights, and a related set of port notification requests;
A security token to be sent with messages from the task;
A small set of task specific ports, identifying the task's kernel port, default ports to use for exception handling for contained threads, and bootstrap ports to name other services;
A suspend count, non-zero if no contained threads are to execute instructions;
Default scheduling parameters for threads; and
Various statistics, including statistical PC samples.

Tasks are created by specifying a prototype task which specifies the host on which the new task is created, and which can supply by inheritance various portions of its address space.

The following operations can be performed on a task:
Creation and destruction
Setting the security token
Suspension and resumption
Special port manipulation
Manipulation of contained threads
Manipulation of the scheduling parameters Security Port All tasks are tagged with a security token, an identifier that is opaque from the kernel's point of view. It encodes the identity and other security attributes of the task. This security token is included as an implicit value in all messages sent by the task. Trusted servers can use this sent token as an indication of the sender's identity for use in making access mediation decisions. A task inherits the security token of its parent. Because this token is to be used as an unforgeable indication of identity, privilege is required to change this token. This privilege is indicated by presenting the host security port.

A reserved value indicates the kernel's identity. All messages from the kernel carry the kernel identity, except exception messages, which carry the excepting task's identity.

Port

A port is a unidirectional communication channel between a client that requests a service and a server that provides the service. A port has a single receiver and potentially multiple senders. The state associated with a port is as follows:

Its associated message queue

A count of references (rights) to the port

Settable limits on the amount of virtual copy memory and port rights that can be sent in a message through the port.

Kernel services exist to allocate ports. All system entities other than virtual memory ranges are named by ports; ports are also created implicitly when these entities are created. The kernel provides notification messages upon the death of a port upon request. With the exception of the task's virtual address space, all other system resources are accessed through a level of indirection known as a port. A port is a unidirectional communication channel between a client who requests service and a server who provides the service. If a reply is to be provided to such a service request, a second port must be used. The service to be provided is determined by the manager that receives the message sent over the port. It follows that the receiver for ports associated with kernel provided entities is the kernel. The receiver for ports associated with task provided entities is the task providing that entity. For ports that name task provided entities, it is possible to change the receiver of messages for that port to a different task. A single task might have multiple ports that refer to resources it supports. Any given entity can have multiple ports that represent it, each implying different sets of permissible operations. For example, many entities have a name port and a control port that is sometimes called the privileged port. Access to the control port allows the entity to be manipulated. Access to the name port simply names the entity, for example, to return information.

There is no system-wide name space for ports. A thread can access only the ports known to its containing task. A task holds a set of port rights, each of which names a (not necessarily distinct) port and which specifies the rights permitted for that port. Port rights can be transmitted in messages. This is how a task gets port rights. A port right is named with a port name, which is an integer chosen by the kernel that is meaningful only within the context (port name space) of the task holding that right. Most operations in the system consist of sending a message to a port that names a manager for the object being manipulated. In this document, this is shown in the form:

object→function which means that the function is invoked (by sending an appropriate message) to a port that names the object. Since a message must be sent to a port (right), this operation has an object basis. Some operations require two objects, such as binding a thread to a processor set. These operations show the objects separated by commas. Not all entities are named by ports, and this is not a pure object model. The two main non-port-right named entities are port names/rights themselves, and ranges of memory. Event objects are also named by task local IDs. To manipulate a memory range, a message is sent to the containing virtual address space named by the owning task. To manipulate a port name/right, and often, the associated port, a message is sent to the containing port name space named by the owning task. A subscript notation, object [id]→function is used here to show that an id is required as a parameter in the message to indicate which range or element of object is to be manipulated. The parenthetic notation, object (port)→function is used here to show that a privileged port, such as the host control port, is required as a parameter in the message to indicate sufficient privilege to manipulate the object in the particular way.

Port Sets

A port set is a set of ports that can be treated as a single unit when receiving a message. A mach_msg receive operation is allowed against a port name that either names a receive right, or a port set. A port set contains a collection of receive rights. When a receive operation is performed against a port set, a message is received from one of the ports in the set. The received message indicates from which member port it was received. It is not allowed to directly receive a message from a port that is a member of a port set. There is no concept of priority for the ports in a port set; there is no control provided over the kernel's choice of the port within the port set from which any given message is received.

Operations supported for port sets include:

Creation and deletion

Membership changes and membership queries

Port Rights

A port can only be accessed by using a port right. A port right allows access to a specific port in a specific way. There are three types of port rights as follow:

receive right—Allows the holder to receive messages from the associated port.

send right—Allows the holder to send messages to the associated port.

send-once right—Allows the holder to send a single message to the associated port. The port right self-destructs after the message is sent.

Port rights can be copied and moved between tasks using various options in the mach_msg call, and also by explicit command. Other than message operations, port rights can be manipulated only as members of a port name space. Port rights are created implicitly when any other system entity is created, and explicitly using explicit port creation.

The kernel will, upon request, provide notification to a port of one's choosing when there are no more send rights to a port. Also, the destruction of a send-once right (other than by using it to send a message) generates a send-once notification sent to the corresponding port. Upon request, the kernel provides notification of the destruction of a receive right.

Port Name Space

Ports and port rights do not have system-wide names that allow arbitrary ports or rights to be manipulated directly. Ports can be manipulated only through port rights, and port rights can be manipulated only when they are contained within a port name space. A port right is specified by a port name which is an index into a port name space. Each task has associated with it a single port name space.

An entry in a port name space can have the following four possible values:

MACH_PORT_NULL—No associated port right.

MACH_PORT_DEAD—A right was associated with this name, but the port to which the right referred has been destroyed.

A port right—A send-once, send or receive right for a port.

A port set name—A name which acts like a receive right, but that allows receiving from multiple ports.

Acquiring a new right in a task generates a new port name. As port rights are manipulated by referring to their port names, the port names are sometimes themselves manipulated. All send and receive rights to a given port in a given port name space have the same port name. Each send-once right to a given port have a different port name from any other and from the port name used for any send or receive rights held. Operations supported for port names include the following:

Creation (implicit in creation of a right) and deletion
Query of the associated type
Rename Upon request, the kernel provides notification of a name becoming unusable.

Since port name spaces are bound to tasks, they are created and destroyed with their owning task.

Message

A message is a collection of data, memory regions and port rights passed between two entities. A message is not a system object in its own right. However, since messages are queued, they are significant because they can hold state between the time a message is sent and when it is received. This state consists of the following:

Pure data
Copies of memory ranges
Port rights
Sender's security token

Message Queues

A port consists of a queue of messages. This queue is manipulated only through message operations (mach_msg) that transmit messages. The state associated with a queue is the ordered set of messages queued, and settable limit on the number of messages.

Virtual Address Space

A virtual address space defines the set of valid virtual addresses that a thread executing within the task owning the virtual address space is allowed to reference. A virtual address space is named by its owning task.

A virtual address space consists of a sparsely populated indexed set of pages. The attributes of individual pages can be set as desired. For efficiency, the kernel groups virtually contiguous sets of pages that have the same attributes into internal memory regions. The kernel is free to split or merge memory regions as desired. System mechanisms are sensitive to the identities of memory regions, but most user accesses are not so affected, and can span memory regions freely.

A given memory range can have distinct semantics associated with it through the actions of a memory manager. When a new memory range is established in a virtual address space, an abstract memory object is specified, possibly by default, that represents the semantics of the memory range, by being associated with a task (a memory manager) that provides those semantics.

A virtual address space is created when a task is created, and destroyed when the task is destroyed. The initial contents of the address space is determined from various options to the task_create call, as well as the inheritance properties of the memory ranges of the prototype task used in that of call.

Most operations upon a virtual address space name a memory range within the address space. These operations include the following:

Creating or allocating, and de-allocating a range
Copying a range
Setting special attributes, including "wiring" the page into physical memory to prevent eviction
Setting memory protection attributes
Setting inheritance properties
Directly reading and writing ranges
Forcing a range flush to backing storage
Reserving a range (preventing random allocation within the range)

Abstract Memory Object

The microkernel allows user mode tasks to provide the semantics associated with referencing portions of a virtual address space. It does this by allowing the specification of an abstract memory object that represents the non-resident state of the memory ranges backed by this memory object. The task that implements this memory object and responds to messages sent to the port that names the memory object is called a memory manager.

The kernel should be viewed as using main memory as a directly accessible cache for the contents of the various memory objects. The kernel is involved in an asynchronous dialog with the various memory managers to maintain this cache, filling and flushing this cache as the kernel desires, by sending messages to the abstract memory object ports. The operations upon abstract memory objects include the following:

Initialization
Page reads
Page writes
Synchronization with force and flush operations
Requests for permission to access pages
Page copies
Termination Memory Object Representative The abstract memory object port is used by the kernel to request access to the backing storage for a memory object. Because of the protected nature of this dialog, memory managers do not typically give access to the abstract memory object port to clients. Instead, clients are given access to memory object representatives. A memory object representative is the client's representation of a memory object. There is only one operation permitted against such a port and that is to map the associated memory object into a task's address space. Making such a request initiates a protocol between the mapping kernel and the memory manager to initialize the underlying abstract memory object. It is through this special protocol that the kernel is informed of the abstract memory object represented by the representative, as well as the set of access modes permitted by the representative.

Memory Cache Object

The portion of the kernel's main memory cache that contains the resident pages associated with a given abstract memory object is referred to as the memory cache object. The memory manager for a memory object holds send rights to the kernel's memory cache object. The memory manager is involved in an asynchronous dialog with the kernel to provide the abstraction of its abstract memory object by sending messages to the associated memory cache object. The operations upon memory cache objects include the following:

Set operational attributes
Return attributes
Supply pages to the kernel
Indicate that pages requested by the kernel are not available
Indicate that pages requested by the kernel should be filled by the kernel's default rules Force delayed copies of the object to be completed
Indicate that pages sent to the memory manager have been disposed Restrict access to memory pages
Provide performance hints
Terminate Processor Each physical processor that is capable of executing threads is named by a processor control port. Although significant in that they perform the real work, processors are not very significant in the microkernel, other than as members of a processor set. It is a processor set that forms the basis for the pool of processors used to schedule a set of threads, and that has scheduling attributes associated with it. The operations supported for processors include the following:

Assignment to a processor set
Machine control, such as start and stop

Processor Set

Processors are grouped into processor sets. A processor set forms a pool of processors used to schedule the threads assigned to that processor set. A processor set exists as a basis to uniformly control the schedulability of a set of threads. The concept also provides a way to perform coarse allocation of processors to given activities in the system. The operations supported upon processor sets include the following:

Creation and deletion
Assignment of processors
Assignment of threads and tasks
Scheduling control Host Each machine (uniprocessor or multiprocessor) in a networked microkernel system runs its own instantiation of the microkernel. The host multiprocessor 100 is not generally manipulated by client tasks. But, since each host does carry its own microkernel 120, each with its own port space, physical memory and other resources, the executing host is visible and sometimes manipulated directly. Also, each host generates its own statistics. Hosts are named by a name port which is freely distributed and which can be used to obtain information about the host and a control port which is closely held and which can be used to manipulate the host. Operations supported by hosts include the following:

Clock manipulation
Statistics gathering
Re-boot
Setting the default memory manager
Obtaining lists of processors and processor sets Clock A clock provides a representation of the passage of time by incrementing a time value counter at a constant frequency. Each host or node in a multicomputer implements its own set of clocks based upon the various clocks and timers supported by the hardware as well as abstract clocks built upon these timers. The set of clocks implemented by a given system is set at configuration time. Each clock is named by both a name and a control or privileged port. The control port allows the time and resolution of the clock to be set. Given the name port, a task can perform the following:

Determine the time and resolution of the clock.
Generate a memory object that maps the time value.
Sleep (delay) until a given time.
Request a notification or alarm at a given time.

Section 3. Tasks and Threads

This section discusses the user visible view of threads and tasks. Threads are the active entities in the Microkernel System 115. They act as points of control within a task, which provides them with a virtual address space and a port name space with which other resources are accessed.

Threads

A thread is the basic computational entity. A thread belongs to only one task that defines its virtual address space. A thread is a lightweight entity with a minimum of state. A thread executes in the way dictated by the hardware, fetching instructions from its task's address space based on the thread's register values. The only actions a thread can take directly are to execute instructions that manipulate its registers and read and write into its memory space. An attempt to execute privileged machine instructions, though, causes an exception. The exception is discussed later. To affect the structure of the address space, or to reference any resource other than the address space, the thread must execute a special trap instruction which causes the kernel to perform operations on behalf of the thread, or to send a message to some agent on behalf of the thread. Also, faults or other illegal instruction behavior cause the kernel to invoke its exception processing.

Figure 2:
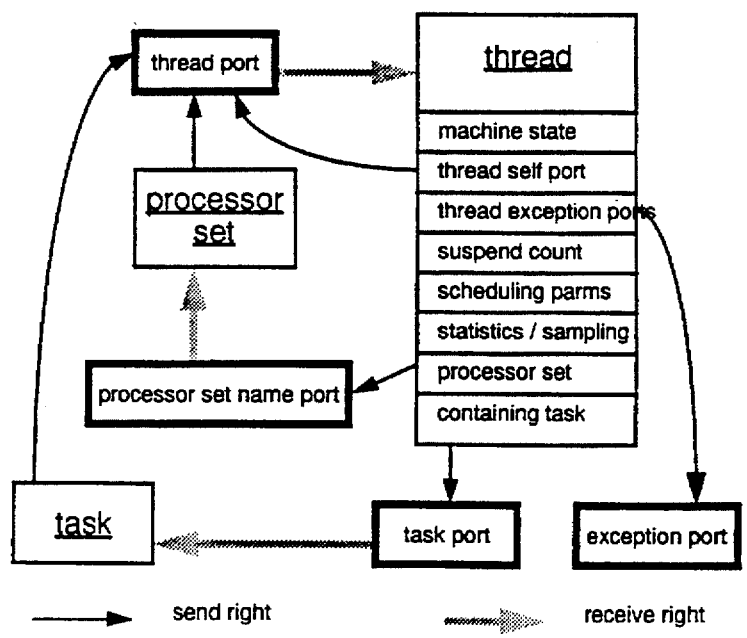
FIG. 2 shows the client visible structure associated with a thread.

FIG. 2. shows the client visible structure associated with a thread. The thread object is the receiver for messages sent to the kernel thread port. Aside from any random task that holds a send right for this thread port, the thread port is also accessible as the thread's thread self port, through the containing processor set or the containing task.

Actions by Threads

This section describes the details of the actions that a thread can take directly. A thread can do anything if it can gain rights to the correct ports and send messages to them. The various things it can do are discussed under the sections describing the object manipulated.

Scheduling Support Traps

The microkernel preemptively schedules threads. The way in which this is done is related to various factors. For now, it is sufficient to say that threads have scheduling priority associated with them which is used to select which threads should execute within a given processor set.

thread_switch causes a context switch with various options. It is provided for cases, such as software lock routines, that want to give up the processor so that other threads can make progress. The options have to do with selecting the appropriate new thread to run, when this information is available. One of the options of thread_switch causes the scheduling priority of the thread to be depressed to the lowest possible value so that other threads will run, and complete the work that blocks this depressed thread.

This priority depression is canceled when the given time expires, the thread is run despite the depression, thread→thread_abort is called, or thread→thread_depress_abort is called. Finally, the clock_sleep trap causes the thread to be delayed until a specified time. This delay can be aborted by thread_abort causing the clock_sleep to generate an error return.

Identity Traps

Other than the few traps mentioned in this section, all other requests for services require a port right. Even requests upon the kernel that manipulate the current thread or task need a port right (naming the current thread or task). To bootstrap this process, a thread needs a way, without any port right, to get the port right for itself and its task. These rights are obtained through the mach_thread_self and mach_task_self traps, respectively.

The port rights returned are actually the THREAD_KERNEL_PORT and TASK_KERNEL_PORT special ports last set through the thread→thread_set_special_port and task→task_set_special_port message calls. The default values for these special ports are the actual kernel thread and task ports, respectively. The creator of a task or thread can set these special port values before starting the thread or task so that the thread or task does not have access to its own kernel ports, but instead invokes some intermediate port when requesting services to be done to itself. The kernel also provides a trap, mach_host_self, which returns a send right to the host's name port for the task.

Bootstrap Reply Port Trap

The mach_reply_port trap is also used for bootstrap purposes. As mentioned earlier, if a service request is to return a reply, a second port is needed. This trap is used to create an initial reply port (a receive right) that can then be used for all other port related calls. If the task's self port is null, which deactivates use of microkernel services against the task, this call returns null as well.

Message Send and Receive Trap

The final, and most important trap, is mach_msg_trap. This trap is invoked by the mach_msg library routine. It provides access to all other system services. It sends and/or receives a message to/from a port named by a given right. The semantics of this call are involved, and described in detail in the Kernel Programming Reference document, and also in various sections in this document.

Exception Processing

When an exception occurs in a thread, the thread executes in kernel context and sends a message whose contents describe the exception to an exception port. The exceptions are listed under catch_exception_raise in the Kernel Programming Reference document. A successful reply to this message causes the thread to continue in a state possibly altered by thread_set_state. For any given exception, there are two exception ports that apply:

A thread specific port for the specific type of exception.
A task port for the specific type of exception.

The thread specific ports are set with thread→thread_set_exception_ports and read with thread→thread_get_exception_ports. The task ports are set with task→task_set_exception_ports and read with task→task_get_exception_ports. The thread→thread_swap_exception_ports and task→task_swap_exception_ports calls set and return the previous exception ports, performing an atomic swap.

The kernel selects the first of these ports in the order listed, as the destination of the exception message, if it is defined. Whereas a successful reply causes the thread to continue, an unsuccessful reply causes the kernel to send an exception message to the second port. If neither exception message receives a successful reply, the thread is terminated.

The kernel can send various exception message formats, as selected when the exception port was set:

exception_port→catch_exception_raise—A message indicating the identity of the faulting thread, the task and thread self ports, and the type of exception and status codes.

exception_port→catch_exception_raise_state—A message indicating the type of exception, status codes, and a flavor of thread state with register values selected when the exception port was set. The thread state is both input and output, allowing the reply to change the thread state.

exception_port→catch_exception_raise_state_identity—The catch_exception_raise_state message with the inclusion of the task and thread ports.

Not every exceptional condition that a thread encounters is handled in this way. A page not resident fault does not send a message to the exception port. Instead, a message is sent to the external memory manager associated with the memory page in which the faulting address lies. This is discussed as part of virtual memory. The general exception rule does not always apply to the system call instruction(s). First of all, several of the possible system call numbers are subsumed for microkernel calls. The remaining system call numbers are initially undefined. An attempt to execute them results in an exception of EXC_SW_EMULATION as described above.

Actions on Threads

The following section lists the various functions that can be done to a thread, given a send right to the kernel's thread port.

Life and Death

A thread is created via task→thread_create and destroyed via thread→thread_terminate. Since a thread belongs to a given task, thread creation is actually an operation performed upon a task. The result is a send right to the kernel's thread port for the new thread. A list of the kernel thread ports for all of the threads in a given task can be obtained with task→task_threads. A newly created thread is in the suspended state. This is the same as if thread→thread_suspend had been called prior to its executing its first instruction. A suspended thread does not execute. A thread is created in the suspended state so that its machine state can be properly set before it is started. To remove a thread from the suspended state (to decrement its suspend count), thread→thread_resume is used.

As an optimization, the sequence of steps necessary to create a running thread- thread_create, thread_set_state and thread_resume—are combined in the task→thread_create_running call.

Thread State

A thread has two main sets of state, its machine state and a set of special ports. The machine state for a thread is obtained using thread→thread_get_state and set using thread→thread_set_state. The result of setting a thread's state at a random point is undefined. Various steps are needed to obtain a deterministic result.

thread→thread_suspend is used to stop the thread. This, and the following step, are unnecessary if the thread has just been created and has yet to run. They are needed, though, for exception processing or for asynchronous interruption such as signal delivery.

thread→thread_abort is called. This causes any system call (really, mach_msg or any related message call, such as exception or page missing messages) to be aborted. Aborting a message call sets the thread's state to be at the point after the system call, with a return value indicating interruption of the call. Aborting a page fault or exception leaves the thread at the point of the page fault or exception; resuming the thread causes it to retake the page fault or exception. thread_abort aborts non-recoverable system calls such as multi-page memory management operations. thread→thread_set_state can then be safely used.

thread→thread_resume restarts the thread.

A thread currently has only one "special" port associated with it. This is the value for the thread to use to request operations upon itself. This is normally the same as the kernel thread port, but can be different if so set, most likely by the creator of the thread. This port is returned by thread→thread_get_special_port and set by thread→thread_set_special_port.

Various pieces of kernel thread state, such as the suspend count and scheduling information, can be obtained using thread→thread_info.

Scheduling Control

The following functions affect the scheduling of a thread. They are described under physical resource management.

thread, processor_set_control→thread_assign
thread→thread_assign_default
thread→thread_get_assignment
thread (processor_set_control)→thread_set_policy thread→thread_policy
thread (host_control)→thread_wire
thread→thread_priority
thread (processor_set_control)→thread_max_priority The thread_wire call marks the thread as "wired", which means privileged with respect to kernel resource management. A "wired" thread is always eligible to be scheduled and can consume memory even when free memory is scarce. This property is assigned to threads within the default page-out path. Threads not in the default page-out path should not have this property to prevent the kernel's free list of pages from being exhausted.

Tasks

A task can be viewed as a container that holds a set of threads. It contains default values to be applied to its containing threads. Most importantly, it contains those elements that its containing threads need to execute, namely, a port name space and a virtual address space.

Figure 3:
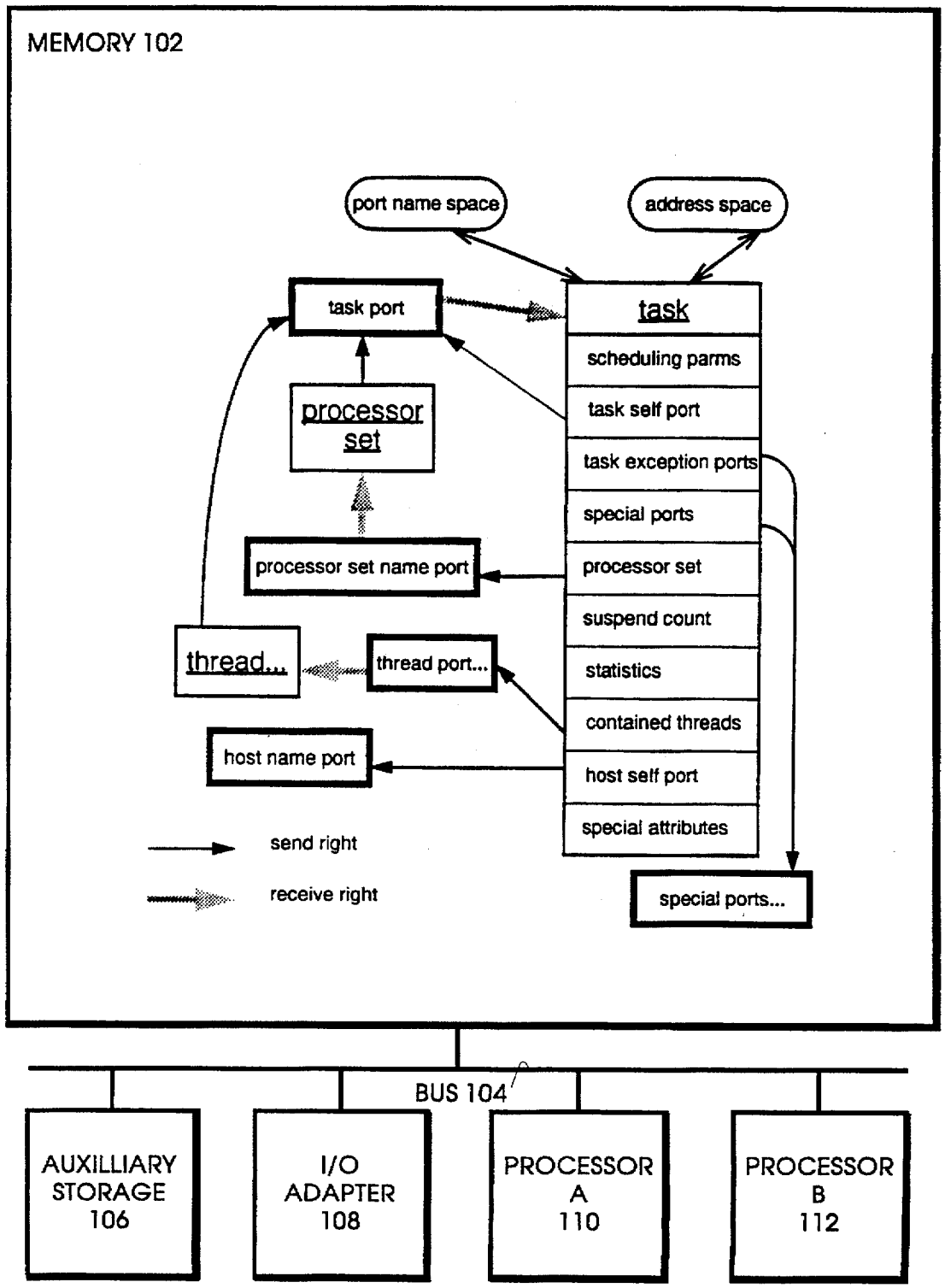
FIG. 3 shows the client visible task structures.

FIG. 3. shows the client visible task structures. The task object is the receiver for messages sent to the kernel task port. Aside from any random task that may hold a send right to the task port, the task port can be derived from the task's task self port, the contained threads or the containing processor set.

Life and Death

A new task is created with task→task_create. Note that task creation is an operation requested of an existing prototype task. The new task can either be created with an empty virtual address space, or one inherited from the parent task. The new task's port name space is empty. The new task inherits the parent task's PC sampling state, special and exception ports. A task is destroyed with task→task_terminate. This operation is requested of the task to be destroyed, not the parent specified in its creation. The task's virtual address space and port name space are destroyed.

Various statistics about the task can be obtained with task→task_info

Special Ports

Aside from its associated port name space, a task also has a small set of special ports.

A task has the following special ports associated with it:

A port the task uses to request operations upon itself. This is normally the same as the kernel task port, but can be different if so set.

A bootstrap port, which can be used for anything, but which is intended as the initial port a task holds to something other than itself, for use in locating other services.

A port used to request information of the containing host, normally the same as the host name port.

These ports are returned by task→task_get_special_port and set by task→task_set_special_port. The value of these ports in a new task are inherited from the task that was the target of the task_create call, with the exception of the task self port. A task also has exception ports, as described under exception processing, inherited from the parent task.

Thread Management

A thread belongs to one and only one task. Threads are created with task→thread_create. The set of threads present in a task can be found with task→task_threads.

Although a task does not itself execute, some execution properties can be set for a task which will then apply to its contained threads. All of the threads in a task can be suspended or resumed together by task→task_suspend and task→task_resume. These operations do not affect the threads' suspend counts; they affect the task's suspend count. A thread can execute only if both its and its task's suspend counts are zero. The default scheduling properties for threads can be set with the following:

task, processor_set_control→task_assign
task→task_assign_default
task→task_get_assignment
task→task_priority Identity Each task is labeled with a security token which is not interpreted by the kernel. It is sent in messages sent by the task for use by trusted servers in access mediation decisions concerning the requestor of service. This security token is inherited from the parent task by task_create. It can be changed only with the privileged task (security)→task_set_security_token call. The security port is a privileged port provided to the bootstrap task whose sole purpose is to support the setting or changing of task identity.

Section 4. IPC

With the exception of its shared memory, a microkernel task interacts with its environment purely by sending messages and receiving replies. These messages are sent using ports. A port is a communication channel that has a single receiver and can have multiple senders. A task holds rights to these ports that specify its ability to send or receive messages.

Ports

A port is a unidirectional communication channel between a client who requests a service and a server who provides the service. A port has a single receiver and can have multiple senders. A port that represents a kernel supported resource has the kernel as the receiver. A port that names a service provided by a task has that task as the port's receiver. This receivership can change if desired, as discussed under port rights.

Figure 4:
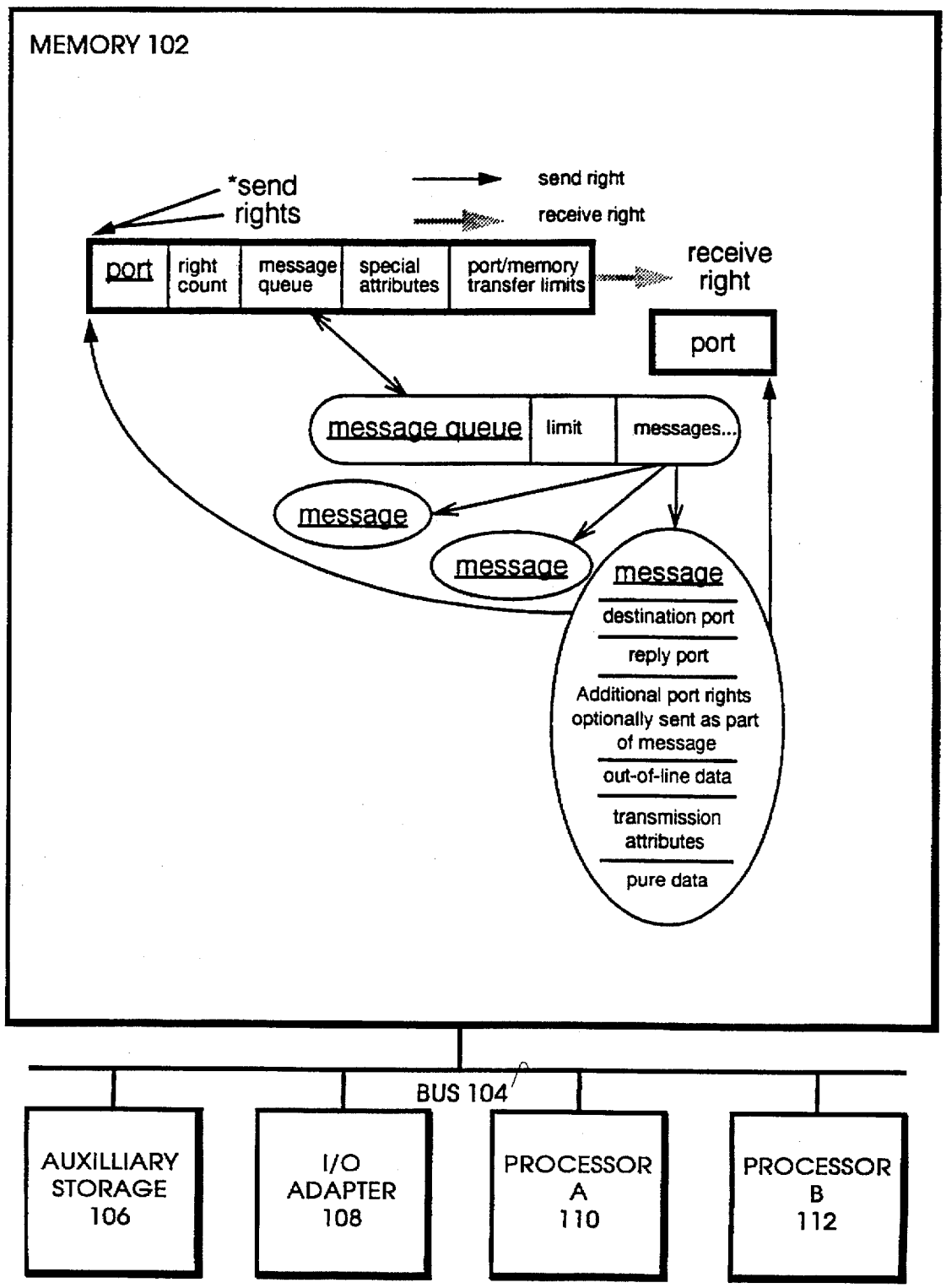
FIG. 4 shows a typical port, illustrating a series of send rights and the single receive right.

The state associated with a port is:
The associated message queue
A count of references or rights to the port
Port right and out-of-line memory receive limits
Message sequence number
Number of send rights created from receive right
Containing port set
Name of no-more-sender port if specified FIG. 4 shows a typical port, illustrating a series of send rights and the single receive right. The associated message queue has a series of ordered messages. One of the messages is shown in detail, showing its destination port, reply port reference, a send-and-receive right being passed in the message, as well as some out-of-line or virtual copy memory.

Few operations affect the port itself. Most operations affect port rights or a port name space containing those rights, or affect the message queue. Ports are created implicitly when any other system entity is created. Also, mach_reply_port creates a port. Ports are created explicitly by port_name_space [port_name]→mach_port_allocate and port_name_space [port_name]→mach_port_allocate_name. A port cannot be explicitly destroyed. It is destroyed only when the receive right is destroyed.

The attributes of a port are assigned at the time of creation. Some of these attributes, such as the limit on the number of port rights or amount of out-of-line memory that can be received in a message can be changed with port_name_space [port_name]→mach_port_set_attributes. These attributes can be obtained with port_name_space [port_name]→mach_port_get_attributes.

The existence of ports is of obvious importance to all involved. As such, many tasks using a port may wish to be notified, through a message, when the port dies. Such notifications are requested with an option to mach_msg (MACH_RCV_NOTIFY), as well as with port_name_ space [port_name]→mach_port_request_notification. The resultant dead name notification indicates that a task's port name has gone dead because of the destruction of the named port. The message indicates the task's name for the now dead port. (This is discussed under port name spaces.).

Messages

A message is a collection of data, out-of-line memory regions, and port rights passed between two entities. A message is not a manipulable system object in its own right. However, because messages are queued, they are significant because they can hold state between the time a message is sent and the time it is received. Besides pure data, a message can also contain port rights. This is significant. In this way a task obtains new rights, by receiving them in a message.

A message consists of an Interprocess Communication (IPC) subsystem parsed control section and a data section. In addition, the message may point to regions of data to be transferred which lie outside the message proper. These regions may contain port rights (out of line port arrays). A message also carries the sender's security token. The control section of a message is made up of a header and optionally a message body and one or more message descriptors. The header specifies a port name for the port to which the message is sent and an auxiliary port name for the port to which a reply is to be sent if a reply is requested.

The message body, when present, follows the header and declares the number of descriptors to follow. If there are no descriptors, the message is not considered "complex", meaning no overt translation or copying of data is required of the IPC subsystem. Non "complex" messages do not contain a message body. Each descriptor describes a section of kernel manipulated data such as an out-of-line memory region, port right, and port right array. The data contained in the message data section is treated as an anonymous array of bytes by the IPC subsystem. Both the sender and receiver of the message must share a common understanding of the data format. For messages that originate in a Message Interface Generator (MIG) generated routine, the first eight bytes of data contain machine encoding information for possible intermachine conversion of data contained in the message.

A descriptor for a single port right names the right as well as any special transformations performed by mach_msg, such as moving the right instead of making a copy or generating a right from a right of a different type. A descriptor for an "out-of-line" port array also specifies the IPC processing for the set of rights, which must all be of the same type, but specifies the address and size of an array of port names.

An out-of-line data descriptor specifies the size and address of the out-of-line region. The region need not start at the beginning of a page nor contain an integral number of pages. Only the specified data is logically transmitted. The descriptor can specify that the act of queuing the message will de-allocate the memory range, as if by vm_deallocate, from the sending task. The sender is given the choice of sending a physical or virtual copy of the data. Requesting a virtual copy permits the kernel to use its virtual copy, that is, copy-on-write, mechanisms to efficiently copy large amounts of data. As a result, the receiver may see a virtual copy that is backed by a sender memory manager. Both sender and receiver might experience indeterminacy in access time to the memory because of the potential virtual copy mechanisms used. The choice of a physical copy guarantees deterministic access by the sender and receiver to the data. Neither the values in the out-of-line data regions or in the message data are typed. Only the receiver of a message, with the knowledge of the port over which it came and the message data, can interpret and possibly transform these data areas.

Message Trailers

When a message is received, a trailer is appended to the end by default. The trailer is generally added by the IPC subsystem and is physically contiguous with the message. The trailer contains various transmission-related fields, such as message sequence number and sender security token.

The format and size of the trailer are controllable via receive side options to mach_msg. It is also possible as an option for the sender to supply a trailer.

Message Queues

A port consists of a queue of messages. The queue is manipulated only through message operations (mach_msg) that transmit messages. The only controllable state for a message queue is its size. This can be set when port_name_space [port_name]→mach_port_set_attributes is given the receive right for the associated port. If a message queue is full, no more messages can be queued. The callers will block.

Messages sent to a port are delivered reliably. Reception of a message guarantees that all previous messages were received and that they were received in the order in which they were queued on the receive port.

Port Rights

A port right is an entity that indicates the right to access a specific port in a specific way. A port can only be accessed through a port right. In this context, there are three types of port rights as follows:

receive right—Allows the holder to receive messages from the associated port.

send right—Allows the holder to send messages to the associated port.

send-once right—Allows the holder to send a single message to the associated port. The right self-destructs after the message is sent.

Port rights are a secure, location independent way of identifying ports. These rights are kernel protected entities. Clients manipulate port rights only through port names they have to these rights.

Basic Manipulation mach_msg is one of the principal ways that rights are manipulated. Port rights can be moved between tasks, that is, deleted from the sender and added to the receiver in messages. Option flags in a message can cause mach_msg to make a copy of an existing send right, or to generate a send or a send-once right from a receive right. Rights can also be forcefully copied or moved by port_name_space [port_name]→mach_port_extract_right (the equivalent of the target sending the right in a message) and port_name_space [port_name]→mach_port_insert_right (the equivalent of the target receiving the right in a message). Besides message operations, port rights can be manipulated only as members of a port name space.

Figure 5:
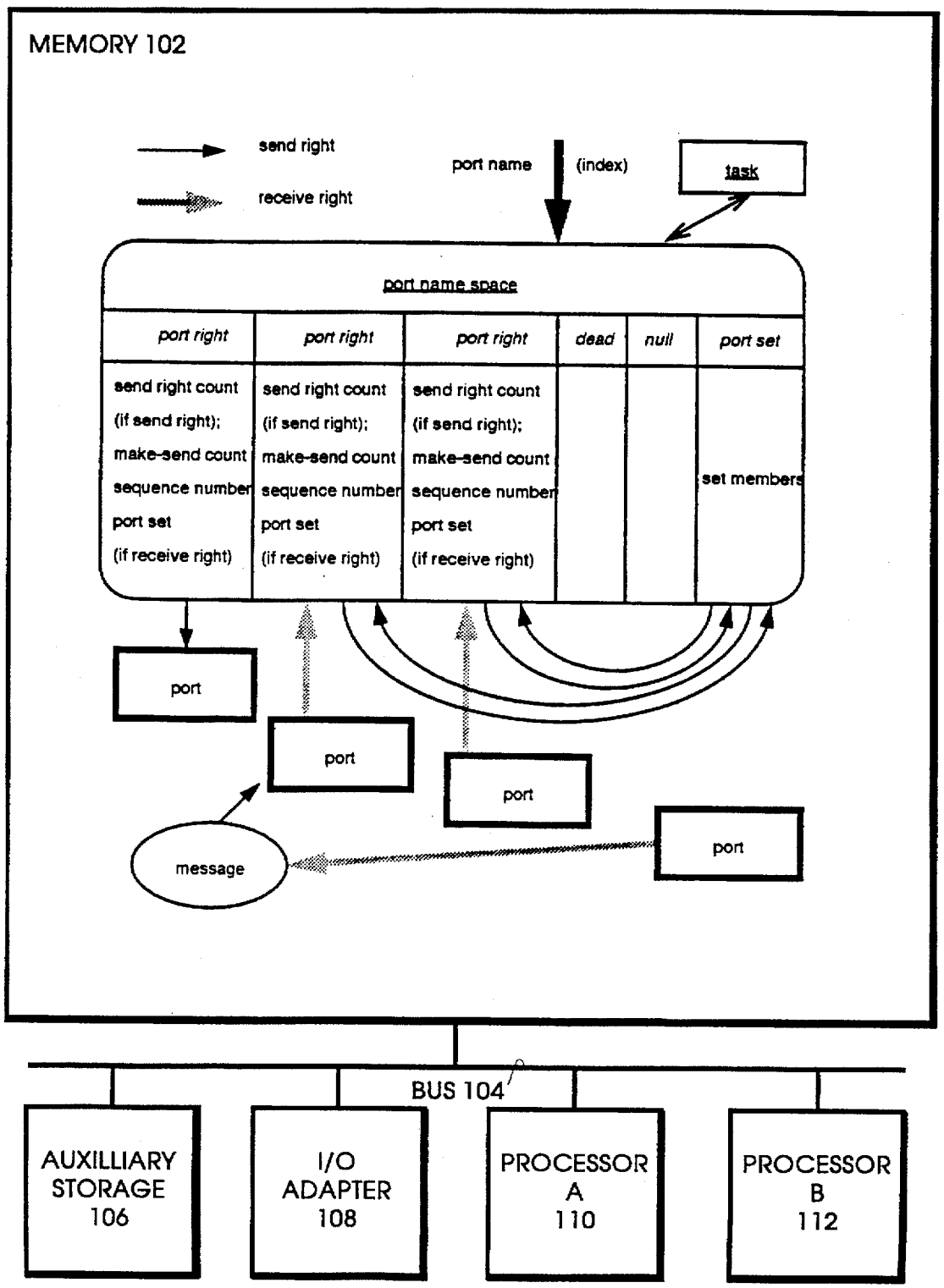
FIG. 5 shows a series of port rights, contained in a port name space or in transit in a message.

FIG. 5. shows a series of port rights, contained in a port name space or in transit in a message. A port set is also shown in the port name space.

Port rights are created implicitly when any other system entity is created. Mach_reply_port creates a port right. Port rights are created explicitly by port_name_space [port_name]→mach_port_allocate and port_name_space [port_name]→mach_port_allocate_name. A port right is destroyed by port_name_space [port_name]→mach_port_deallocate and port_name_space [port_name]→mach_port_destroy. Destruction can also be a by-product of port name space manipulations, such as by port_name_space [port_name]→mach_port_mod_refs.

Given a receive right, some status information can be obtained with port_name_space [port_name]→mach_port_get_attributes.

No-More-Senders Notification

The system maintains a system-wide count of the number of send and send-once rights for each port. This includes rights in transit in messages, including the destination and reply port rights. The receiver of a port may wish to know if there are no more send rights for the port, indicating that the port may no longer have value. A notification of this form can be requested using port_name_space [port_name] →mach_port_request_notification. This notification depends on the concept of a make-send count, discussed as a part of port name spaces. The movement to another task of the receive right cancels the outstanding no-more-senders notification request, and sends a send-once notification to indicate this cancelation. No-more-senders notification occurs when the number of existing send rights goes to zero without regards to the number of outstanding send-once rights.

Send-Once Rights

A send-once right allows a single message to be sent. These rights are generated only from the receive right. A send-once right has the property that it guarantees that a message will result from it. In the normal case, a send-once right is consumed by using it as the destination port in a message. The right is silently destroyed when the message is received. The send-once right can be moved from task to task when it is not being used as a destination right, until such time as it is consumed. If the right is destroyed in any way other than by using it to send a message, a send-once notification is sent to the port. Most of the ways in which a send-once right can be destroyed, when it is not used, are fairly obvious. There are two obscure cases:

The send-once right was specified as the target for a no-senders notification and the port for which the no-senders notification was requested is deleted or the receive right moved. Since there will be no forth coming no-senders notification, a send-once notification is generated instead.

In the process of performing a message receive, the task gives away its receive right after the message is de-queued from the port but prior to its being returned to the task (refer to the details of message transmission below). A send-once notification is sent to the destination port signifying the lost association between the message sent via the send- once right and the port.

Port Name Space

Ports are not named, but port rights are. A port right can only be named by being contained within a port name space. A port is specified by a port name which is an index into a port name space. Each task is associated with a port name space.

An entry in a port name space can have four possible values:

MACH_PORT_NULL—No associated port right.

MACH_PORT_DEAD—A right was associated with this name, but the port to which the right referred is now dead. The port name is kept in this state until explicit action is taken to avoid reusing this name before the client task understands what happened.

a port right—A send-once, send or receive right for a port.

a port set name—A name which acts like a receive right, but that allows receiving from multiple ports. This is discussed in the next section.

Each distinct right that a port name space contains does not necessarily have a distinct name in the port name space. Send-once rights always consume a separate name for each distinct right. Receive and send rights to the same port coalesce. That is, if a port name space holds three send rights for a port, it will have a single name for all three rights. A port name has an associated reference count for each type of right such as send-once, send, receive, port set, and dead name, that is associated with the name. If the port name space also holds the receive right, that receive right will have the same name as the send right.

A name becomes dead when its associated port is destroyed. It follows that a task holding a dead name cannot be holding a receive right under that name as well. The dead name only has a non-zero reference count for the number of send references previously held by that name. A task can be notified with a message sent to it, when one of its names becomes dead using port_name_space [port_name] →mach_port_request_notification. Receiving this notification message increments the reference count for the dead name, to avoid a race with any threads manipulating the name.

Whenever a task acquires a right, it is assigned a port name subject to the above rules. Acquiring a right increments the name's reference count for the type of that right. The reference count can be obtained with port_name_space [port_name]→mach_port_get_refs.

Although a port name can be explicitly destroyed and all references removed using port_name_space [port_name] →mach_port_destroy, port names are typically manipulated by modifying the user reference count. port_name_space [port_name]→mach_port_mod_refs modifies the reference count for a specified right type associated with a name. port_name_space [port_name]→mach_port_deallocate is similar to mach_port_mod_refs, but it always decrements the count by 1, and it will only decrement the send or send-once reference count. This routine is useful for manipulating the reference count for a port name that may have become dead since the decision was made to modify the name. Options to mach_msg that actually move a right and also port_name_space [port_name]→mach_port_extract_right can cause the name's reference count to be decremented. Port names are freed when all the reference counts go to zero.

If a port name is freed and a dead-name notification is in effect for the name, a port- deleted notification is generated. A name with a dead-name notification request in effect can be in only one of three states:

Naming a valid right

MACH_PORT_DEAD, with a dead-name notification having been sent when the name became dead MACH_PORT_NULL, with a port-deleted notification having been sent when the name became null Information about a name, such as, the type of the name, can be obtained with port_name_space [port_name] →mach_port_type. The list of assigned names is obtained with port_name_space [port_name]→mach_port_names. The name by which a right is known can be changed with port_name_space [port_name]→mach_port_rename. Given a receive right name, some status information can be obtained, with port_name_space [port_name] →mach_port_get_attributes.

Port names that name receive rights have an associated make-send count, used for no- more-sender notification processing. The make-send count is the kernel's count of the number of times a send right was made from the receive right (with a message element that is a port right specifying a MACH_MSG_TYPE_MAKE_SEND type descriptor for mach_msg). This make-send count is set to zero when a port is created, and reset to zero whenever the receive right is transmitted in a message. It can also be changed with port_name_space [port_name]→mach_port_set_mscount. The make-send count is included in the no-more-senders notification message. Note that a no-senders notification indicates the lack of send rights at the time the notification was generated. There may still be outstanding send-once rights. A task can easily keep track of the send-once rights since every send-once right guarantees a message or send-once notification. Received messages are stamped with a sequence number, taken from the port from which the message was received. Messages received from a port set are stamped with a sequence number from the appropriate member port. Sequence numbers placed into sent messages are overwritten. Newly created ports start with a zero sequence number, and the sequence number is reset to zero whenever the port's receive right is moved. It can also be set explicitly with port_name_space [port_name]→mach_port_set_seqno. When a message is de-queued from the port, it is stamped with the port's sequence number and the port's sequence number is then incremented. The de-queue and increment operations are atomic, so that multiple threads receiving messages from a port can use the msgh_seqno field to reconstruct the original order of the messages.

Since port name spaces are bound to tasks, they are created and destroyed with their owning task.

Port Sets

A port set is a set of ports that can be treated as a single unit when receiving a message. A mach_msg receive operation is allowed against a port name that either names a receive right, or a port set. A port set contains a collection of receive rights. When a receive operation is performed against a port set, a message will be received at random from one of the ports in the set. The order of delivery of messages on a port set is indeterminate and subject to implementation with the following two caveats:

1) No member of a port set shall suffer resource starvation.
2) The order of arrival of a message with respect to other messages on the same port is preserved.

Each of the receive rights in the set has its own name, and the set has its own name. A receive against a port set reports the name of the receive right whose port provided the message. A receive right can belong to only one port set. A task may not directly receive from a receive right that is in a port set. A port set is created with port_name_space [port_name]→mach_port_allocate or port_name_space [port_name]→mach_port_allocate_name. It is destroyed by port_name_space [port_name]→mach_port_destroy or port_name_space [port_name]→mach_port_deallocate.

Manipulations of port sets is done with port_name_space [port_name]→mach_port_move_member. This call can add a member to a set, remove it from a set, or move it from one set to another. The membership of a port set can be found with port_name_space [port_name]→mach_port_get_set_status.

Message Transmission

The mach_msg system call sends and receives microkernel messages. For a message to actually be transferred between two tasks, the sender must make a mach_msg call with the send option and the proper target port. The receiver must make a mach_msg call with the receive option, undertaking a receive on the target port. The order of the two calls is unimportant.

The send operation queues a message to a port. The message carries a copy of the caller's data. The caller can freely modify the message buffer and out-of-line regions after the send operation returns without affecting the data sent. Data specified as out-of-line in the message is passed as a virtual copy or a physical copy depending on sender options and the kernel's choice of mechanisms. The kernel constructs a virtual memory image of the set of pages that define the region. "Out-of-line" port arrays are physically copied and translated to port names appropriate to the destination space. If the kernel constructs a virtual copy, it zeroes the portion of the first page preceding the data in the virtual copy and the portion of the last page following the data in the virtual copy.

The caller blocks until the message can be queued, unless one of the following happens:

The message is being sent to a send-once right. These messages always forcibly queue.

The mach_msg operation is aborted (thread_abort). By default, the mach_msg library routine retries operations that are interrupted.

The send operation exceeds its time-out value.

The port is destroyed.

Sending a message is a two-step process. The first step involves constructing a kernel copy of the message. The second step involves the queuing of the message. Failures during the first step, such as invalid port rights or data addresses, cause the message send to fail with an error return, but with no ill effect. Failures during the second step may also occur when the send time-out value is exceeded or an interrupt (thread_abort) occurs. These failures also cause the send to fail, but in these situations the kernel tries to return the message contents to the caller with a pseudo-receive operation. This pseudo-receive operation prevents the loss of port rights or memory that only exist in the message (for example, a receive right that was moved into the message, or out-of-line memory sent with the de-allocate flag).

The pseudo-receive operation is very similar to a normal receive operation. The pseudo-receive handles the port rights in the message header as if they were in the message body. After the pseudo-receive, the message is ready to be resent. Notice that if the message is not resent, out-of-line memory ranges may have moved and some port rights may have changed names.

The receive operation de-queues a message from a port. The receiving task acquires the port rights and out-of-line memory ranges carried in the message. The caller must supply a buffer into which the header and body will be copied. The format of the received message is the same as when sent. If the message does not fit, it is destroyed. An option (MACH_RCV_LARGE) allows the caller to receive an error instead, along with the buffer size that would be needed, so that another receive operation can be attempted with an appropriate sized buffer.

A received message can contain port rights and out-of-line memory. Received port rights and memory should be consumed or de-allocated in some fashion. Resource shortages that prevent the reception of a port right or out-of-line memory destroy that entity. The reception of port rights follows the same rules as the insertion of a port right by any other means as described under port name spaces. The port right descriptors describe the type of rights received.

For each out-of-line region transmitted, the kernel returns a descriptor in the received message which locates the memory and indicates whether the kernel has chosen (or has been directed by the sender) to send a physical or virtual copy. Sending a physical copy guarantees deterministic behavior. Although backed by the default memory manager, the kernel's virtual copy optimizations might use the page images already in memory or might fetch page images from the memory manager that backed the sender's memory. Although this can subject the receiving task to an arbitrary memory manager, it can yield significant performance improvement over the direct copying of large amounts of memory. The optimal case for a virtual copy is when the sender has used the de-allocate option. See Virtual Memory Management for additional information. There are two options for the reception of an out-of-line or port array memory region. In option one, the default case, the received region is dynamically allocated as temporary memory in the receiver's address space, as if by vm__allocate. If the kernel transmitted a virtual copy, the received data appears in allocated space at the same alignment within a page as that of the sender. In all other cases the allocated data starts at the beginning of a page boundary. Under no circumstances does the reception of a message with this option stall the receiver by inadvertently referencing the virtual copy itself.

In option two, the alternate out of line reception mode causes the out-of-line region to overwrite the bytes in a specified area as if by vm__write. If the region does not fit in the specified area, the receiver sees an error. Under various circumstances, depending on the method of data transmission and data alignments, this option might perform page manipulations or actually copy data. This operation might possibly interact with the memory managers backing any virtual copies and arbitrarily stall the receiver. The choice of the two reception modes depends on the MACH__RCV_OVERWRITE option. When not set, all received regions are dynamically allocated. If set, the receive buffer is considered to describe a "scatter" descriptor list, of the same form as a descriptor list in a sent message. The kernel scans this list to determine what to do with each received region. If not enough descriptors are supplied to handle the sent number of regions, any additional regions are dynamically allocated. The kernel looks at each out- of-line descriptor to determine the disposition of the corresponding region. A "sending" option of virtual copy implies dynamic allocation, an option of physical copy implies overwrite with the address and size fields of the descriptor used to locate the region to be overwritten. An insufficient size causes an error return.

The receive operation is also a two-step process: de-queue the message and then make a copy in the receiver. The first step might fail because the specified receive time-out value was exceeded or because the receive was aborted (thread__abort). These situations do not affect the message that would have been received. Most failures occur during the second step causing the message to be destroyed.

There is a notification that can be requested as a result of a mach__msg call. The notification is not generated by mach__msg, but is requested by the MACH__RCV__NOTIFY option. This option causes the reply port right that is received to automatically have a dead name notification requested for it as if by mach__port__request__notification. This option is an optimization for a certain class of RPC interactions. The dead name notification on the reply port name allows the receiver of the message to be informed in a timely manner of the death of the requesting client.

However, since the reply right is typically a send-once right, sending the reply destroys the right and generate a port-deleted notification instead. An optimization to cancel this notification is provided by the MACH__SEND__CANCEL option to mach__msg. Message operations are atomic with respect to the manipulation of port rights in message headers.

Section 5. Virtual Memory Management

The Microkernel's virtual memory design layers the virtual memory system into machine-dependent and machine-independent portions. The machine-dependent portion provides a simple interface for validating, invalidating, and setting the access rights for pages of virtual memory, thereby maintaining the hardware address maps. The machine independent portion provides support for logical address maps (mapping a virtual address space), memory ranges within this map, and the interface to the backing storage (memory objects) for these ranges through the external memory management interface.

The virtual memory system is designed for uniform memory access multiprocessors of a moderate number of processors. Support for architectures providing non-uniform memory access or no remote memory access is currently being investigated.

High performance is a feature of the microkernel virtual memory design. Much of this results from its efficient support of large, sparse address spaces, shared memory, and virtual copy memory optimizations.

Finally, the virtual memory system allows clients to provide the backing storage for memory ranges, thereby defining the semantics that apply to such ranges.

Virtual Address Spaces

A virtual address space defines the set of valid virtual addresses that a thread executing within the task owning the virtual address space is allowed to reference. A virtual address space is named by its owning task.

A virtual address space consists of a sparsely populated indexed set of memory pages. The size of a page can be found with host__name→host__page__size. The kernel internally groups virtually contiguous sets of pages that all have the same attributes (such as backing abstract memory object, inheritance, protection and other properties) into internal entities called memory regions. Memory regions are named only by their virtual address ranges within their containing address space. Various operations and system mechanisms are sensitive to the identities of memory regions, but most user accesses are not so affected, and can span memory regions freely. The kernel is free to split and merge memory regions as it sees fit; the client view of its address space is as a set of pages. The only call that is sensitive to memory regions is virtual__address__space [memory__address] →vm__region. This call locates the region near a given address, and returns information about that memory region. Memory regions are purely a kernel internal concept, but are affected by vm__map calls, as well as by changing protection and inheritance attributes. Therefore, the result of this call can change from invocation to invocation.

A virtual address space is created when a task is created, and destroyed when the task is destroyed. When a new task is created, ignoring inheritance, its address space is empty and must be built through manipulations of the virtual address space before the task can have threads set into execution. An option, though, to the task__create call allows the new task to inherit ranges of memory from the prototype task used in the create call. The kernel function virtual__address__space [memory__range]→vm__inherit can change the inheritance properties for a memory range, to allow or disallow inheritance. The possibilities for inheritance are:

VM__INHERIT__NONE—The range is left undefined in the new task.

VM__INHERIT__COPY—The range is copied with copy optimizations into the new task at the time of task creation.

VM__INHERIT__SHARE—The new and old tasks share access to the memory range.

A range of memory can have distinct semantics associated with it through the actions of a memory manager. When a new memory range is established in a virtual address space, an abstract memory object is specified, possibly by default, that represents the semantics of the memory range. The abstract memory object is associated with a task (a memory manager) that provides the semantics. No kernel calls exist for a task to directly affect the semantics associated with its memory ranges. A task has such control only by virtue of choosing memory managers that provide the functionality desired, or by sending messages directly to its memory managers to direct their actions.

virtual_address_space [memory_range]→vm_map Establish a new range of virtual memory. This call specifies the details of the memory range, such as placement, size, protection, inheritance, and object offset. The most significant parameter to this call is a memory object representative port that implies the abstract memory object that backs the storage for the range as well as the allowed access modes to the memory object. A null port specifies that the system's default memory manager is to be used. The default memory manager provides initially zero-filled storage that is paged against the system's paging space and that does not persist between system boot-loads.

virtual_address_space [memory_range]→vm_allocate A simplified form of the vm_map call when the default memory manager is desired.

virtual_address_space [memory range]→vm_deallocate Invalidates a memory range. virtual_address_space [memory_range]→vm_remap—Creates a memory range in the target task's address space as if it were created via task→taste_create, where the prototype task is the source task and the source memory range has the VM_INHERIT_SHARE property.

virtual_address_space [memory_range]→vm_protect—Set the allowed accesses for a memory range. Each memory range has a current and a maximum protection mask. The memory manager for a range can specify the maximum protections for all users of a range of pages through the memory object representative. Each task then has its own private maximum protection value to further restrict the allowed permissions, as well as its current protection mask.

virtual_address_space [memory_range]→vm_copy—Copy a memory range from one place in a virtual address space to another. virtual_address_space [memory_range]→vm_read—Copy out a memory range.

virtual_address_space [memory_range]→vm_write—Copy in a memory range.

virtual_address_space [memory_range]→vm_msync—Force flush or clean a range of virtual memory to backing storage (its memory manager).

virtual_address_space [memory_range]→vm_machine_attribute—Set machine specific hardware properties for the memory range. virtual_address_space [memory_range]→vm_reserve—Reserve a range of memory, thereby preventing random allocation within the range resulting from vm_allocate, vm_map or out-of-line memory reception. vm_deallocate does not unreserve a region. virtual_address_space [memory_range]→vm_unreserve—Unreserve a range of memory.

virtual_address_space [memory_range]→vm_wire—Specify the pageability of a range of memory. Wiring forces a range of memory to be and stay resident. Wired memory is counted against the task's wired kernel memory limit. The kernel maintains a count of the number of times a region is wired and does not un-wire it until the count returns to zero.

virtual_address_space [memory_range]→vm_behavior_set—Specify the expected usage pattern, such as normal, random, sequential, and reverse sequential, for the range as a hint to guide the kernel's page replacement algorithms.

vm_allocate( ), vm_map( ), or vm_remap( ), when used with the VM_ALLOCATE_ANYWHERE flag, and an input target address of 0, can cause a valid memory region to be allocated at address 0. Some programs, particularly those based on the C language, consider a memory pointer whose value is 0 to be a NULL pointer, not a pointer to a valid memory byte; these programs fail if memory is allocated at address 0. Personality servers and other tasks can avoid this problem by making sure the first page of each task is reserved.

Memory Objects

The microkernel allows user mode tasks to provide the semantics associated with the act of referencing portions of a virtual address space. It does this by allowing the specification of an abstract memory object that represents the non-resident state of the memory ranges backed by this memory object. The task that implements the memory object responds to messages sent to the port that names the memory object. The task is called a memory manager.

Basic Manipulation

Manipulation of a virtual address space by a user mode task takes the following basic form:

A task establishes a new memory range, specifying a memory object representative port to name the memory object that backs the range (virtual_address_space [memory_range]→vm_map).

The task attempts to reference a portion of this memory range, usually by touching it. Because that portion does not yet exist in memory, the referencing task takes a page not resident fault. The kernel sends a message to the range's abstract memory object requesting the missing data. The reply from the abstract memory object resolves the requesting task's page fault.

Eventually, the resident pages of the memory range, with values possibly modified by client tasks, are evicted from memory. Pages are sent in messages to the range's abstract memory object for disposition. The pager can tell the kernel to return only dirty pages or to also return clean pages.

The client task de-establishes the memory range using virtual_address_space [memory_range]→vm_deallocate. When all mappings of this memory object are gone, the abstract memory object is terminated.

The kernel should be viewed as using main memory as a directly accessible cache for the contents of the various memory objects. The portion of the cache that contains resident pages for a memory object is referred to as the memory cache object. The kernel is involved in a dialog with the various memory managers to maintain this cache, filling and flushing this cache as the kernel sees fit. This dialog consists, in general, of asynchronous messages, because the kernel cannot be stalled by a memory manager, and memory managers wish to maximize the concurrency in their operations. The kernel's messages are sent to the memory manager through its abstract memory object port. Messages to the kernel are sent through the kernel's memory cache control port. The messages sent by the kernel are sent using routines labeled as Server Interfaces. Messages sent by the memory managers are labeled as normal message functions.

The memory object representative port specified in the client's vm_map call implies the abstract memory object port. The port names a memory manager task that implements the abstract memory object. Each abstract memory object has an associated resident kernel memory cache object that represents the cache of resident pages for that memory object. The memory cache object has an associated control port that is supplied to the memory manager so that it can control the memory cache object and respond to kernel requests on behalf of the object. The kernel also generates a name port for the memory cache object for use by client tasks to refer to the memory cache object. The name port is returned by virtual_address_space [memory_address] →vm_region. If an abstract memory object is mapped by tasks on more than one host, there will be one control port and one name port for the memory cache object on each host.

Each page in the memory cache object represents an offset within the abstract memory object. The memory object offset is the object offset specified by the client in the vm_map call plus an integral multiple of the length of a page. Note that a client can specify an arbitrary offset to vm_map. Thus, a memory object might have multiple copies of its data in memory, for different offset values specified by its clients. However, the kernel does not maintain data consistency among these copies.

Figure 6:
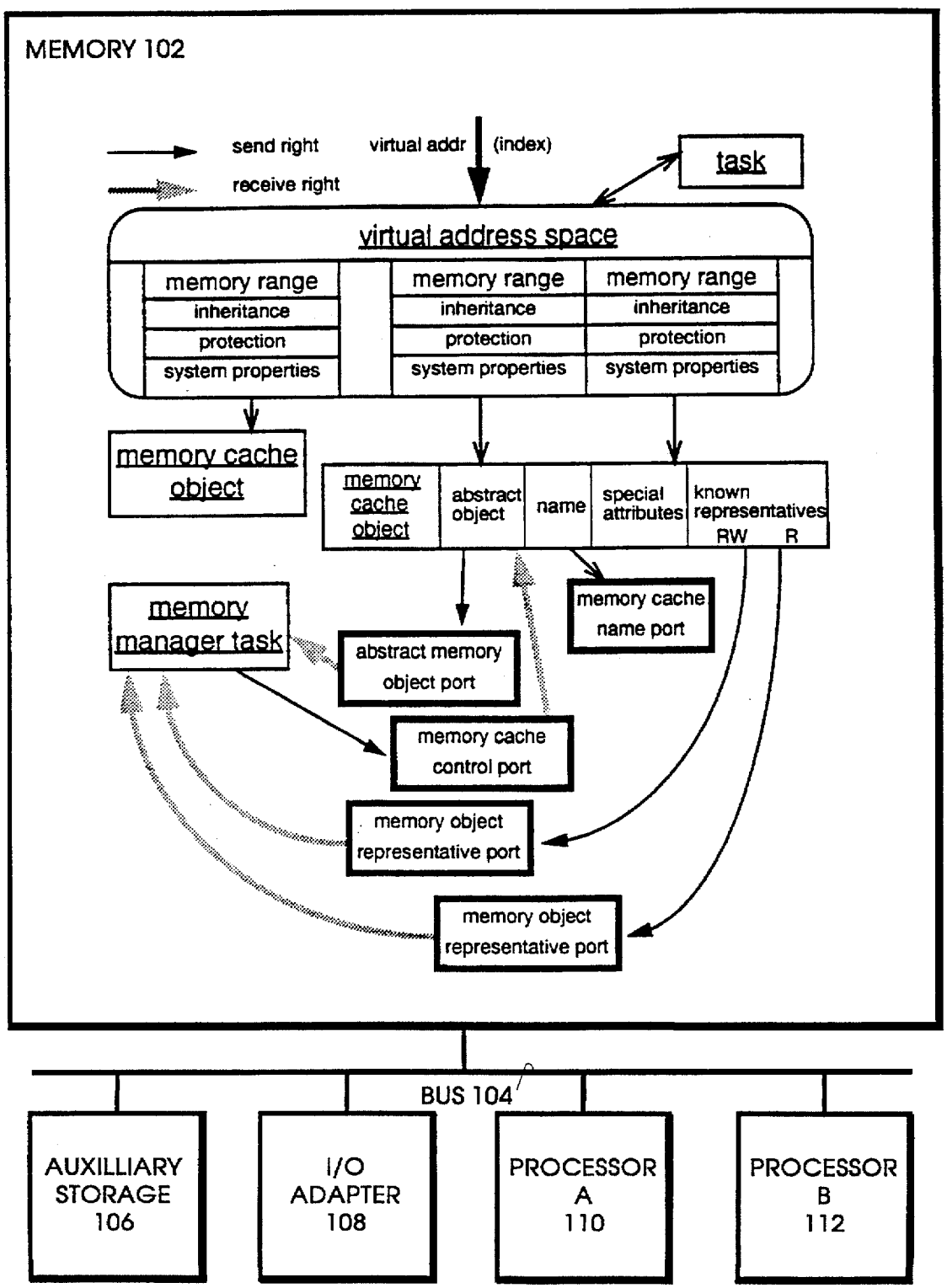
FIG. 6 shows the client visible virtual memory structures.

FIG. 6. shows the client visible virtual memory structures. There are three memory ranges, two of which have the same backing abstract memory object, but possibly differing inheritance or protection attributes. One of the memory cache/abstract memory object pairs is shown in detail with two memory object representatives, representing read and read/write access, and the memory manager task. A reserved, but un-allocated region is not shown. The region would be marked with only the reservation flag and an inheritance attribute. No other attributes apply.

Memory Management Initialization

The result of memory object initialization is to bind the memory manager's abstract memory object (backing store) to the kernel's memory cache object (memory image). The memory manager communicates to the kernel the abstract memory object port over which the kernel sends subsequent manipulation messages. The kernel communicates to the memory manager the memory cache control port over which the manager sends subsequent manipulation messages.

The abstract memory object port is the port over which the kernel sends messages according to specially designed protocols. It may be harmful for clients to have access to this port, because they may confuse the memory manager. For example, a client could send invalid sequences of messages over the abstract memory object port for which the memory manager has insufficient protection. For this reason, and to control access to memory objects, memory managers normally do not distribute their abstract memory object ports, except to the kernel. Instead, clients are given send rights to memory object representative ports, which in turn imply the associated abstract memory object port and associated set of allowed access modes to the associated memory object.

Both abstract memory object ports and memory object representative ports are normal microkernel ports; that is, their receiver is a microkernel task instead of the kernel.

When a client specifies a memory object representative port through vm_map to a kernel that does not yet know the identity of the object so represented, the kernel engages in a special dialog using the representative port. If the kernel does know the identity of the associated object, the vm_map call can be executed directly with no interaction with the memory manager. The vm_map call causes the kernel to send a memory_object_representative (host_name) →memory_object_notify message including a send right to a memory cache control port. The memory cache control port is then assigned default attributes. This port should not be considered to be fully established and its attributes properly set until after the memory_object_establish message is sent. Because a false memory_object_notify message could have been generated by a client holding the representative port instead of by the kernel as a result of vm_map, the memory manager does not directly reply to this message but instead sends its response message to the host name port supplied in the notify message. It can verify whether this is a host name port either by checking mach_host_self or by querying a name server. After verifying that the host name port is valid, the memory manager responds with host_name (memory_cache_control)→memory_object_establish specifying the abstract memory object port and the object attributes, as well as the accesses allowed by the memory object representative and a restricted identity, if any, that tasks attempting to map using this representative must have. It is permissible that the memory object representative port be specified as the abstract memory object port, although this introduces a potential vulnerability for the manager. The object attributes allow the specification of the object cache attribute, and the copy strategy, discussed below, as well as other performance and special attributes. These attributes can later be changed with memory_cache_control→memory_object_change_attributes and examined with memory_cache_control→memory_object_get_attributes.

Note that the manager includes the memory cache control port in this message. Because the control port was created specifically for this use of the representative port, it has not been given away to any other task and so it can be used by the manager to authenticate itself to the kernel-that is, to verify that the manager is the receiver of the memory_object_notify message. If the kernel was not expecting the memory_object_establish message because the client forged the original memory_object_notify message, the kernel responds with abstract_memory_object→memory_object_rejected. This informs the manager that the port it identified as a memory cache control port really is not. The memory manager does not divulge any information to the client. It merely sends an extraneous message to a kernel that did not expect or accept it.

The sequence involving the host name port and a memory cache control port authenticates the kernel to the memory manager and vice versa. It depends on the ability of the memory manager to authenticate the name port given to it. To interpose on the kernel to manager dialog, an intermediary would present the manager not with the host name port, but some other name port. For this to work, the manager must either not authenticate the name port given to it or the authentication service it uses must vouch for the authenticity of the name port given to the manager. The preceding sequence concerns the initialization of a memory object not yet known to the kernel. It is invoked whenever the kernel is presented through vm_map with a memory object representative port it does not know. The memory object underlying the representative may be known to the kernel; the kernel just does not know the association, and so the kernel must assume that this representative implies the initialization of a new memory object. If the memory object is initialized, for subsequent memory_object_notify messages from the same kernel, the memory manager responds with host_name (memory_cache_control)→memory_object_representative. This call only supplies the abstract memory object port and allowed access modes for this representative as well as a restricted identity, if any, that tasks attempting to map using this representative must have.

When the kernel receives this message, it destroys the otherwise redundant memory cache control port supplied. The Message Interface Generator (MIG) stub for memory_object_representative moves the send right as an optimization so that the manager need not explicitly discard its right.

It is possible that the memory-object-representative message will race with memory object termination. This occurs when the manager believes the memory object to be initialized but it is no longer. In such a case, the kernel discards the memory_object_representative message, because the object is not initialized from the kernel's point of view. The manager detects this situation by the presence of a memory_object_terminate message on the abstract memory object port. When the kernel discards the memory_object_representative message, it re-sends the memory_object_notify message. The manager should reply once again with memory_object_establish.

As a general rule, unless the manager knows that a memory object is un-initialized (that is, the object never was initialized or the manager saw a memory_object_terminate message), the manager should respond to memory_object_notify with memory_object_representative. If the kernel is not expecting the memory_object_representative message because a client fabricated a memory_object_notify message, the kernel simply ignores it. The fact that the manager sent this message means that the manager believes the memory object was initialized. The memory_object_notify message to which the manager responded provided no information to the manager. The kernel is free to forget a representative to abstract object association at any time. When the kernel ignores the memory_object_representative message, it is the same as if the kernel accepted it, and then immediately forgot the association. After this sequence is complete, the memory manager must be ready to respond to requests on behalf of this memory object. The memory cache object also has a name port provided to clients through vm_region. The manager can obtain this port with memory_object_get_name.

Basic Page Manipulation

The kernel requests data for memory with abstract_memory_object→memory_object_data_request. Typically, the kernel requests and supplies only a single page at a time. The kernel reserves the right to operate on multiple pages at a time, biased by the memory region's set behavior. The memory manager can set a cluster size for a memory object specifying the number of pages preferred for each transfer (data return). Various factors affect how many pages are actually transferred at one time.

The memory manager supplies the requested data with memory_cache_control→memory_object_data_supply. This call also specifies the minimum access protection for the data. If the memory manager cannot supply the data because of an error, it responds with memory_cache_control→memory_object_data_error. This causes the kernel to cause any threads waiting for this data to take memory failure exceptions. The memory manager can alternately reply with memory_cache_control→memory_object_data_unavailable. In this case, the kernel provides zero-filled pages for the missing data. Memory managers may use memory_cache_control→memory_object_data_supply to provide pages that are not cached by the kernel whether they have been requested or not.

When the kernel decides to flush some memory pages belonging to the memory object, the modified pages are sent as out-of-line data in a message to the memory manager through abstract_memory_object→memory_object_data_return. In this process, the kernel sends a virtual copy of the pages, effectively converting the physical memory pages from being resident pages associated with the memory object to being pages associated with a default memory managed temporary object. In this way, if the memory manager cannot move these pages to their destination in a reasonable time, the kernel can evict these temporary pages using the default memory manager. The default memory manager pages them to paging storage while still allowing the memory manager access to them. Usually, the memory manager copies these pages to a device or file system, and then uses vm_deallocate to free them from its address space, as it treats any out-of-line memory received.

Once the pages are evicted, the kernel is free to request them again at any time, possibly immediately. A memory manager, especially one that is multi-threaded, must protect itself against back-to-back data return and data request messages for the same pages. See the Server Writer's Guide for a discussion of this situation.

Clean-in-Place

The kernel is confronted with several problems when returning (that is, evicting, cleaning, or flushing) pages to a memory manager.

The kernel must be prepared to evict these pages to temporary backing storage if the manager does not remove them itself in a reasonable time.

The kernel makes eviction decisions concerning single pages. For efficiency, the kernel attempts to return (but not evict) multiple pages to a manager so that the manager can update multiple pages in its backing storage at once. The additional pages should remain accessible to their mapping tasks. In principle, the manager can modify the pages returned to it. They appear as normal out-of-line memory. The kernel must be prepared to make writable copies of the pages.

The kernel does its best to optimize the page return mechanisms. The greatest performance is achieved when the manager does not modify the pages and can be trusted to dispose of them. Special high performance mechanisms, internally called clean-in-place, are used by the kernel if the following conditions are true:

The memory manager is privileged with respect to memory resource consumption and asserts this privilege by sending a memory_object_establish_priv message to the host control port instead of the host name port.

The memory manager is on the same host (node) as the memory cache object.

The memory manager does not modify the pages.

The use of these special mechanisms affects the semantics of data return, because the memory manager must explicitly indicate to the kernel when abstract_memory_object→memory_object_data_request messages will be accepted for the returned pages. Additionally, the kernel expects the memory manager to deallocate the returned pages in a timely manner.

Memory Object Termination

When all tasks remove their mappings for a memory object representative, the kernel discards its association of that representative to the underlying abstract memory object. The memory manager is not notified. The memory manager must be prepared to receive a memory_object_notify message for a representative at any time. Each subsequent memory_object_notify message will include a unique memory cache control port. When all tasks remove their mappings for the underlying abstract memory object, the kernel informs the memory manager with abstract_memory_object→memory_object_terminate. Unless the object has the temporary attribute, the kernel evicts all pages of the object prior to actually terminating the memory cache object and sending the terminate message. The terminate message sends the receive right for the memory cache control port to the manager so that the manager can obtain any messages it had sent to that port after the kernel terminated the object, but before the manager received the terminate message.

A memory manager may request that the kernel destroy a memory cache object explicitly with memory_cache_control→memory_object_destroy or implicitly by destroying the abstract memory object port. In the former case, the kernel responds with abstract_memory_object→memory_object_terminate. All current and future requests of the memory object will fail. Following destruction, the kernel may discard the memory cache object's resident pages at its discretion.

One of the object attributes set when the memory object is initialized by memory_object_establish, or thereafter altered by memory_object_change_attributes, is the object cache attribute. With this attribute set, instead of dissolving the representative-abstract object association, or terminating a memory object when all mappings are removed and thereby evicting all cache pages, the memory object is entered into a small kernel object cache. If some task maps the object during this time, the object stays alive with no additional memory_object_notify message. If no task maps the object before the object leaves the object cache, it is terminated. If the object cache attribute is cleared while the memory object is in this unmapped state, the memory object will be promptly terminated. Since this attribute change can have this effect, memory_object_change_attributes can optionally return a reply (reply_port→memory_object_change_completed) that can be used for synchronization.

Synchronization with Backing Storage

A client of a memory object often needs to know that changes made to the memory object are reflected on backing storage. The client makes such a request by executing vm_msync against a memory range. The response of the kernel is to clean or to flush the set of pages to the manager and to engage in a synchronization dialog with the manager. The response of the kernel depends on a flag given by the client to vm_msync and on the value of the memory object's invalidate attribute. After cleaning or flushing the range, the kernel sends abstract_memory_object→memory_object_synchronize specifying the memory object range as well as the client's flags. One of these flags is an asynchronous flag. When set, the client is only interested in having the pages queued to backing storage. Otherwise, the client is interested in the pages actually being on backing storage. When the manager has achieved the desired effect, it responds with memory_cache_control→memory_object_synchronize_completed. The client returns from its vm_msync call at that time. The range specified to memory_object_synchronize_completed must match that of the corresponding memory_object_synchronize message. Although the kernel can have multiple synchronize requests outstanding at a time, it never has overlapping requests outstanding.

Precious Pages

In the basic data management protocol, the kernel returns to the memory manager only pages that have been modified while in the physical memory cache. When evicted, pure un-modified pages are discarded on the assumption that the memory manager holds a copy. For the example of a mapped file memory manager that uses disk files as backing store and for which space is always allocated on backing storage for each page, this is the most reasonable approach. However, for managers that use virtual memory as backing store, such as the network shared memory server or other specialized servers, this is inefficient. Both the manager and the kernel hold the page while it is in use. By specifying a page as precious when supplying it to the kernel, the memory manager need not hold a copy. The kernel commits to returning the page when evicted. This ability to specify pages as precious is available as an option to the memory_object_data_supply call. The memory manager can be informed of the acceptance of these pages by requesting a reply from the data supply call. This reply, reply_port→memory_object_supply_completed, indicates which pages were accepted. The reply follows all data return messages resulting from rejected supplied pages. The memory_object_data_return messages return both modified pages as well as precious pages, with a flag indicating the case.

Direct Cache Manipulation

Sometimes the memory manager needs to force flush pages, or to alter protections. This is done with the memory_cache_control→memory_object_lock_request call. This call informs the kernel of the operations to be performed. When completed, the kernel replies with reply_port→memory_object_lock_completed, using a reply port named in the memory_object_lock_request call.

The main purpose of memory_object_lock_request is to support memory management protocols that involve setting and revoking access to pages, such as distributed memory servers, or transaction protected memory. If a thread attempts to access a page in a way not currently permitted by the permissions set with memory_object_data_supply or memory_object_data_unavailable, the kernel sends a message to the memory manager with abstract_memory_object→memory_object_data_unlock. If the memory manager honors this request, it responds with memory_object_lock_request to specify the new allowed permissions. With a single client, the memory manager can refuse the request by having the kernel flush the range with memory_object_lock_request and when the kernel re-fetches the data, the memory manager can respond with memory_object_data_error.

A memory_object_lock_request sequence can also be started on the memory manager's initiative. The call can require the kernel to return all modified or precious pages to the manager, and can also require the kernel to revoke write permission, when the manager needs the most recent copy of the pages, such as during a fsync operation. The memory manager can also require the kernel to flush the pages altogether from its memory cache.

Virtual Copy Optimizations

The following are three situations in the Microkernel System 115 in which a range of memory is logically copied.

When a memory range has the VM_INHERIT_COPY inheritance attribute and a new task is created from this task.

When vm_copy copies one portion of an address space to another portion of that space.

When a memory range is passed as a virtual out-of-line region in a microkernel message. This includes vm_read and vm_write operations.

These situations occur frequently. Copy inherited memory is used to support the POSIX fork semantics for new process creation. Out-of-line memory, although uncommon in the normal message case, is important in supporting external memory managers, file systems in particular, and the device interface.

These operations can be defined as logical copies instead of direct sharing, because the microkernel virtual memory provides virtual copy optimizations. With these optimizations, the memory is not copied outright; memory is copied in a lazily evaluated way, only when data needs to be copied. Data copying can be deferred for a variety of reasons:

Some of the data is not actually referenced.

Neither task modifies some of the data, so they can effectively share the same memory image of the unmodified data.

The task requesting the data copy deletes its mapping, thereby allowing the kernel to consider the copy a move, which can be optimized into page remappings (page stealing) instead of page copies. A related possibility is that the receiver of the data copies it again, deletes its mappings, without even looking at the data.

On the one hand, these optimizations are purely internal, and therefore not part of the microkernel semantics that this document describes. However, these optimizations are well known. They are an integral part of the utility of many interfaces, especially the external memory manager interfaces.

The fact that the kernel uses the virtual memory system for out-of-line data allows the various kernel primitives that return lists to do so by returning out-of-line data. This is accomplished by internal vm_allocate operations. These optimizations form an important part of the specification of the interfaces: the performance characteristics. Referencing the virtual copy might cause pages to be obtained from the original memory object, thereby interacting with that object's memory manager. The behavior of the referencing task might be affected, especially if the memory manager does not respond to the kernel's page requests.

When a range of memory is to be copied, the kernel creates a new abstract memory and memory cache object to represent the virtually copied pages. The new memory cache object (the copy destination) can share actual physical memory pages with the old memory cache object (the copy source), assuming that these pages are not actually modified. The old object is not affected by the virtual copy. It continues to be associated with the same abstract memory object and the same associated memory manager. Its pages are its own, to be used as it sees fit.

Although the new memory object receives virtual copies of all of the pages in the copied range of the old memory object, the visible mechanics of this operation are not so simple. They are controlled by the value of the copy strategy, set by memory_object_establish when the object is initialized, or by memory_object_change_attributes thereafter, for the old memory object, as discussed below.

The typical memory object's pages can only be modified when mapped into a task's address space and manipulated by direct memory references by that task. If this can happen on only one host, all modifications to the pages of a memory object occur on that host, and are completely visible to the kernel as it maintains its memory cache objects. In this case, the memory manager sets the memory object's copy strategy to MEMORY_OBJECT_COPY_DELAY, the standard copy-on-write optimization. The new memory object is built as a temporary object managed by the default memory manager. The behavior of the old and the new objects is as follows:

Both the new and the old memory objects share pages currently in memory.

If a page of the new object is referenced that is not memory resident, and not yet pushed as below, a message is sent to the old abstract memory object for the data. This request cannot be distinguished by the memory manager from a reference to the old memory object. The fetched page is shared by the old and the new memory object.

When a page of the old object is to be modified by an attempted modify reference to either the old or the new object because they are currently sharing physical memory pages, the kernel first pushes the unmodified value of the page into the new object, so that the new object sees a copy of the original data of that page.

Pushed pages are managed by the default memory manager.

If the old memory object can be modified in a way not visible to the kernel on a single host such as network shared memory or direct access by the memory manager, an alternate copy strategy is needed. To see this, consider the following scenario:

A virtual copy is requested. However, some page of the range is not in memory on the copying host.

The page of the range that is resident on some other host is modified

The new (copy) memory object on the copying host makes a request for the page. It receives the new value, not the value the page would have had at the time of the virtual copy.

To disable the optimization, the MEMORY_OBJECT_COPY_NONE strategy is provided. MEMORY_OBJECT_COPY_NONE is used when the memory manager is not capable of implementing the correct semantics in an intelligent way. At the time of the virtual copy, the kernel constructs the new memory object as a default memory manager managed temporary object. The new memory objects' contents are explicitly copied at that time from the old memory object, thus requesting all pages at this time from the memory manager.

The use of the MEMORY_OBJECT_COPY_NONE strategy can adversely affect the performance of memory management because of the aggressive copying performed. If a memory object is manipulated in ways that invalidate the memory cache, but the memory manager has complete knowledge and control over when these manipulations occur, the memory manager can still use the MEMORY_OBJECT_COPY_DELAY strategy with the help of the force copy option to the memory_object_lock_request call. This option can be used by a memory manager when it realizes it is about to invalidate the kernel's cache. This option causes the kernel to aggressively evaluate all delayed copies of the specified region of the memory object.

Default Memory Manager

The default memory manager provides backing storage for anonymous memory (vm_allocate, copy memory, and so on). It is the memory manager of last resort, one that cannot fail. Since no memory manager can provide paging for it, it is completely wired in memory, and all memory passed to it is wired. This memory manager must promptly deal with its memory, and discard it when paged out to backing storage, because it is effectively wired. The default memory manager for a host is set/queried by host_control→vm_set_default_memory_manager.

Memory backed by the default memory manager can be created in a variety of ways. These creations do not involve the default memory manager directly. The kernel must inform the default memory manager explicitly about new default memory objects. This is done with default_pager→memory_object_create. Privileged tasks might create a memory object to be managed by the default pager with default_pager→default_pager_object_create.

The default memory manager provides backing storage for temporary memory objects created by the kernel to represent virtual copy ranges. These temporary objects have an additional operation applied to them. When a page from the original object is pushed onto them, the pushed data is supplied to the default memory manager with abstract_memory_object→memory_object_data_initialize. The reason for the additional primitive is that the kernel does not completely track the extent to which it pushes pages onto the copy. If the copy page is paged-out, a subsequent modification of the original object pushes the modified original page again. It is possible for the default memory manager to receive more than one push message (memory_object_data_initialize) for a page. The manager must ignore all but the first of these. Note that memory_object_data_initialize is called only when a page is pushed onto the copy; if the copy's pages are themselves modified, the modified pages are sent to the manager with memory_object_data_return.

The default memory manager can be asked for a page of a copy that has never been pushed to it. The manager's response, as for not-yet-existing pages, is to call memory_object_data_unavailable. Instead of creating a zero page, this call copies the appropriate page from the original object. It follows that the original page has not been modified, because no initialize message is seen.

Part B. Detailed Description of the Invention

The invention is a memory management method for a microkernel architecture and the microkernel structure. It features template regions that are defined by the microkernel in the memory as special objects. The microkernel contains data structures in the kernel's task virtual address space, that represent threads, tasks, IPC port space, exception space, and virtual address space mapping. The data structures representing threads store information to enable threads to capture execution states and to provide scheduling and priority information. The data structures representing tasks describe resources available to threads during their execution. The data structures representing IPC port space describe port name to port transformations for the tasks. The data structures representing exception space describe how exceptions are to be handled in a task. The data structures representing virtual address space mapping describe and maintain data for programming the memory management unit of the microkernel system 115. The microkernel 120 also includes data structures to manage the machine-dependent PMAP layer which will maintain data to represent in machine-dependent fashion the translation of virtual addresses to physical addresses for a task. The PMAP layer managed by the microkernel maintains data for physical memory frames to disable all PMAPs that currently describe a page frame in the event of a page-out condition.

In the memory management method, after the microkernel 120 is loaded into the memory 102 of the host multiprocessor 100, it can begin creating task containers in the memory, such as is shown in FIG. 3. The task is referred to as a task container since it represents resources that would be available for use by threads associated with the task, such as a definition of the virtual memory space within which the task's threads can operate, a definition or representation of data available to those threads, and a representation of the communications ports over which the threads for the task can communicate with other threads in the system.

Figure 7A:
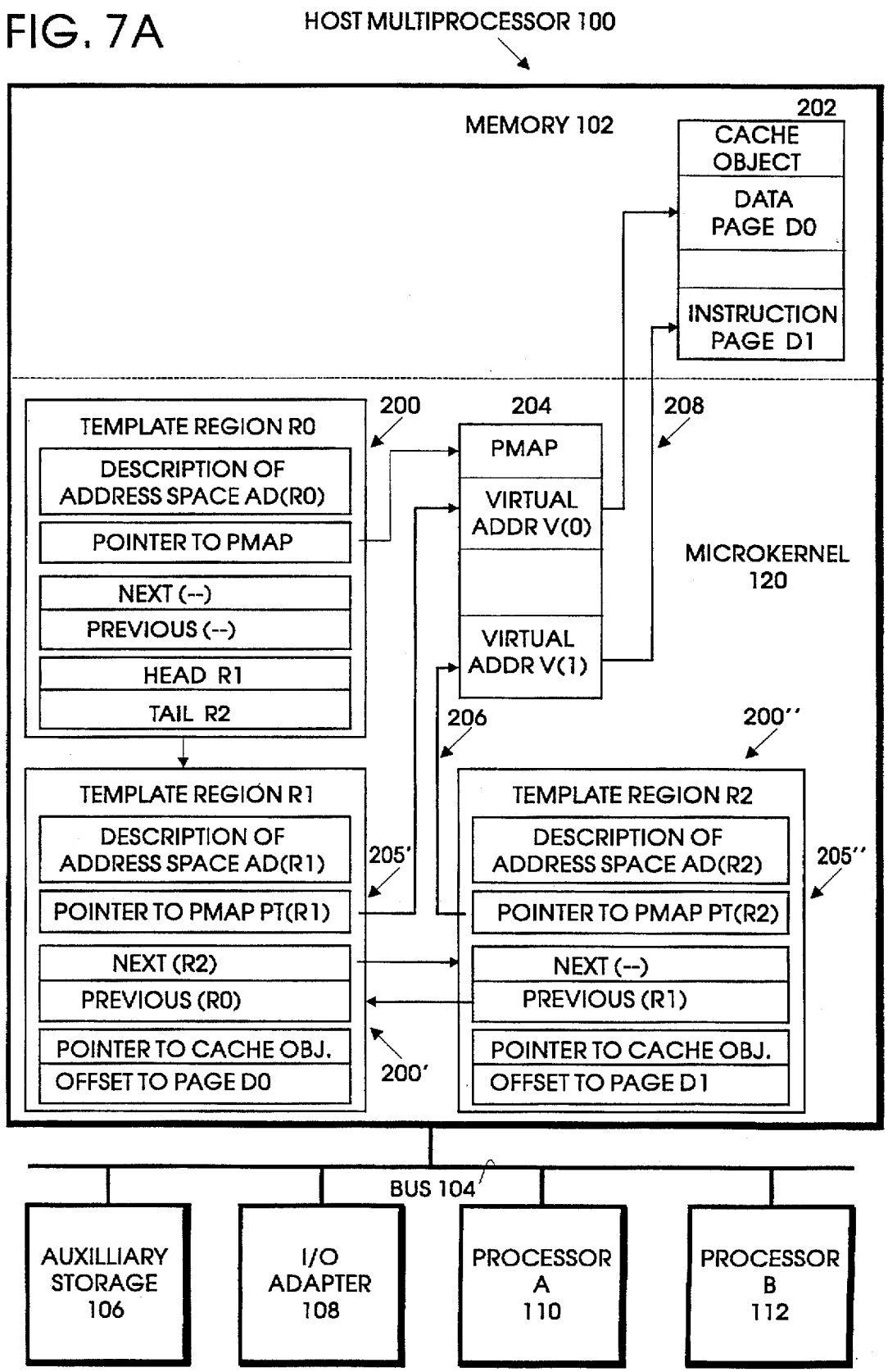
FIG. 7A shows three template regions formed in the microkernel address space, a nestable base region R0, and two leaf regions R1 and R2, whose address spaces are within that of R0. Template regions R0, R1, and R2 have second pointers that point to the PMAP translations into the cache object data pages D0 and D1.

The memory management method begins by forming template regions 200, 200' and 200" in the microkernel 120. As is seen in FIG. 7A, the template region R0, 200 is a nestable template region, meaning that it points to a second template region R1, 200'. The template region R1, 200' is a leaf template region that points through a succession of pointers to an object such as the cache object 202 in FIG. 7A.

The template region R1, 200' also points to another leaf template region R2, 200", that points through a succession of pointers to another data page in the cache object 202. As will become clearer from the discussion below, the template region R1, 200' is considered a leaf template region because it does not point to another template region that is contained within it. However, the template region R0, 200 is considered a nestable template region because both the regions R1 and R2 are contained within it. By being contained within it, is meant that the region R1's virtual address space is within the virtual address space of template region R0. Similarly, the virtual address space of template region R2 is contained within the virtual address space of template region R0. However, the virtual address spaces for template R1 and for template region R2 are distinct, and that is why template region R1 is a leaf template region.

The microkernel 120 constructs a PMAP table 204 within the microkernel address space, to maintain data to represent in machine-dependent fashion the translation of virtual addresses to physical addresses for tasks. A template region R0 is a data structure in the microkernel 120 which includes a description of the address space AD(R0). This address space is the address space over which threads may operate for tasks which are defined by the template region R0. The address space could be a 64K byte virtual memory address segment that would be suitable for a 16 bit address, or it could be a 4 gigabyte virtual address space segment for a 32 bit address. The segment of virtual address space defined by the template region R0, will be the area over which threads may operate for tasks defined by the template region R0. Also included in the template region R0 in FIG. 7A is a pointer to the PMAP 204. The pointer identifies the starting address, for example, of the PMAP 204 within the microkernel address space for the microkernel 120. Additional data structures defining the template region R0 include a designation of the next template region R1 in the chain of template regions which will be used in describing tasks associated with the template region R0. The tail of the chain is designated as R2 thereby enabling a quick identification of the last template region in the chain of template regions R0, R1 and R2. Similarly, the template region R1 in FIG. 7A, includes a description of the address space AD(R1) which is a portion of the address space AD(R0). In addition, the template region R1 includes a pointer to the PMAP, PT(R1) which points to the translation value "virtual address (V0)". This virtual address translation value of the PMAP 204 translates the virtual address value of the pointer over line 206, into a physical address which is output over line 208 to objects in the memory 102. As shown in FIG. 7A, the virtual address (V0) translation value points to the data page D0 in the cache object 202. The template region R1 also includes a designation of the next template region R2 in the chain and the previous template region R0 in the chain. The template region R1 also includes a separate pointer to the cache object 202 at the virtual address for the cache object 202, and it further includes an offset value to the data page D0 in the cache object 202.

The template region R2 in FIG. 7A includes a description of the address space AD(R2) which is a portion of the address space AD(R0). Template region R2 also includes a pointer to the PMAP, PT(R2) whose virtual address value is applied over line 206 to the PMAP 204 at the virtual address translation "virtual ADDR V(1)". This virtual address translation results in a physical address which is output on line 208 to the cache object 202 at the instruction D1. The template region R2 further includes a designation of the previous template region R1 in the chain. Template region R2 also has a pointer to the virtual address of the cache object 202 and an offset value in the cache object 202 to the instruction page D1.

Figure 7B:
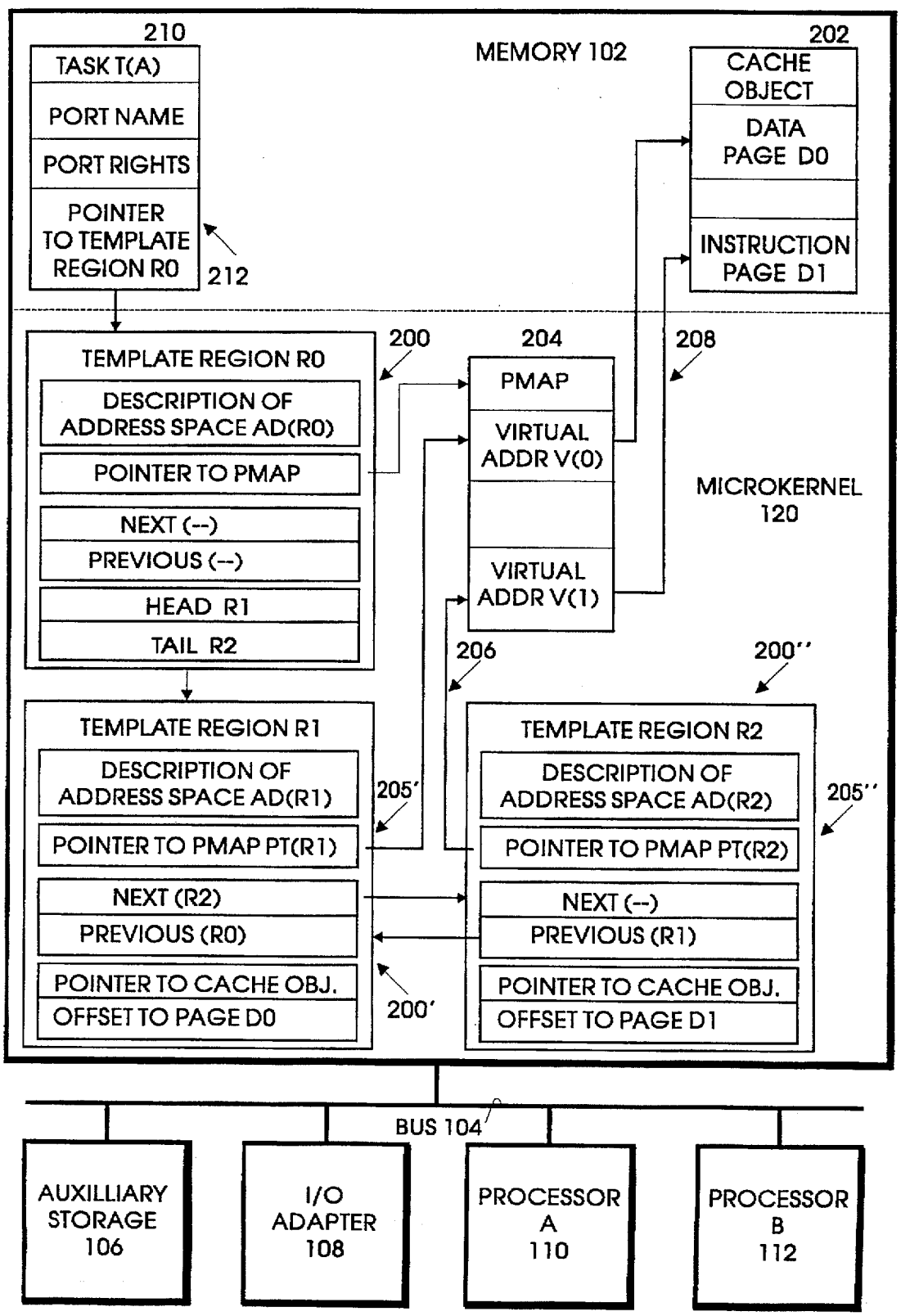
FIG. 7B shows a first task T(A) formed by the microkernel using the attributes of template region R0. Task T(A) has first pointers that point to template region R0. The second pointers of the template regions R0, R1, and R2 provide task T(A) with access to the cache object data pages D0 and D1.

Each template region in the microkernel address space 120 has a set of attributes to define corresponding task containers. The attributes can specify the resources available to a task for use by its threads, such as virtual memory address space, data object resources, and communications ports. The microkernel can form a task in the memory 102, as is shown in FIG. 7B. The microkernel 120 can form the task 210 in the memory 102 by mapping the attributes specified by the template regions 200, 200' and 200" into the task 210. The microkernel 120 defines a virtual address space for the task based upon the virtual address space AD(R0) in the template region R0. Later, when the microkernel 120 conducts virtual memory operations, it does so by manipulating the pointer values 205 in template region R0, pointer 205' in template region R1, and pointer 205" in template region R2. Since the microkernel 120 conducts virtual memory operations on template regions R0, R1 and R2, instead of on the task 210, the effect of the virtual memory operations is manifested in the task by means of its pointer 212.

The microkernel 120 defines a data structure representing the task 210 at a virtual address, using a size attribute from the template R0 and a starting virtual address for the task 210. The microkernel 120 defines a virtual address space for the task 210 over which the task's threads can conduct their operations, using an attribute from the template region R0. The microkernel also defines a task name for the task 210, such as task T(A). The microkernel 120 also forms a port name space in the memory 102 for the task 210 to use as a communications channel between its threads and other threads in the system. The microkernel 120 defines access rights for the port name space for the task 210 using the set of attributes from the template region R0. The microkernel can then form thread objects in the memory 102 for the task 210, the threads thereby being able to fetch instructions from the virtual address space of the task.

In accordance with the invention, the microkernel 120 defines a first pointer 212 for the task 210 that points to the template region R0. Within the template region R0, there is at least one and perhaps many second pointers 205 that point directly or indirectly to the PMAP mapping table 204. As is seen in FIG. 7B, the pointer 205 points to the PMAP 204. Template region R1 which is included in the address space of template region R0, as its pointer 205' points to the virtual address translation value V(0) in the PMAP 204. The virtual address translation value V0 then converts the virtual address value of the pointer 205' into a physical address for the data page D0 in the cache object 202. Similarly, the pointer 205" in the template region R2, which is contained within the address space of the template region R0, points to the virtual address translation value V(1) in the PMAP 204. The virtual address translation value V1 translates the virtual address value for pointer 205" into the physical address for the instruction page D1 in the cache object 202.

From time to time, it may be desirable to make changes in the data resources of a task. This is accomplished by changing the virtual address value represented by the second pointers 205, 205' and 205" in the template regions R0, R1 and R2, respectively. The changed second pointers can point to different translations values in the PMAP 204, as is desired. However, in accordance with the invention, no changes are necessary to the contents of the task 210 itself. Task resources, such as data in cache objects, are addressed by the task through the second pointers 205, 205' and 205" in the template regions.

Figure 7C:
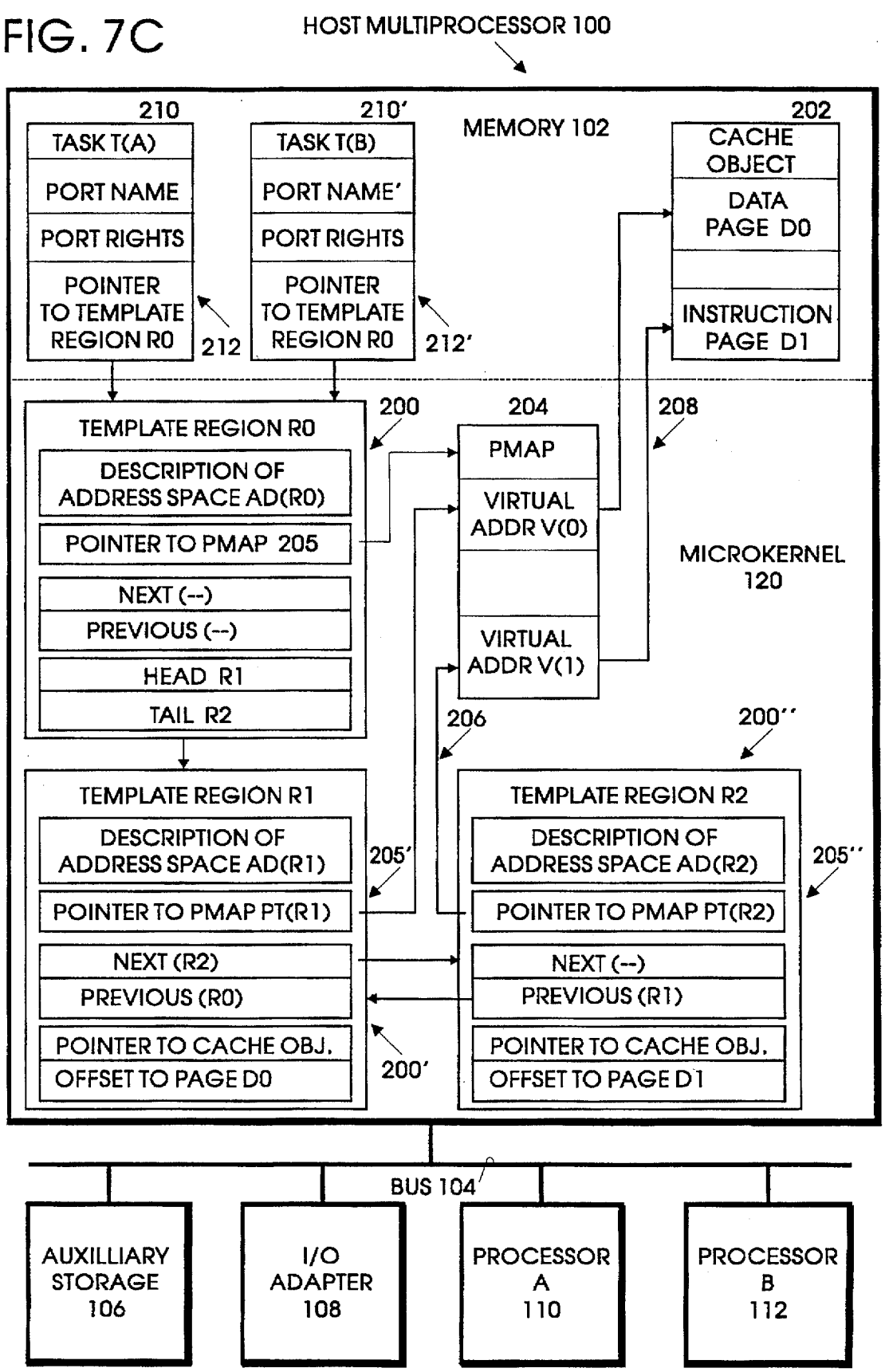
FIG. 7C shows a second task T(B) formed by the microkernel using the attributes of template region R0. Task T(B) has first pointers that point to template region R0. The second pointers of the template regions R0, R1, and R2 provide task T(B) with access to the cache object data pages D0 and D1, in the same manner as that for task T(A).

If the microkernel has defined a plurality of tasks from the template region, such as is shown in FIG. 7C, then changing the second pointers 205, 205' and 205" in the template regions R0, R1 and R2, will result in a global change in the resources available to the plurality of tasks 210 and 210' in FIG. 7C. This is because the tasks 210 and 210' have pointers 212 and 212' which respectively point to the same template region R0, 200. The data pages D0 and D1 addressed by the tasks 210 and 210', can be changed with a single change to the second pointers 205, 205' and 205", in the template regions R0, R1 and R2, instead of changing the contents of each one of the tasks 210 and 210'.

In this manner, a single template region R0, and its contained template regions R1 and R2, can be mapped into multiple tasks 210 and 210', simultaneously. Each task 210 and 210' sees all of the changes that are made to the template regions R0, R1 and R2. This allows for the sharing of properties of the tasks 210 and 210' that were generated by the same template region R0, 200.

The template regions R0, R1 and R2 are the objects to which all virtual memory operations are directed. In the past, with the MACH microkernel, a task was the object to which the virtual memory operations were directed. In accordance with the invention, by directing virtual memory operations to the template regions on which they will take effect, the sharing of the virtual memory operations is much easier to accomplish on multiple tasks.

Since template regions are special objects, a single template region can be mapped into multiple tasks simultaneously. When a template region is mapped into multiple tasks, each task sees all of the changes that are made to the template region. Changes in memory content or addition or removal of interior template regions are all seen by the tasks that mapped the original template region. This enables the sharing of semantics that were not available previously or that could only be approximated. That is, template regions allow not only memory contents to be shared, but also sharing of the memory mapping itself. Thus, a change to the template region (as a result of a change in memory contents or a change to what is mapped by the template region) will be recognized by all tasks to which the template region is mapped. The alternative, one without template regions, is one requiring the monitoring of each task/memory relationship, and one further necessitating a change to each task affected by a change to its corresponding memory region. An implicit shortcoming to the embodiment lacking template regions is, that as the number of tasks mapped to a particular memory region increases, the time to update regions affected by a change correspondingly increases.

For example, using template regions, if all libraries are placed into the same template region and that template region is mapped by interested tasks, then the mapping-in of a new library to the template region will take a predictable amount of time—irrespective of the number of interested tasks. Moreover, without introducing potentially complex locking schemes, the changing of mapping information can appear atomic to the tasks that have the region mapped.

Figure 8A:
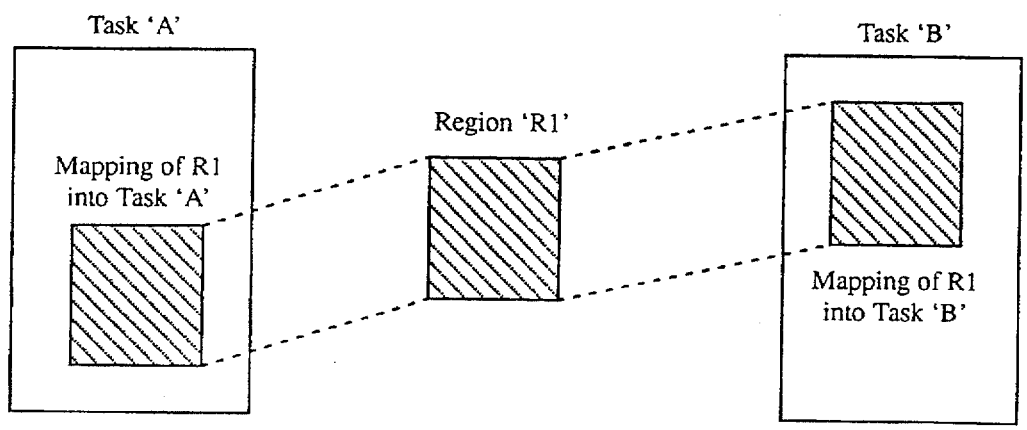
FIG. 8A shows mapping a template region into two tasks.

A template region is the object to which VM operations, that is virtual memory operations, are directed. In the past, a task was the object to which the virtual memory operations were directed. By directing virtual memory operations to the template region in accordance with the invention, upon which they will take effect, sharing is much easier to accomplish since changes are made to a template regions, but not to that mapping of the region. This is an important distinction of the invention. A template region is an object. The template region has attributes, some amount of state, and does not exist in a task's address space. It is the mapping of a template region that exists in a task's address space. Because a mapping of a template region exists in a task's address space, the mapping can appear anywhere in the task's address space and different tasks can share the same template region mapped at different addresses in their respective address spaces, as shown in FIG. 8A. A task A may have a template region mapped at address hex4000, but task B may have the same template region mapped at address hex800F000. It is also possible to have the same template region mapped more than once in a single task's address space, as shown in FIG. 8B.

A task's address itself is defined by a template region that is supplied when the task is created. Therefore, all template regions that are mapped into a task's address space are actually mapped into another template region. Thus, a "VM-map" call to the microkernel does not take a task port, but only takes a template region port as to where the new template region should be mapped into the other template region. This fits nicely with the concept that template regions are the entities by which all virtual memory operations are performed. The linkage between a task and template regions is established when the task is created. By managing a task's address space in this manner, it becomes very easy to predefine mappings set up when a task is created. It also makes it relatively easy to have tasks with different sizes of address space. Different sizes of address space is a function of a "base template region", to be later described and explained in conjunction with FIG. 15. Briefly, the base template region is the entity that defines a task's addressable memory range. The base template region that is associated with the task can be established (or changed) so that the base template region could be of any arbitrary size. Among the more useful implementations of different sized base template regions could, for example, simultaneously support a mixed 32 bit and 64 bit system. In addition, different sized base template regions may be used in environments where a tasks's address range is to be, for some reason, restricted.

According to an illustrative embodiment of the invention, template regions can nest. However, they can nest only in very specific ways. If two template regions are to overlap, one of the template regions must completely cover the other template region. In FIG. 9, if the template region R1 is to overlap the template region R2, then the left picture portion of FIG. 9 is correct and the right portion of FIG. 9 is not correct. The same is true if the template region R1 and the template region R2 were reversed (the order of which regions is considered to overlap which other region is determined by two different mapping operations.) Note that the right picture in FIG. 9 is still not correct if the template region being overlapped is R0, as is shown in FIG. 10. There may be additional restrictions on where a template region may be placed in another template region. For example, a template region can have an attribute that indicates that it is to prevent other template regions from appearing at the same range in the enclosing template region. Usually template regions can overlap each other without regard to the enclosing template region. In FIG. 9, the enclosing template region of R1 could be either R2 or R0. However, this could cause problems if both R1 and R2 contained "memory". This is prevented by only allowing template regions to be mapped into the "holes" of other template regions. That is, one template region cannot be mapped into an area that is already being mapped by another template region. So in FIG. 9, R1 can only be enclosed by R2; there is no possibility of R1 being enclosed by R0 since both R1 and R2 would occupy the same range in R0.

When using template regions, there is no way to allocate anonymous memory. This is done by mapping a memory object into a region as is shown in FIG. 10. Since all memory is represented by memory objects, in order for memory to show up in a template region, a memory object must be mapped into the template region. In the past, memory allocation was actually nothing more than a special case of mapping a portion of an anonymous memory object. With template regions, there is no real concept of an anonymous memory object. Each memory object must be identified in order for it to be mapped.

As can be seen, template regions are very recursive. It is convenient to think of the recursion going all the way down to physical pages. Physical pages can be thought of as being fixed size template regions. This does not imply that the implementation must be done in this manner. It is convenient from a conceptual point of view to think of physical pages as the lowest set of template regions. Since a single template region can be mapped into more than one other template region, it is possible to have physical pages mapped into more than one "normal" region. This allows different template regions to access the same physical memory, but have different attributes associated with those physical pages. Obviously, there must be rules as to how the physical page's attributes are set if the different template regions have conflicting attributes. For exapmle, one template may indicate that the pages should be non-cacheable while another may indicates that the pages should be cached. This also works in reverse. Page tables allow physically discontinuous pages to appear as being virtually contiguous. The same can be done with overlapping template regions. In FIG. 11, R0 contains two other regions, R1 and R2, that are not contiguous in R0. In some applications, this may make the manipulation of information difficult since the discontinuity must be known and addressed. A new template region R3 can be created that is large enough to contain R1 and R2. R1 and R2 are mapped into R3 in such a manner that they are contiguous with each other. The application can then make use of R3 so as not have to address with the discontinuity that appeared in R0.

According to an illustrative embodiment of the invention, there are two different classes of template regions. A first tpye of template region is a nestable template region, being capable of containing other template regions. This allows for the recursion that has been discussed. However, this region is incapable of actually containing memory. This is because all memory (virtual memory) is represented by memory objects. A memory object is a different entity than a template region. There is therefore a second type of template region that maps a portion of a memory object. These can be thought of "leaf" regions. FIG. 12 shows an example of different types of template regions and how memory objects relate to them. It is important to note that the leaf region that is memory object must be exactly the size of the portion of the memory object that is to be mapped. That is, there can be no part of the template region that does not have the memory object mapped into it. FIG. 13 shows two incorrect examples of mapping a memory object into a region. The mapping of MO1 into template region R3 is incorrect because R3 contains other template regions. The mapping of MO2 into R2 is incorrect because R2 is larger than the portion of MO2 that is to be mapped.

Template regions have attributes associated with them that indicate how the memory is to be treated that is contained by the template region. The following are the identification of the attributes with a description of their individual meanings and some of the semantics surrounding each attribute.

1. Eagerly allocate backing store when memory is allocated in the template region. When not set, the backing store is allocated lazily.
2. Supervisor—indicates that the template region is accessible only when the processor is executing in the supervisor state.
3. Privileged—can allocated pages from the reserved pool when physical memory is scarce.
4. When memory is allocated and placed in the template region, the pages representing that memory must be physically contiguous.
5. When memory is allocated and placed in the template region, the pages representing that memory must be in an indicated physical address range.
6. Pages in the template region are wired into memory. Any new allocations into the template region are also wired. If this attribute is not set, the pages in the template region can be evicted from name memory.
7. Processor cache attributes.
8. Access behaviors.
9. Access rights.
10. Coherency and NORMA.

Figure 14:
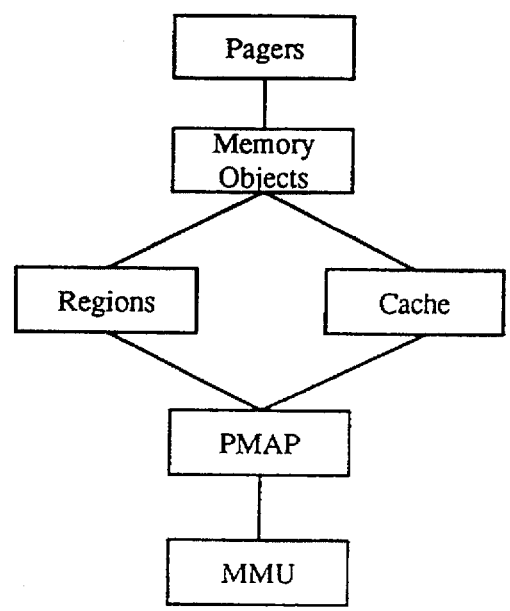
FIG. 14 shows virtual memory components.

Template regions interact with several other components as illustrated in FIG. 14. A description of each of the components is given in the following sections.

The various virtual memory components are pages, memory objects, template regions, cache, PMAP and memory management unit.

The following observations can be made about the virtual memory system organized in the manner in accordance with the invention.

1. A physical page is in at most one memory object. This occurs because memory objects are the entities that are used to represent "memory". Sharing is accomplished by sharing either the memory object containing the page or sharing a template region that contains the memory object.

2. A memory object must know about every template region that is mapping it.

3. A template region must know about every PMAP range that contains the template region.

The above can significantly reduce the amount of memory required to identify the sharing of physical pages. In the past, previous implementations maintained a per page list of all of the PMAPs that contained the page. They also introduced an undesirable recursion into the PMAP code because the PMAP code must be able to dynamically allocate memory in order to construct and maintain the list of PMAPs containing a page.

However, in accordance with the invention, the PMAP does not have to dynamically allocate memory in order to maintain its data structure. Since sharing is done at the template region level, the lists of PMAPs can be significantly reduced. In systems that do a great deal of sharing between tasks, this can result in considerable savings. For example, ten tasks sharing a ten page template region would save 90 list elements. That is, 100 list elements without template regions (10 pages each with a 10 element list), versus 10 list elements with template regions (one region with a 10 element list).

Since template regions represent mappings, template regions can refer to hardware data structures. Many hardware implementations use two or more levels of data structures. Thus, by having an implementation sensitive to when an entire second level data structure, tasks that have mapped the template region could reuse the hardware data structures represented by the data structures has well. For example, for Intel's 386/486 and Pentium processors, the page table structures are two levels deep. The second level represents memory regions that are 4 megabytes long on 4 megabyte boundaries. Implementation of template regions for one of the processors could detect when a memory region is being created that is 4 megabytes (or some multiple of 4 megabytes), and ensure that when more than one task is mapping it, that no new hardware data structures need be created. Even for unshared hardware data structures the implementation can result in efficiencies because the template region can serve as a mapping guide for other hardware data structures. In so doing, the other hardware data structure mappings may vary only slightly form the originally mapped hardware data structure (or perhaps not vary at all), thereby allowing for simple building of future data structures resulting in performance benefits.

In addition, the invention allows for the efficient implementation of eager PMAP entry when a page is paged in. This can significantly avoid page faults. If the page is in memory, the fault will not occur on it.

Template regions and tasks are both special microkernel objects. That is, they can be thought of independently from one another. However, template regions define the address space of a task. A task's address space, that is its basic template region, is defined when the task is created.

Figure 15:
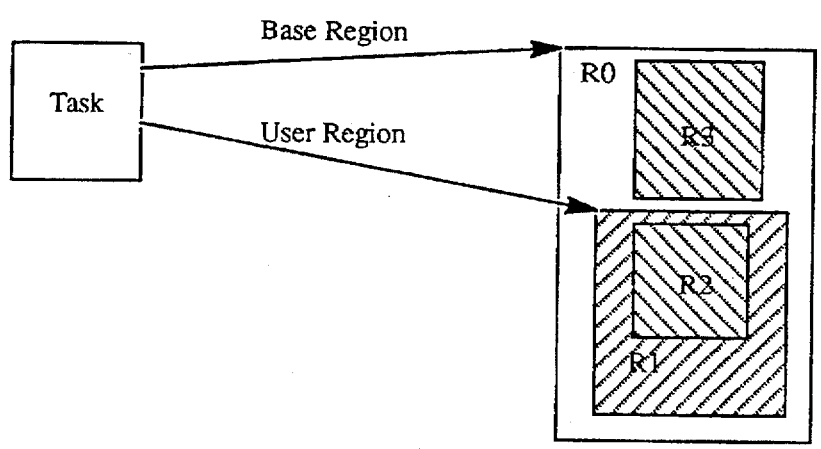
FIG. 15 shows a task's template regions.

A task is fundamentally aware of two template regions. One is contained by the other, but because the task needs to know about the interior template region, it is made aware of it. The two template regions are the base template region and the user template region. The base template region describes the entire address space of the task. The user template region is usually located inside the base template region and describes the portion of the address space that is manipulable by the user portion of the task without special privilege (i.e. it just requires a task port). Since these are template regions, they can contain other template regions as necessary for the correct operation of the task and the system. In FIG. 15, R0 is the base template region. R0 contains another template region that is specific to the base template region, R3 and R0 contains the user template region is R1. R1 contains another template region R2. It should be noted that the threads in the task can access the contents of any of the template regions, but the task can only manipulate the template regions R1 and R2.

It is not necessary for a task to have a user template region. In this case, the task would be unable to manipulate its address space and would rely on others to perform its manipulations on its behalf. This may help be helpful in avoiding an operating system personality having a task from arbitrarily changing its address map (i.e. the address map must rely on the operating system personality).

Referring again to FIG. 15, a task is illustrated as having two pointers. A first pointer is to the base region, describing the task's entire address space (everything that the task can access).

The second pointer is to the user region (what user programs will typically be able to manipulate in terms of regions). It's important to note that there may be template regions inside of the task or inside of the base region that are accessible to user programs, it's just that they are not manipulable, they can't be manipulated by non-privileged code. One of the other things to note is that going back to FIG. 15, there are four regions there R0–R3. The base region which is what describes the entire address space of the task is R0. Now typically this region will be as large as the machine architecture allows for that particular type of task. So, for example, on most 32 bit architectures the base region would describe a 4 gigabytes range. That is not to say that the base region contains 4 gigabytes of information. Rather, the task may access 4 gigabytes of information. The user region is described by R1. R1 allows the unprivileged code in the task to manipulate regions inside of R1, create the regions, map and unmapp new region or regions into and out of R1. However, R1 cannot perform any function on R3. R1 may, for example, access the contents of R3 (depending upon R3's privileges), but R1 cannot know about R3 specifically as a region itself. In addition, R1 and R3 don't know that R0 exists, or any of its contents. So the only regions that a task can know about in its address space are those that are pointed to by the user region and contained within the user region such as R1 and R2.

In one scenario, no user region may exist for a task creating an environment in which the task could not change any of its mapping information. The task would depend on some other agent, such as some other server, to perform the manipulations on its behalf. Among operating system environments where this is desirable, is one in which an application program capable of manipulating its address space is to be avoided.

In another scenario, for example for the kernel itself, both the user region and base region point to the same region. In so doing, the kernel task is able to manipulate its complete address space, and not just some portion of it.

When regions are exported to the supervisor state, several things can be simplified with the template region concept. First is that new code can be loaded into the supervisor template region. The second is that some of the code that is to run in the supervisor mode can easily be made pageable. Neither of these features require any additional interfaces than those required for general template region support.

It is important to maintain the access protection between the user and supervisor access states. This is accomplished by maintaining an attribute that indicates that a template region is only accessible when the processor is in the supervisor state. It may be possible for a user task to "know" that a supervisor region exists, but it cannot access its contents. Usually supervisor template regions will be located in the base template region so as to prevent manipulation of the template regions themselves.

A running system will typically have a relatively small number of supervisor template regions. They will tend to fall into two possible categories. One set of template regions will tend to be specific to individual tasks to have the availability to provide kernel interface libraries. This has the potential of giving individual tasks a specialized interface to the kernel without imposing a penalty of making multiple kernel calls. This is illustrated in FIG. 16.

Figure 16:
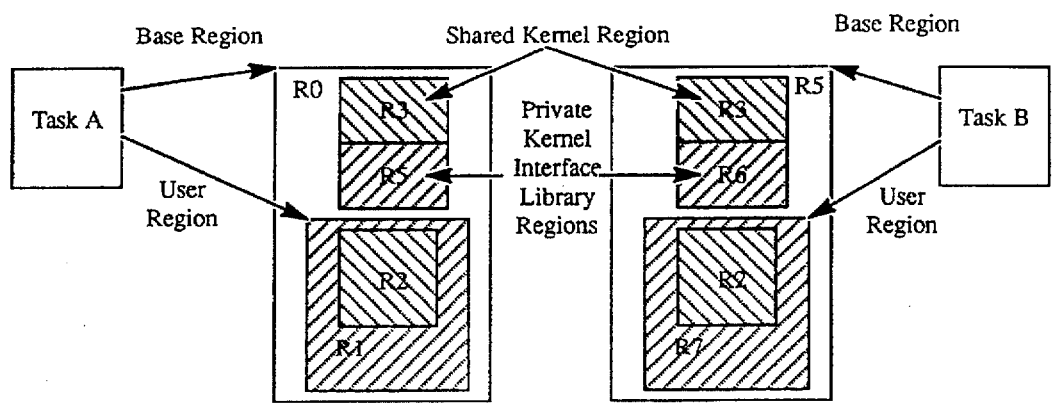
FIG. 16 shows tasks with different kernel interface libraries.

FIG. 16 shows that in most environments there is some portion of the kernel or some supervisor entity that is protected, but must be mapped into a task's address space. This may be accomplished with template regions by mapping, in a template region, those portions of the kernel to appear in a task's address space. The portions may be mapped into the base region so that the user can't manipulate it. Typically, because of the way that the user/supervisor transition occurs, some portion of the supervisor is required to be in that task's address space—but protected so as not to be accessible by the user or the application program. Moreover, with this approach, it is possible not only to have shared kernel region but to also customize the application kernel interface on a per task basis by mapping different libraries as interface libraries. The interface libraries would also appear in the base region and would be protected in such a manner that they couldn't be manipulated by the application code, and are shown as R5 and R6 in FIG. 16. The shared kernel is represented as R3 in both halves of the Figure.

Figure 17:
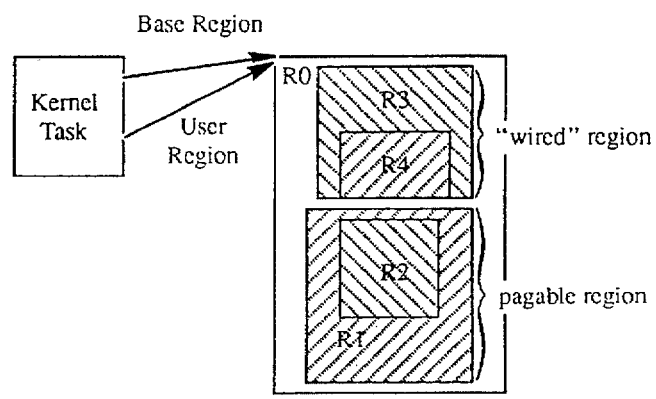
FIG. 17 shows a kernel task's template regions.

The microkernel itself is a task, called the kernel task, and like other tasks will have a base template region. Most, if not all, of the template regions contained in the microkernel's task base template region will all be supervisor template regions. This base template region is likely to be contained in another task's base template region so that they will be able to access kernel functions. However, unlike other task's user template region is the same as its base template region. The kernel's template region is illustrated first in FIG. 16. An example of its more detailed structure shown in FIG. 17. FIG. 17 shows that portions of the kernel can be made pageable by indicating that certain template regions can have attributes indicating that they are not to be wired. The kernel's function can be extended by mapping new template regions into one of the kernel's template regions.

In FIG. 17, since the micro-kernel itself is a task, template regions are used to organize the kernel task itself. The kernel task has both its base and user region pointers pointing to the same region R0 in FIG. 17, so that the kernel task has the privilege to manipulate it's entire address space. Two major subregions in the kernel task's map, R1 and R3, are illustrated. R3 has an attribute that makes it "wired", so that it will never be evicted from memory. There may, however, be portions of the kernel that tolerate being absent and are contained in a region R1, having attributes allowing the region to be paged. Thus, code that is to be pageable in the kernel, may be placed into template regions having the pageable attribute set. Code that is not pageable may be placed into template regions without the pageable attribute set. In so doing, it becomes very easy to load new code into the kernel by simply mapping new regions into either the appropriate wired region or the appropriate pageable region.

The following discusses an example of mapping in template regions. A program can invoke a file server during an open. The file server would determine the size of the file, it would create a template region representing a virtual memory space large enough to contain the file. For example, if the file was 700,000 bytes, then the file server would create a template region representing a 700,000 byte virtual memory space. The file server would also create a memory object used to represent the file. The memory object represents the file potentially minus permissions, so it would be the same memory object regardless of whether a client wanted to have the file open to read only or whether the client wanted to have the file open for read-write. In the example there are two clients: one client decides to open the file as read-only and another client decides to open the file as read-write. There is one memory object because the memory object represents the actual contents of the file. There would, however, be two template regions: one template region would contain a read-only mapping of the file and the second template region would enable the object to be written into.

Each template region represents a mapping of data. The second template region may have, for example, an attribute that allows the object to be writable as well as readable, even though the data behind both regions is the same and guaranteed to be the same. The function that may be performed with data differs depending upon which template region is accessed. For implementations without template regions, memory cannot be manipulated without being mapped into at least one task. It is to be understood that, with template regions, by breaking the requirement of direct task/memory relationship, memory does not have to be mapped into a task in order to be manipulated. Moroever, since the requirement of a direct task/memory relationship is broken, the memory region mapped by the template region may be larger than the address space to which the template region is mapped. In so doing, there is no reason to have a restriction on template region size or to arbitrarily split up a template region so that it may be mapped according to the limitations of a corresponding task.

The first template region has a read-only permission for the data in the object. The second template region has a read-write permission for the data in the memory object. The data comprising the file corresponding to the respective permissions is in the memory object. The role of the file server is two-fold. Its first duty is to establish the linkage between the template region that represents the mapping of the file, and the memory object representing the file. Pointer information is put into the first template region identifies the location of the memory object pages. Correspondingly, the same pointer information is put into the second template region, the location in the virtual address space of the memory object pages. The difference between the two template regions is that the first one has permission only to read the data in the object and second has permission to both read and write the data.

One of the advantages of template regions is the ability to have different attributes for the same object. In addition, since regions nest, template regions can point to even other template regions, not just other memory objects. Thus, a template map of the memory may be constructed. In so doing, to access information described by a template region, a reasonably well-constructed set of pointer information to establish the hardware mapping necessary to access that data exists. For example, on an Intel architecture machine, there might be some previously filled-in page tables, or portions of page tables. If one actually wanted to map an address space into a template region, it would be a simple matter of pointing to a portion of page table data structures rather than building those data structures completely.

The following tables 1–14 describe kernel calls used in association with the creation and operation of tasks and template regions.

The kernel calls used in a association with the creation and operation of template regions, can be specified in an object-oriented user program. Object-oriented programs are divided into two major portions, the object definition portion and the instruction stream portion. The object definition portion of the user program may include object definition tables to define program objects associated with the instructions in the instruction stream. The user will use kernel calls to create template regions in the microkernel address space, to generate tasks in the memory 102 to carry out the user's intended purpose for the program. The user will include in his program the kernel calls described in Tables 1–14 to create and manipulate the template regions and the tasks which they define. The kernel calls shown in Tables 1–5 allow tasks to utilize the template region concept. The kernel calls in Tables 6–14 are primitive template region operations that are necessary in order to manipulate template regions. These kernel calls can be issued by the microkernel 120, by a personality-neutral services module 140, by a dominant or alternate personality server 150, or by an application program 180. Higher level functions for the manipulation of template regions can built up out of combinations of the primitive operations described in Tables 1–14. The task operations and template region operations described in Tables 1–14 are:

Table 1) task_create: creates and names a task

Table 2) task_set_base_region: sets the task's base region

Table 3) task_get_base_region: gets the task's base region

Table 4) task_set_user_region: sets the task's user region

Table 5) task_get_user_region: gets the task's user region

Table 6) region_create_nestable: create a template region that can contain other template regions Table 7) region_create_nestable: creates a template region that references a memory object Table 8) region_map_into: maps a smaller template region into a larger template region Table 9) region_set_attributes: set the attributes of a template region Table 10) region_get_attributes: get the attributes of a template region Table 11) region_object_attach: attach a memory object to a "leaf" template region Table 12) region_copy: copy the contents of one template region to another Table 13) region_get_phys_addrs: gets a list of the physical pages that compose a template region Table 14) region_attr_t: defines the different region attributes Reference to Tables 1–14 will provide a more detailed description of the example kernel calls necessary to perform task operations and template region operations in accordance with the invention.

TABLE 1 task_create
    Function - creates and names a task
    SYNOPSIS
        kern_return_t    task_create (
                task_t parent_task,
                region_t, user_region,
                vm_offset_t user_starting_offset,
                boolean_t, copy_base,
                task_t *child_task);
    DESCRIPTION
        This is an example of how the current function task_create might be changed when the notion of regions is introduced.
        The task_create function creates a new task from parent_rask and returns the name of the new task in child_task. The child task's address space is established based on the base region of the parent_task and the supplied user_region. The child task's user_region is mapped into its base region at the offset uer_starting_offset. The child task initially contains no threads. The child task inherits tne parent's security token.
        The child task receives the following special ports, which are created or copied at task creation:

TABLE 1-continued

[task-self port] The port by which the kernel knows the new child task and allows it to be manipulateed. The child task holds a send right for this port. The port name is also returned to the calling task.

[bootstrap port] The port to which the child task can send a message requesting return of any system service ports it needs. The child task inherits a send right for this port from the parent task. The task can use task_set_special_port to change this port.

[host-self port] The port by which the child task requests information about its host. The child task inherits a send right for this port from the parent task.

]base region port] The port that describes the base region of the child task. The region named by this port is either a copy ofthe parent task's base region or a reference to the parent task's base region. A copy of the parent's region implies that any changes to the base region are private to the individual tasks. That is, it is a distinct region from the parent's base region. but it has the same size, attributes and mapped regions (with the execption of the user region) as the parent task. If the child's base region is a reference to the parent's, then any changes made to the base region will be visible to both tasks. This also implies that the user regions for the tasks are mapped into the base region. Therefore the user regions must be at different starting offsets. A special case is where the user regions for both tasks are for the same region, in which case the user region can be at the same starting offset. This port is accessible through task_get_base_region.

[user region port] The port that describes the user region of the child task. The region named by this port is the region described by user_region. The only relationship that may exist between the user region hetween the child and parent tasks is determined by the caller. This port is accessible through task_get_user_region.

PARAMETERS
   parent_task
      [in task port] The port for the task from which to draw the child task's port rights and base region from.
   user_region
      [in region port] The port for the region that will the used to describe the user address space of the task.
   user_starling_offset
      [in vm offset] This is the offset at which the user region is to be placed into the task's base region.
   copy_base
      [in boolean] Indicates if the base region for the child task is a copy of the parent's base region
      or if it is an additional reference to the parent's base region.
   child_task
      [out pointer to a task port] The kernel-assigned port name for the new task.
RETURN VALUE

TABLE 2 task_set_base_region
   Function - sets tne task's base region
SYNOPSIS
   kern_return_t      task_set_base_region (
                           task_t task,
                           mach_port_t host_priv_port,
                           region_t region);

DESCRIPTION
   The task_set_base_region function sets the region that the task considers to be a description of its address space. Access to tne region is required if tne task is to manipulate its non-user regions in any way. This can be used to manage on a per task basis the contents of what the task sees in its base region.
   Since a task's base legion usually contains regions that have supervisor attributes, manipulation of a task's base region can have implications on system operation and security because tne kernel is contained in region(s) mapped into the task's base region, this is a privileged function that requires access to tne host privilege port.

PARAMETERS
   task
      [in task port] The port for the task whose base region is desired.
   host_priv_port
      [in host privilege port] The port for the host privilege port.
      region
   region
      [in region port] The port for the region that represents the task's entire address space.
RETURN VALUE

TABLE 3 task_get_base_region
    Function - gets the task's base region
    SYNOPSIS
        kern_return_t        task_get_base_region
                                    task_t task,
                                    mach_port_t host_priv_port,
                                    region_t *region);
    DESCRIPTION
        The task_get_base_region function returns the pont that describes the region that describes the task's entire address space. Access to the region is required if the task is to manipulate its non-user regions in any way. This can be used to manage on a per task basis the contents of what the task sees in its base region.
        Since a task's base region usually contains regions that have supervisor attributes, manipulation of a task's base region can have implications on system operation and security because the kernel is contained in region(s) mapped into the task's base_region, this is a privileged function that requires access to the host privilege port.
    PARAMETERS
        task
            [in task port] The port for the task whose base region is desired.
        host_priv_port
            [in host privilege port] The port for the host privilege port.
        region
            [out pointer to a region port] The port for the region that represents the task's entire address space.
    RETURN VALUE

TABLE 4 task_set_user_region
    Function -sets the task'suser region
    SYNOPSIS
        kern_return_t        task_set_user_region
                                    task_t task,
                                    region_t region);
    DESCRIPTION
        The task_set_user_region function "points" the task at the region that the task is allowed to manipulate. The region should be already mapped into the task's base region prior to this call being issued.
    PARAMETERS
        task
            [in task port] The port for the task whose user region is to be changed.
        region
            [in region port] The port for the region that represents the task's user manipulatable address space.
    RETURN VALUE

TABLE 5 task_get_user_region
    Function - gets the task's user region
    SYNOPSIS
        kern return_t        task_get_user_region
                                      task_t task,
                                    region_t *region);
    DESCRIPTION
        The task_get_user_region function returns the port that describes the user manipulatable region of the task's task address space. Access to the region is required if the task is to manipulate its address space in any way.
    PARAMETERS
        task
            [in task port]The port for the task whose user region is desired.
        region
            [out pointer to a region port] The port for the region that represents the task's user manipulatable address space.
    RETURN VALUE

TABLE 6 region_create_nestable
    Function - create a region that can contain other regions
    SYNOPSIS
    kern_return_t        region_create_nestable (
                            mach_port_t parent_region,
                            vm_size_t region_size,
                            mach_port_t *child_region);
    DESCRIPTION
        A new region is created from a "parent" region. The parent region is used to impose limits on the newly created region. A child region cannot be created that is larger than its parent; The child region also inherits the attributes of the parent region. Once created, the child region can be mapped into other nestable regions. It initially is not mapped into any other region.
        The newly created region is a region that is capable of containing other regions. A memory object cannot be mapped directly into a nestable region.
    PARAMETERS
        parent_region
            [in region port] A reference to the "parent" region from which the new region will be created. The new region may not exceed what is described by the parent in terms of permissions or size.
        region_size
            [in vm size] The size that the new region is to have.
        child_region
            [out pointer to a region port] The name of the newly created region.
    RETURN VALUE
        NOT_A_REGION
            The parent_region is not a known region to the system.
        BAD_SIZE
            The region_size specified for the new region is larger than the size of parent_region.

TABLE 7 region_create_leaf
    Function - create a region that references a memory object
    SYNOPSIS
    kern_return_t        region_create_leaf (
                            mach_port_t parent_region,
                            vm_size_t region_size,
                            mach_port_t *new_region);
    DESCRIPTION
        A new region is created from a "parent" region. The parent region is used to impose limits on the newly created region. A child region cannot be created that is larger than its parent. The child region also inherits the attributes of the parent region. Once created, the child region can be mapped into other nestable regions. It initially is not mapped into any other region.
        The newly created region can be used to map a memory object or a portion of a memory object into a nestable region. A leaf region is used to describe a portion of a memory object. It may only describe one memory object. It cannot contain other regions.
    PARAMETERS
        parent_region
            [in region port] A reference to the "parent" region from which the new region will be created. The new region may not exceed what is described by the parent in terms of permissions or size.
        region_size
            [in vm size] The size that the new region is to have.
        new_region
            [out pointer to a region port] The name of the newly created region.
    RETURN VALUE
        NOT_A_REGION
            The parent_region is not a known region to the system.
    BAD_SIZE
            The region_size specified for the new region_is larger than the size of parent_region.

TABLE 8 region_map_into
    Function - map a smaller region into a larger region
    SYNOPSIS
    kern_return_t        region_map_into (
                            mach_port_t into_region,
                            vm_offset_t *into_region_offset,
                            mach_port_t from_region,
                            region_placement_t placement);
    DESCRIPTION
        The function region_map_into takes a smaller region and maps it into a portion of a larger region. There are several options specified by placement that indicate how into_region_offset is TABLE 8-continued to be interpreted as to where from_region is placed in into_region.
PARAMETERS
    into_region
        [in region port] This specifies the larger region into which the smaller region will be mapped.
    into_region_offset
        [in/out pointer to a vm offset] On input it specifies the starting offset from where to start looking for a place for the from_region to be mapped into the into_region. On output it contains the offset in the into_region where the from_region was mapped.
    from_region
        [in region port] This specifies the smaller region that will be mapped into the larger region.
    placement
        [in region placement] This specifies how the location for the from_region in the into_region will be selected.
RETURN VALUE
    NOT_A_REGION
        The from_region or the into_region are not a known regions to the system. This error also occurs if into_region a leaf region.
    BAD_OFFSET
        The into_region_offset is larger than the size of into_region. This error also occurs if the size from_region + into_region_offset is larger than the size of into_region.

TABLE 9 region_set_attributes
    Function - set the attributes of a region
    SYNOPSIS
    kern_return_t      region set_attributes (
        mach_port_t region,
        region_attr_t attributes,
        region_attr mask_t attribute_mask);
    DESCRIPTION
        The function region_set_attributes sets the absolute attributes of a region. A region's effective attributes are determined by the region(s) that the region is. mapped into. Since a region can be mapped into more than one region, it can have more than one set of effective attributes. This function cannot set any of the "privileged" attributes.
    PARAMETERS
        region
            [in region port] The region whose attributes are to be set.
        attributes
            [in region attributes] The attributes that are to be assigned to the region.
        attribute_mask
            [in region attribute mask] Indicates what attributes are to be changed.
    RETURN VALUE
        NOT_A_REGION
            The region is not a known region to the system.
        BAD_ATTRIBUTE
            One or more of the specified attributes could not be set. This usually occurs when a privileged attribute is attempted to be set with this function.

TABLE 10 region_get_attributes
    Function - get the attributes of a region
    SYNOPSIS
    kern_return_t      region_get_attributes (
                mach_port_t region,
                region_attr t *attributes);
    DESCRIPTION
        The function region_get_attributes will return the attributes of the region specified. This will return the attributes that were set for the region. A region has a set of effective attributes that are based on the attributes that have been set for the region and the attributes of the region that contains it. Since a region can be contained in more than one region, it can have more than one set of effective attributes.
    PARAMETERS
        region
            [in region port] The region whose attributes are to be returned.
        attributes
            [out pointer to a region attribute] The specified region's attributes.
    RETURN VALUE
        NOT_A_REGION
            The region is not a known region to the system.

TABLE 11 region_object_attach
    Function - attach a memory object to a "leaf" region
    SYNOPSIS
        kern_return_t        region_object_attach (
                                      mach_port_t region,
                                      mach_port_t memory_object,
                                      vm_offset_t memory_object_offset);
    DESCRIPTION
        The function region_object_attach associates a memory object starting at an indicated offset
        with a region. It is this function that finally establishes the link between regions and actual Storage. The storage is represented by the contents of the memory object.
        There is some discussion if once a region has been attached, it can never be attached to again
        (even if a region_object_detach is performed). The argument for this is this would restrict the
        access to the memory object and would not let "random" tasks map any portion of a memory
        object. The argument against this is that since there is currently no way to get the memory object
        from a region, the attachment (including the original one) can only be done by a task that has
        access to the whole memory object anyway. By allowing a region to be attached and detached
        multiple times, a region could act as a "controlled" window into the memory object. That window could only be moved by some "trusted" agent that knows about the memory object untrusted entities would only have access to the leaf region.
    PARAMETERS
        region
            [if region port] The leaf region to which the memory object will be attached.
        memory_object
            [in memory object port] The memory object that will be attached to the supplied leaf region.
        memory_object_offset
            [in vm offset] The starting offset in the memory object that will be mapped by the supplied
            leaf region.
    RETURN VALUE
        NOT_A_REGION
            The region is not a known region to the system. This error will also occur if region is not
            a leaf region.
        BAD_OFFSET
            The memory_object_offset is larger than the size of memory_object. This error also occurs
            if the size of region + memory_object_offset is larger than the size of memory_object.

TABLE 12 region_copy
    Function - copy the contents of one region to another
    SYNOPSIS
        kern_return_t        region_copy (
                                      mach_port_t from_region,
                                    vm_offset_t from_region_offset,
                                    mach_port_t to_region,
                                    vm_offset_t to_region_offset,
                                    vm_size_t copy_amount);
    DESCRIPTION
        The function region_copy will copy information from from_region into to_region. The rules
        of the copy are such that both the from_region and the to_region must have a memory object
        backing them for the range of the copy. It is not necessary that the memory object that is backing
        the copy range be a single memory object. It is only necessary that there be no unbacked "holes".
        The copy is performned in such a manner so that all of the data has been copied to the to_region
        when region_copy returns. Neither from_region or to_region needs to be mapped into the task
        that desires to perform the copy.
    PARAMETERS
        from_region
            [in region port] The region from which data is to be copied.
        from region_offset
            [in vm offset] The starting offset in from_region where the copy is to start.
        to_region
            [in region port] The region where the data will be copied to.
        to_region_offset
            [in vm offset]The starting offset in to_region where the first data is to be placed.
        copy_amount
            [in vm size] The number of bytes that are to be copied from from_region and placed into
            to_region.
    RETURN VALUE
        NOT_A_REGION
            The from_region or to_region are not known regions to the system.
        BAD_OFFSET
            The from_region_offset is larger than the size of from_region. The to_region_offset is larger
            than the size of to_region. from_region_offset + copy_amount is larger than the size of
            from_region. to_region_offset + copy_amount is larger than the size of to_region.

TABLE 12-continued

NO_DATA
    If a portion of from_region or to_region that is cpvered by the copy has no data (ie there is no underlying memory object) this error will be returned.

TABLE 13 region_get_phys_addrs
    Function - Gets the list of physical pages that compose the region
    SYNOPSIS
    kern_return_t    region_get_hys_addrs (
                              mach_port_t region,
                              phys_addr_t *phys_addr_list,
                              int *phys_addr_list_count);
    DESCRIPTION
        The function region_get_hys_addrs will return an array of physical page addresses of all of the pages that are contained_in the region. In order for the flinction region_get_hys_addrs to return meaning fulil information, region must have its effective attributes set in such a way that REGION_WIRE_TRANSLATION is true (ie the region is wired and its physical addresses are fixed). If this is not true, an error will be retutned. Note ihat region_get_phys_addrs will recursively examine all of the regions contained by region, if necessary in order to obtain the physical addresses.
    PARAMETERS
        region
            [in region port] This is the region whose list of physical page addresses is to be returned.
        phys_addr_list
            [out pointer to a dynamic array of physical addresses] This is the list of physical pages that represent the indicated region.
        phys_addr_list_count
            [in/out pointer to a scalar] This is the number of physical pages contained in the specified region.
    RETURN VALUE
        NOT_A_REGION
            The region is not a known region to the system.
        NOT_FIXED
            The region is not wired so the pages are at fixed physical addresses, therefore returning a list of physical addresses is pointless.

TABLE 14 region_attr_t
    Structure - Defines the different region attributes
    SYNOPSIS
        struct region_attr
        {            vm_prot_t            access;
                    region_cache_attr_t   cache_attr;
                    boolean_t            discardable;
                    boolean_t            eager_backing;
                    vm_advice_t         paging_hint;
                    boolean_t            privileged;
                    boolean_t            physically_contiguous;
                    boolean_t            supervisor;
                    vm_behavior_t       vm_behavior;
                    region_wire_t       wire_attr;
        };           vm_inherit_t        inheritance;
        typedef    struct region_attr      region_attr_t;
    DESCRIPTION
        The structure region_attr_t contains all of the attributes that can be set and retrieved for a region by the functions region_get_attributes, region_set_attributes and region_set_priv_attributes. Each field of region_attr_t represents an individual attribute. Each attribute is described below and will have a description of what the attribute means, if it is privileged and what its inheritance rules are.
    FIELDS
        access
            This attribute indicates the access permissions that are allowed for the region. It is an unprivileged attribute. The effective value for this attribute is propagated toward the enclosing region. The effective value for this attribute is determined by taking the effective value of the this attribute from the enclosing region and perfoming a logical and function with the contained region's attribute.
        cache_attr
            This attribute indicates the cache attributes of the region. The cache attribute indicates what the hardware cacheing characteristics should he. This is a privileged attribute. It requires I/O wire privileges. The effective value for this attribute is propagated toward the interior regions. The effective value for this attribute is determined by the least cacheability for a

TABLE 14-continued particular set of pages. That is the effective value is determined by all of the regions that
are mapping the same area of a memory object.

discardable

This attribute indicates that the region is discardable. This means that the function
region_discard can be issued against this region. This is an unprivileged attribute. The
effective value for this attribute is propagated toward the enclosing region. The effective
value for this attribute is determined by taking the effective value of this attribute from the
enclosing region and performing a logical and function with the contained region's attribute.
For example, if the enclosing region is discardable and the enclosed region is not, the
region_discard cannot be issued on the enclosing region.

eager_backing

This attribute indicates that backing store isto be allocated when a memory object is attached
to a leaf region. This is an unprivileged attribute. The effective value for this attribute is
propagated to the initerior regions. That is if an enclosing region is set for eager_backing,
all of the regions that are contained by it will be treated as if they had eager_backing set.

paging_hint

This attribute gives the kernel paging advice concerning the indicated region. This is an un-
privileged attribute. The effective value for this attribute is propagated to the interior regions
at the time the attribute is set.

privileged

This attribute indicates that memory can be allocated from the reserved page pool in order
to satisfy requests for this region. This is a privileged attribute that requires the host control
port. The effective value for this attribute is propagated to the interior regions that are con-
tained by the enclosing region with this attribute set.

physically_contiguous

This attribute indicates that the memory contained by the region must be physically contigu-
ous. This is a privileged attribute that requires the I/O wire control port. The effective value
for this attribute is propagated to the interior regions that are contained by the enclosing
region with this attribute set.

supervisor

This attribute indicates the the region is a supervisor region when set, and a user region other-
wise. This is a privileged attribute that requires the host privilege port. This attribute propa-
gates from the enelosing region to the interior regions.

vm_behavior

This attribute gives the kernel a hint of the expected access pattern for the indicated region.
This is an unprivileged attribute. The effective value for this attribute is propagated to the
interior regions at the time the attribute is set.

wire_attr

This attribute indicates the pageability for the region. This is a privileged attribute that
requires the I/O wire control port. The effective value for this attribute is propagated to the
interior regions that are contained by the enclosing region inheritance This attribute indicates the inheritance for the region. This attribute is not used by the primi-
tive region operations, but may provide information that may be of use to higher level func-
tions that are built on top of the region functions.

Although a specific embodiment of the invention has been disclosed, it will be understood by those having skill in the art that changes can be made to that specific embodiment without departing from the spirit and scope of the invention.

Method and Apparatus for Management of Mapped and Unmapped Regions of Memory in a Microkernel Data Processing System

What is claimed is:

1. A memory management method for a microkernel architecture data processing system, comprising the steps of:

loading a microkernel into a memory of a data processing system, for creating task containers in said memory;

forming with said microkernel a template region as a special object in said memory, said template region having a set of attributes defining a virtual address space and having a template pointer to a memory object;

forming with said microkernel a task container in said memory having said set of attributes and having a task pointer to said template region, by means of mapping said template region into said task container;

said template pointer and said task pointer establishing a first relationship between said task container and said memory object; performing virtual memory operations on said template region to modify said template pointer to said memory object, thereby establishing a second relationship between said task container and said memory object.

2. The memory management method for a microkernel architecture data processing system of claim 1, wherein said memory object is a map of virtual addresses to physical addresses in said memory, and includes a first address translation to a first memory object and a second address translation to a second memory object, the method further comprising:

said template pointer pointing to said first address translation prior to said virtual memory operations, and establishing said first relationship between said task container and said first memory object;

said template pointer pointing to said second address translation after said memory operations, and establishing said second relationship between said task container and said second memory object.

3. The memory management method for a microkernel architecture data processing system of claim 1, wherein said memory object is a second template region, the method further comprising:

said template pointer pointing to said second template prior to said memory operations, and establishing said first relationship between said task container and said second template;

said template pointer pointing to a third template region after said memory operations, and establishing said second relationship.

4. The memory management method for a microkernel architecture data processing system of claim 1, wherein said step of forming a task container in said memory, further comprises the steps of:

forming with said microkernel a port name space in said memory for said task container, for use as a communication channel;

defining with said microkernel, access rights for said port name space of said task container, using said set of attributes of said template region.

5. The memory management method for a microkernel architecture data processing system of claim 1, wherein said step of forming a task container in said memory, further comprises the steps of:

forming with said microkernel a thread object in said memory for said task container, for fetching instructions from said address space of said task container.

6. The memory management method for a microkernel architecture data processing system of claim 1, wherein said template region includes a base region and a user region, said step of forming a template region in said memory, further comprising the steps of:

forming with said microkernel a template base region as a special object in said memory, said template base region having a set of base attributes; forming with said microkernel a template user region as a special object in said memory, said template user region having a set of user attributes;

said step of forming a task container in said memory, further comprising the steps of:

forming with said microkernel a task base container in said memory having a base virtual address space and said set of base attributes, and having a task base pointer to said template base region, by means of mapping said template base region into said task base container;

forming with said microkernel a task user container in said memory having a user virtual address space and said set of user attributes, and having a task user pointer to said template user region, by means of mapping said template user region into said task user container; and performing virtual memory operations on said template base region;

said virtual memory operations operative in said task base container by means of said task base pointer.

7. The memory management method for a microkernel architecture data processing system of claim 5, which further comprises:

performing virtual memory operations on said template user region, said virtual memory operations operative in said task user container by means of said task user pointer.

8. The memory management method for a microkernel architecture data processing system of claim 6, wherein said step of forming a task base container in said memory, further comprises the steps of:

forming with said microkernel a port name space in said memory for said task base container, for use as a communication channel;

defining with said microkernel, access rights for said port name space of said task base container, using said set of base attributes of said template base region.

9. The memory management method for a microkernel architecture data processing system of claim 6, wherein said step of forming a task base container in said memory, further comprises the steps of:

forming with said microkernel a thread object in said memory for said task base container, for fetching instructions from said address space of said task base container.

10. A memory management method for a microkernel architecture data processing system, comprising the steps of:

loading a microkernel into in a memory of the data processing system, for creating task containers in said memory;

forming with said microkernel a template base region as a special object in said memory, said template base region having a first size and a first set of attributes;

forming with said microkernel a task base container in said memory having said first size and said first set of attributes, by mapping said template base region into said task base container;

forming with said microkernel a template user region as a special object in said memory, said template user region having a second size and a second set of attributes; forming with said microkernel a task user container within said task base container in said memory, having said second size and said second set of attributes, by mapping said template user region into said task user container at a location within said task base container;

performing virtual memory operations on said template base region;

said virtual memory operations operative in said task base container by means of said mapping.

11. A microkernel architecture data processing system, comprising:

a microkernel in a memory of the data processing system, for creating task containers in said memory;

a template region as a special object in said memory, said template region having a set of attributes defining a virtual address space and having a template pointer to a memory object;

a task container in said memory having said set of attributes and having a task pointer to said template region, formed by means of mapping said template region into said task container;

said template pointer and said task pointer establishing a first relationship between said task container and said memory object;

means for performing virtual memory operations on said template region to modify said template pointer to said memory object, thereby establishing a second relationship between said task container and said memory object.

12. The microkernel architecture data processing system of claim 11, that further comprises:

said memory object is a map of virtual addresses to physical addresses in said memory, and includes a first address translation to a first memory object and a second address translation to a second memory object;

said template pointer pointing to said first address translation prior to said memory operations, and establishing said first relationship between said task container and said first memory object;

said template pointer pointing to said second address translation after said memory operations, and establishing said second relationship between said task container and said second memory object.

13. The microkernel architecture data processing system of claim 11, wherein said memory object is a second template region, further comprising:

said template pointer pointing to said second template prior to said memory operations, and establishing said first relationship between said task container and said second template;

said template pointer pointing to a third template region after said memory operations, and establishing said second relationship.

14. The microkernel architecture data processing system of claim 11, wherein said task container in said memory, further comprises:

a port name space in said memory for said task container, for use as a communication channel, having access rights for said port name space of said task container, defined using said set of attributes of said template region.

15. The microkernel architecture data processing system of claim 11, wherein said task container in said memory, further comprises:

a thread object in said memory for said task container, for fetching instructions from said address space of said task container.

16. A method of running a selected, operating system personality program in a microkernel architecture data processing system, comprising the steps of:

loading a microkernel into a memory of a data processing system, for creating task containers in said memory;

loading a selected, operating system personality program into said memory of said data processing system;

sending a call to said microkernel from said selected, operating system personality program, to form a template region as a special object in said memory, said template region having a set of attributes defining a virtual address space and having a template pointer to a memory object;

forming with said microkernel a task container in said memory having said set of attributes and having a task pointer to said template region, by means of mapping said template region into said task container, said template pointer and said task pointer establishing a first relationship between said task container and said memory object;

performing virtual memory operations on said template region to modify said template pointer to said memory object, thereby establishing a second relationship between said task container and said memory object.

17. The method of running a selected, operating system personality program for a microkernel architecture data processing system of claim 16, wherein said memory object is a map of virtual addresses to physical addresses in said memory, and includes a first address translation to a first memory object and a second address translation to a second memory object, the method further comprising:

said template pointer pointing to said first address translation prior to said memory operations, and establishing said first relationship between said task container and said first memory object;

said template pointer pointing to said second address translation after said memory operations, and establishing said second relationship between said task container and said second memory object.

18. The method of running a selected, operating system personality program for a microkernel architecture data processing system of claim 16, wherein said memory object is a second template region, the method further comprising:

said template pointer pointing to said second template prior to said memory operations, and establishing said first relationship between said task container and said second template;

said template pointer pointing to a third template region after said memory operations, and establishing said second relationship.

19. The method of running a selected, operating system personality program for a microkernel architecture data processing system of claim 16, wherein said step of forming a task container further comprises the step of:

sending a second call to said microkernel from said selected, operating system personality program, to form a task container in said memory having said set of attributes and having a task pointer to said template region, by means of mapping said template region into said task container.

20. A microkernel architecture data processing system, comprising:

a microkernel in a memory of the data processing system, for creating task containers in said memory;

a selected operating system personality program in said memory of said data processing system, for sending a call to said microkernel to form a template region as a special object in said memory;

a template region in said memory formed in response to said call, said template region having a set of attributes defining a virtual address space and having a template pointer to a memory object;

a task container in said memory having said set of attributes and having a task pointer to said template region, formed by means of mapping said template region into said task container;

said template pointer and said task pointer establishing a first relationship between said task container and said memory object;

means for performing virtual memory operations on said template region to modify said template pointer to said memory object, thereby establishing a second relationship between said task container and said memory object.

21. A method of running a personality-neutral services program in a microkernel architecture data processing system, comprising the steps of:

loading a microkernel into a memory of a data processing system, for creating task containers in said memory;

loading a personality-neutral services program into said memory of said data processing system;

sending a call to said microkernel from said personality-neutral services program, to form a template region as a special object in said memory, said template region having a set of attributes defining a virtual address space and having a template pointer to a memory object;

forming with said microkernel a task container in said memory having said set of attributes and having a task pointer to said template region, by means of mapping said template region into said task container;

said template pointer and said task pointer establishing a first relationship between said task container and said memory object;

performing virtual memory operations on said template region to modify said template pointer to said memory object, thereby establishing a second relationship between said task container and said memory object.

22. The method of running a personality-neutral services program for a microkernel architecture data processing system of claim 21, wherein said memory object is a map of virtual addresses to physical addresses in said memory, and includes a first address translation to a first memory object and a second address translation to a second memory object, the method further comprising:

said template pointer pointing to said first address translation prior to said memory operations, and establishing said first relationship between said task container and said first memory object;

said template pointer pointing to said second address translation after said memory operations, and establishing said second relationship between said task container and said second memory object.

23. The method of running a personality-neutral services program for a microkernel architecture data processing system of claim 21, wherein said memory object is a second template region, the method further comprising:

said template pointer pointing to said second template prior to said memory operations, and establishing said first relationship between said task container and said second template;

said template pointer pointing to a third template region after said memory operations, and establishing said second relationship.

24. The method of running a personality-neutral services program for a microkernel architecture data processing system of claim 21, wherein said step of forming a task container further comprises the step of:

sending a second call to said microkernel from said personality-neutral services program, to form a task container in said memory having said set of attributes and having a task pointer to said template region, by means of mapping said template region into said task container.

25. A microkernel architecture data processing system, comprising: a microkernel in a memory of the data processing system, for creating task containers in said memory;

a personality-neutral services program in said memory of said data processing system, for sending a call to said microkernel to form a template region as a special object in said memory;

a template region in said memory formed in response to said call, said template region having a set of attributes defining a virtual address space and having a template pointer to a memory object;

a task container in said memory having said set of attributes and having a task pointer to said template region, formed by means of mapping said template region into said task container;

said template pointer and said task pointer establishing a first relationship between said task container and said memory object;

means for performing virtual memory operations on said template region to modify said template pointer to said memory object, thereby establishing a second relationship between said task container and said memory object.

26. A method of running an application program in a microkernel architecture data processing system, comprising the steps of:

loading a microkernel into a memory of a data processing system, 4 for creating task containers in said memory;

loading an application program into said memory of said data processing system;

sending a call to said microkernel from said application program, to form a template region as a special object in said memory, said template region having a set of attributes defining a virtual address space and having a template pointer to a memory object;

forming with said microkernel a task container in said memory having said set of attributes and having a task pointer to said template region, by means of mapping said template region into said task container;

said template pointer and said task pointer establishing a first relationship between said task container and said memory object;

performing virtual memory operations on said template region to modify said template pointer to said memory object, thereby establishing a second relationship between said task container and said memory object.

27. The method of running an application program for a microkernel architecture data processing system of claim 26, wherein said memory object is a map of virtual addresses to physical addresses in said memory, and includes a first address translation to a first memory object and a second address translation to a second memory object, the method further comprising:

said template pointer pointing to said first address translation prior to said memory operations, and establishing said first relationship between said task container and said first memory object;

said template pointer pointing to said second address translation after said memory operations, and establishing said second relationship between said task container and said second memory object.

28. The method of running an application program for a microkernel architecture data processing system of claim 26, wherein said memory object is a second template region, the method further comprising:

said template pointer pointing to said second template prior to said memory operations, and establishing said first relationship between said task container and said second template;

said template pointer pointing to a third template region after said memory operations, and establishing said second relationship.

29. The method of running an application program for a microkernel architecture data processing system of claim 26, wherein said step of forming a task container further comprises the step of:

sending a second call to said microkernel from said application program, to form a task container in said memory having said set of attributes and having a task pointer to said template region, by means of mapping said template region into said task container.

30. A microkernel architecture data processing system, comprising: a microkernel in a memory of the data processing system, for creating task containers in said memory;

an application program in said memory of said data processing system, for sending a call to said microkernel to form a template region as a special object in said memory;

a template region in said memory formed in response to said call, said template region having a set of attributes defining a virtual address space and having a template pointer to a memory object;

a task container in said memory having said set of attributes and having a task pointer to said template region, formed by means of mapping said template region into said task container;

said template pointer and said task pointer establishing a first relationship between said task container and said memory object;

means for performing virtual memory operations on said template region to modify said template pointer to said memory object, thereby establishing a second relationship between said task container and said memory object.

31. A microkernel architecture data processing system, comprising:

an auxiliary storage means for storing programmed instructions; a memory means coupled to said auxiliary storage means, for storing a cache object, said auxiliary storage means paging into said cache object said programmed instructions;

a template region in said memory means, said template region having a set of attributes defining a virtual address space and having a template pointer toward said cache object;

a microkernel means in said memory means, for creating tasks in said memory means;

a task in said memory means having said set of attributes and having a task pointer to said template region, formed by means of said microkernel means mapping said template region into said task;

said template pointer and said task pointer establishing a first relationship between said task and said cache object;

a processor means coupled to said memory means, for executing said programmed instructions;

a thread object in said memory means associated with said task, for fetching said programmed instructions from said cache object using said first relationship, for execution in said processor means;

means for performing virtual memory operations on said template region to modify said template pointer toward said cache object, thereby changing the relationship between said task and said cache object.

32. The microkernel architecture data processing system of claim 31, that further comprises:

a map of virtual addresses to physical addresses in said memory means, said map being pointed to by said template pointer, said map including a first address translation to said cache object and a second address translation to a second memory object;

said template pointer pointing to said first address translation prior to said memory operations, and establishing said first relationship between said task and said cache object;

said template pointer pointing to said second address translation after said memory operations, and establishing a second relationship between said task and said second memory object.

33. The microkernel architecture data processing system of claim 31, that further comprises:

an operating system personality program means in said memory means, for sending a call to said microkernel means to form said template region as a special object in said memory means.

34. The microkernel architecture data processing system of claim 33, that further comprises:

said operating system personality program means in said memory means, sending a call to said microkernel means to form said task in said memory means.

35. The microkernel architecture data processing system of claim 31, that further comprises:

a personality-neutral services program means in said memory means, sending a call to said microkernel means to form said template region as a special object in said memory means.

36. The microkernel architecture data processing system of claim 35, that further comprises:

said personality-neutral services program means in said memory means, for sending a call to said microkernel means to form said task in said memory means.

37. The microkernel architecture data processing system of claim 31, that further comprises:

an application program means in said memory means, for sending a call to said microkernel means to form said template region as a special object in said memory means.

38. The microkernel architecture data processing system of claim 37, that further comprises:

said application program means in said memory means, for sending a call to said microkernel means to form said task in said memory means.

39. A microkernel architecture data processing system, comprising:

a memory means, for storing a cache object containing programmed instructions;

a template region in said memory means, having a set of attributes and having a template pointer toward said cache object;

a microkernel means in said memory means, for creating tasks in said memory means by mapping said template region into a task;

a task in said memory means formed by said microkernel means, having said set of attributes and having a task pointer to said template region;

said template pointer and said task pointer establishing a first relationship between said task and said cache object;

a processor means coupled to said memory means, for executing said programmed instructions;

a thread in said memory means associated with said task, for fetching said programmed instructions from said cache object using said first relationship, for execution in said processor means.

40. The microkernel architecture data processing system of claim 39, that further comprises:

an operating system personality program means in said memory means, for sending a call to said microkernel means to form said template region as a special object in said memory means.

41. The microkernel architecture data processing system of claim 39, that further comprises:

an operating system personality program means in said memory means, sending a call to said microkernel means to form said task in said memory means.

42. The microkernel architecture data processing system of claim 39, that further comprises:

a personality-neutral services program means in said memory means, sending a call to said microkernel means to form said template region as a special object in said memory means.

43. The microkernel architecture data processing system of claim 39, that further comprises:

a personality-neutral services program means in said memory means, for sending a call to said microkernel means to form said task in said memory means.

44. The microkernel architecture data processing system of claim 39, that further comprises:

an application program means in said memory means, for sending a call to said microkernel means to form said template region as a special object in said memory means.

45. The microkernel architecture data processing system of claim 39, that further comprises:
an application program means in said memory means, for sending a call to said microkernel means to form said task in said memory means.

46. A microkernel architecture data processing system, comprising:
an auxiliary storage means for storing programmed instructions;
a memory means coupled to said auxiliary storage means, for storing a cache object, said auxiliary storage means paging into said cache object said programmed instructions;
a template region in said memory means, having a set of attributes and having a template pointer toward said cache object;
a microkernel means in said memory means, for creating tasks in said memory means by mapping said template region into a task;
a task in said memory means formed by said microkernel means, having said set of attributes and having a task pointer to said template region;
said template pointer and said task pointer establishing a first relationship between said task and said cache object;
a processor means coupled to said memory means, for executing said programmed instructions;
a thread in said memory means associated with said task, for fetching said programmed instructions from said cache object using said first relationship, for execution in said processor means.

47. A microkernel architecture data processing system, comprising:
an auxiliary storage means for storing programmed instructions;
a memory means coupled to said auxiliary storage means, for storing a cache object, said auxiliary storage means paging into said cache object said programmed instructions;
a template region in said memory means, having a set of attributes and having a first template pointer and a second template pointer toward said cache object;
a microkernel means in said memory means, for creating tasks in said memory means by mapping said template region into a task;
a first task in said memory means formed by said microkernel means, having said set of attributes and having a first task pointer to said template region;
said first template pointer and said first task pointer establishing a first relationship between said first task and said cache object;
a first processor means coupled to said memory means, for executing said programmed instructions;
a first thread in said memory means associated with said first task, for fetching said programmed instructions from said cache object using said first relationship, for execution in said first processor means;
a second task in said memory means formed by said microkernel means, having said set of attributes and having a second task pointer to said template region;
said second template pointer and said second task pointer establishing a second relationship between said second task and said cache object;
a second processor means coupled to said memory means, for executing said programmed instructions;
a second thread in said memory means associated with said second task, for fetching said programmed instructions from said cache object using said second relationship, for execution in said second processor means.

48. A microkernel architecture data processing system, comprising:
an auxiliary storage means for storing programmed instructions;
a memory means coupled to said auxiliary storage means, for storing a cache object, said auxiliary storage means paging into said cache object said programmed instructions;
a template region in said memory means, having a set of attributes and having a template pointer toward said cache object;
a microkernel means in said memory means, for creating tasks in said memory means by mapping said template region into a task;
a first task in said memory means formed by said microkernel means, having said set of attributes and having a first task pointer to said template region;
a first template pointer and said task pointer establishing a relationship between said first task and said cache object;
a first processor means coupled to said memory means, for executing said programmed instructions;
a first thread in said memory means associated with said first task, for fetching said programmed instructions from said cache object using said relationship, for execution in said first processor means;
a second task in said memory means formed by said microkernel means, having said set of attributes and having a second task pointer to said template region;
said template pointer and said second task pointer establishing said relationship between said second task and said cache object;
a second processor means coupled to said memory means, for executing said programmed instructions;
a second thread in said memory means associated with said second task, for fetching said programmed instructions from said cache object using said relationship, for execution in said second processor means.

49. An article of manufacture for use in a computer system, comprising:
a computer useable medium having computer readable program code means embodied therein for providing a memory management method for a microkernel architecture data processing system, the computer readable program code means in said article of manufacture comprising:
computer readable program code means for causing a computer to load a microkernel into a memory of a data processing system, for creating task containers in said memory;
computer readable program code means for causing a computer to form with said microkernel a template region as a special object in said memory, said template region having a set of attributes defining a virtual address space and having a template pointer to a memory object;
computer readable program code means for causing a computer to form with said microkernel a task container in said memory having said set of attributes and having a task pointer to said template region, by means of mapping said template region into said task container;

said template pointer and said task pointer establishing a first relationship between said task container and said memory object; and computer readable program code means for causing a computer to perform virtual memory operations on said template region to modify said template pointer to said memory object, thereby establishing a second relationship between said task container and said memory object.

50. The article of manufacture for use in a computer system of claim 49, wherein said memory object is a map of virtual addresses to physical addresses in said memory, and includes a first address translation to a first memory object and a second address translation to a second memory object, the computer readable program code means in said article of manufacture further comprising:

said template pointer pointing to said first address translation prior to said memory operations, and establishing said first relationship between said task container and said first memory object;

said template pointer pointing to said second address translation after said memory operations, and establishing said second relationship between said task container and said second memory object.

51. The article of manufacture for use in a computer system of claim 49, wherein said memory object is a second template region, the computer readable program code means in said article of manufacture further comprising:

said template pointer pointing to said second template prior to said memory operations, and establishing said first relationship between said task container and said second template;

said template pointer pointing to a third template region after said memory operations, and establishing said second relationship.

52. The article of manufacture for use in a computer system of claim 49, wherein said computer readable program code means for causing a computer to form a task container in said memory, further comprises:

computer readable program code means for causing a computer to form with said microkernel a port name space in said memory for said task container, for use as a communication channel;

computer readable program code means for causing a computer to define with said microkernel, access rights for said port name space of said task container, using said set of attributes of said template region.

53. The article of manufacture for use in a computer system of claim 49, wherein said computer readable program code means for causing a computer to form a task container in said memory, further comprises:

computer readable program code means for causing a computer to form with said microkernel a thread object in said memory for said task container, for fetching instructions from said address space of said task container.

54. The article of manufacture for use in a computer system of claim 49, wherein said template region includes a base region and a user region, said computer readable program code means for causing a computer to form a template region in said memory, further comprising:

computer readable program code means for causing a computer to form with said microkernel a template base region as a special object in said memory, said template base region having a set of base attributes;

computer readable program code means for causing a computer to form with said microkernel a template user region as a special object in said memory, said template user region having a set of user attributes;

said computer readable program code means for causing a computer to form a task container in said memory, further comprising:

computer readable program code means for causing a computer to form with said microkernel a task base container in said memory having a base virtual address space and said set of base attributes, and having a task base pointer to said template base region, by means of mapping said template base region into said task base container;

computer readable program code means for causing a computer to form with said microkernel a task user container in said memory having a user virtual address space and said set of user attributes, and having a task user pointer to said template user region, by means of mapping said template user region into said task user container; and computer readable program code means for causing a computer to perform virtual memory operations on said template base region, said virtual memory operations operative in said task base container by means of said task base pointer.

55. The article of manufacture for use in a computer system of claim 53, which further comprises:

computer readable program code means for causing a computer to perform virtual memory operations on said template user region, said virtual memory operations operative in said task user container by means of said task user pointer.

56. The article of manufacture for use in a computer system of claim 54, wherein said computer readable program code means for causing a computer to form a task base container in said memory, further comprises:

computer readable program code means for causing a computer to form with said microkernel a port name space in said memory for said task base container, for use as a communication channel;

computer readable program code means for causing a computer to define with said microkernel, access rights for said port name space of said task base container, using said set of base attributes of said template base region.

57. The article of manufacture for use in a computer system of claim 54, wherein said computer readable program code means for causing a computer to form a task base container in said memory, further comprises:

computer readable program code means for causing a computer to form with said microkernel a thread object in said memory for said task base container, for fetching instructions from said address space of said task base container.

* * * * *

UNITED STATES PATENT AND TRADEMARK OFFICE
CERTIFICATE OF CORRECTION

PATENT NO. : 5,729,710
DATED : March 17, 1998
INVENTOR(S) : Magee et al

It is certified that error appears in the above-indentified patent and that said Letters Patent is hereby corrected as shown below:

Column 73, line 63, please delete "4".

Signed and Sealed this

Twenty-sixth Day of October, 1999

Attest:

Q. TODD DICKINSON

*Attesting Officer*     Acting Commissioner of Patents and Trademarks